United States Patent
Iijima et al.

(10) Patent No.: US 10,618,088 B2
(45) Date of Patent: Apr. 14, 2020

(54) PYROLYTIC FURNACE, WATER GAS GENERATION SYSTEM, AND COMBUSTION GAS SUPPLY METHOD FOR WATER GAS GENERATION SYSTEM

(71) Applicant: TAKAHASHI SEISAKUSHO INC., Saitama (JP)

(72) Inventors: Mitsuyuki Iijima, Saitama (JP); Hideo Sato, Saitama (JP)

(73) Assignee: TAKAHASHI SEISAKUSHO INC., Saitama (JP)

(*) Notice: Subject to any disclaimer, the term of this patent is extended or adjusted under 35 U.S.C. 154(b) by 147 days.

(21) Appl. No.: 15/538,408

(22) PCT Filed: Dec. 18, 2015

(86) PCT No.: PCT/JP2015/085517
§ 371 (c)(1),
(2) Date: Jun. 21, 2017

(87) PCT Pub. No.: WO2016/104371
PCT Pub. Date: Jun. 30, 2016

(65) Prior Publication Data
US 2017/0348741 A1    Dec. 7, 2017

(30) Foreign Application Priority Data
Dec. 24, 2014   (JP) .................... 2014-261403

(51) Int. Cl.
*B09B 3/00* (2006.01)
*C10J 3/66* (2006.01)
(Continued)

(52) U.S. Cl.
CPC .......... *B09B 3/0091* (2013.01); *B09B 3/00* (2013.01); *C10B 49/02* (2013.01); *C10B 53/00* (2013.01);
(Continued)

(58) Field of Classification Search
CPC combination set(s) only.
See application file for complete search history.

(56) References Cited

U.S. PATENT DOCUMENTS 4,188,184 A    2/1980  Fornoni
4,264,435 A *  4/1981  Read, Jr. ................ C10G 47/22
                                                      208/129
(Continued)

FOREIGN PATENT DOCUMENTS

DE    19618213 A1    11/1997
EP    2589646        5/2013
(Continued)

OTHER PUBLICATIONS

European Search Report dated Jul. 10, 2018 in corresponding application 15872939.2.
(Continued)

*Primary Examiner* — Nathaniel Herzfeld
(74) *Attorney, Agent, or Firm* — Muncy, Geissler, Olds & Lowe, P.C.

(57) ABSTRACT

Provided is a carbonizing furnace capable of improving combustion efficiency of combustible gas generated by combustion of organic waste and of improving carbonization efficiency of organic waste by appropriately controlling the temperature of carbide. Provided is a pyrolytic furnace in which heating gas can be suppressed from outflowing to the outside from a gap between the upper surface of the body part of the pyrolytic furnace and the outer circumferential surface of a reaction tube where a pyrolysis reaction between carbide and a gasification agent is caused, and in which the temperature of a region where the pyrolysis reaction is caused can be suppressed from being reduced. Provided is a water gas generation system which improves (Continued)

thermal efficiency without using a dedicated heat source for generating water steam to be used as a gasification agent for carbide, promotes a pyrolysis reaction, and thereby, achieves the excellent heat efficiency. Provided are a hydrogen gas generation system and a power generation system which use water gas generated by a water gas generation system including a carbonizing furnace and a pyrolytic furnace and which have excellent productivity. Provided is a carbonizing furnace which improves combustion efficiency by controlling the supply amount of air being supplied to the carbonizing furnace according to the temperature of combustion gas in the carbonizing furnace, and which improves carbonization efficiency by controlling the discharge amount of carbide to be discharged to the outside according to the temperature of carbide or the deposit amount of organic waste in the carbonizing furnace, to make the temperature of carbide appropriate, and by controlling the temperature of air being supplied to the carbonizing furnace. In addition, provided is a pyrolytic furnace which blocks outflow of heating gas or water gas by providing seal portions at the attachment positions of a body part, a reaction tube, and a water gas outlet part, etc. of the pyrolytic furnace, and which maintains a pyrolysis reaction temperature by providing a pyrolysis promoting mechanism to the reaction tube. Provided is a water gas generation system which has excellent thermal efficiency and in which a combustion gas flow path is formed so as to allow combustion gas generated by a carbonizing furnace to flow through a carbonizing furnace, a pyrolytic furnace, a steam superheater, a steam generator, a dryer, and the like. Provided is a hydrogen gas generation system or a power generation system formed by combining the water gas generation system with a hydrogen purifying apparatus or a power generation equipment.

11 Claims, 14 Drawing Sheets

(51) Int. Cl.
  *C10B 49/02* (2006.01)
  *C10B 53/00* (2006.01)
  *C10J 3/00* (2006.01)
(52) U.S. Cl.
  CPC . *C10J 3/00* (2013.01); *C10J 3/66* (2013.01); Y02P 20/124 (2015.11)

(56) References Cited

U.S. PATENT DOCUMENTS

| | | | |
|---|---|---|---|
| 4,412,910 A | | 11/1983 | Archer et al. |
| 4,497,637 A | * | 2/1985 | Purdy ............... C10J 3/466 252/373 |
| 7,658,776 B1 | * | 2/2010 | Pearson ............ C10J 3/485 48/62 R |
| 2003/0098227 A1 | * | 5/2003 | Okamoto ............ B09B 3/00 202/106 |
| 2005/0247553 A1 | * | 11/2005 | Ichikawa ............ C10J 3/66 202/96 |
| 2009/0282738 A1 | * | 11/2009 | Tharpe, Jr. .......... C10B 49/08 48/76 |
| 2010/0326087 A1 | * | 12/2010 | Kawase ............. C01B 3/52 60/780 |
| 2011/0278150 A1 | * | 11/2011 | Mulqueen ............ C05D 9/00 201/36 |
| 2013/0125464 A1 | | 5/2013 | Chen et al. |

FOREIGN PATENT DOCUMENTS

| | | |
|---|---|---|
| JP | S 53-42664 A | 4/1978 |
| JP | S 53128572 A | 11/1978 |
| JP | 2001-192669 A | 7/2001 |
| JP | 2001-235133 A | 8/2001 |
| JP | 2002-038165 A | 2/2002 |
| JP | 2006-152193 A | 6/2006 |
| JP | 2008-208276 A | 9/2008 |
| JP | 4226066 B1 | 2/2009 |
| JP | 2009-270050 A | 11/2009 |
| JP | 2013-185093 A | 9/2013 |
| JP | 5342664 B | 11/2013 |
| JP | 2015-165019 A | 9/2015 |
| WO | WO 2010/049786 A2 | 5/2010 |
| WO | WO 2015/012301 A1 | 1/2015 |

OTHER PUBLICATIONS

Canadian Office Action dated Jul. 23, 2018 by Canadian Patent Office in corresponding application 2,971,688.
Y. Koga et al., "Biomass Solid Fuel Production from Sewage Sludge with Pyrolysis and Co-firing in Coal Power Plant", Mitsubishi Heavy Industries, Ltd., Technical review, vol. 44, No. 2, Jul. 2007, pp. 1-5.
K. Yamamoto, "Device for Producing Hydrogen from Raw Material Gas of Unused Resources by Using High-temperature Water Steam", Energia, No. 14, pp. 16-19.
"Gas Fuel Production for Biomass and its Energy Use", NTS, Inc., pp. 80-83.
International Search Report for Application No. PCT/JP2015/085517 dated Mar. 22, 2016.

* cited by examiner

PYROLYTIC FURNACE, WATER GAS GENERATION SYSTEM, AND COMBUSTION GAS SUPPLY METHOD FOR WATER GAS GENERATION SYSTEM

CROSS REFERENCE TO RELATED APPLICATIONS

This application is a National Stage of International Application No. PCT/JP2015/085517, filed on Dec. 18, 2015, for which priority is claimed under 35 U.S.C. § 371; and this application claims priority of Application No. 2014-261403 filed in Japan on Dec. 24, 2014 under 35 U.S.C. § 119, the entire contents of all of which are hereby incorporated by reference.

TECHNICAL FIELD

The present invention relates to a carbonizing furnace, a pyrolytic furnace, a water gas generation system, a hydrogen gas generation system, and a power generation system, that enable efficient biomass fuel or efficient biomass electric power generation by using organic waste which is one of renewable energy sources. Further, the present invention provides control methods for the same.

BACKGROUND ART

One of the essential problems for establishing a sustainable society for human beings without destroying the material circulation system on the limited earth, is to create renewable clean energy which does not use an exhaustible resource such as fossil fuel or uranium or destroy the resource environment. That is, renewable energy has been demanded which discharges a small amount of harmful substances when being converted to effective energy such as electricity and heat so as to be used by human beings and which is produced by using permanently usable energy sources such as sunlight, wind power, water power, natural steam, and biomass. Practical use of these energy sources is increasing because of their attractive characteristics. However, in any case, there are various inherent problems concerning the final costs.

In the case where biomass is used as an energy source, energy conversion is performed using heat which is obtained by directly burning organic waste derived from living resources, or carbonized, liquefied, or gasified fuel. Accordingly, this case has the feature of making a significant contribution over establishment of a recycling-based society, which results in reuse of waste or reduction in waste, but has not only an infrastructure-relating problem in that the cost for collecting, delivering, and managing the resources is required because such resources are dispersed over a wide range, but also a technical problem in that the combustion efficiency or the efficiency of conversion to fuel is not good, for example. Accordingly, various systems including an organic waste carbonizing system (NPL 1) and a charcoal syngas production system (PTL 1) have been developed.

In particular, a system disclosed in PTL 2, including: decomposing organic waste into gas (CO, $H_2$, $CH_4$, $CO_2$, $H_2O$), carbide, and hydrocarbon under a low-oxygen condition at high temperature (200 to 600° C.); generating water gas (mixed gas containing, as main contents, hydrogen gas, carbon monoxide gas, and carbon dioxide gas) through a pyrolysis reaction between the carbide and superheated water steam (hereinafter, also referred to as "steam") which is a gasification agent; and using the water gas as fuel for power generation, is interesting as a biomass fuel production process and power generation system including a series of an organic waste carbonization process, a gasification process, and a power generation process. Furthermore, NPL 2 reports an attempt to produce hydrogen from water gas generated by direct gasification of biomass.

Therefore, for carbonizing furnaces, pyrolytic furnaces, and water gas generation systems, hydrogen gas generation system, and power generation systems including these furnaces, the following technologies have been conventionally developed.

For example, carbonizing furnaces are known which carbonize organic waste with combustion heat generated by partial combustion of the organic waste. When organic waste is partially burned in such a carbonizing furnace, solid material containing much carbide and combustion gas containing combustible gas are generated. In particular, a carbonizing furnace disclosed in PTL 3 includes a carbonizing unit which is formed in the upper portion of a region formed between a substantially cylindrical main body and a cylindrical body accommodated in the main body and which carbonizes solid material containing much carbide, and a non-combustion unit which is formed in the lower portion of the region and which extinguishes fire burning carbide. This carbonizing furnace enables combustion of combustible gas, which is contained in combustion gas generated by partial combustion of organic waste, in a secondary combustion unit disposed in the upper portion of the carbonizing furnace.

Also, for example, pyrolytic furnaces are known which cause pyrolytic reactions of carbide, which is generated by partial combustion of organic waste, by heating the carbide together with a gasification agent such as water vapor, and thereby generate water gas. In particular, a pyrolytic gasification furnace disclosed in PTL 4 includes an outer cylinder and an inner cylinder, and is configured to supply carbide and a gasification agent to the inner circumference side of the inner cylinder and to supply combustion gas generated by a carbonizing furnace to a gap between the outer cylinder and the inner cylinder. High-temperature combustion gas is supplied to the gap. Accordingly, the outer circumferential surface of the inner cylinder is heated by the combustion gas, so that a pyrolysis reaction on the inner circumference side of the inner cylinder can be promoted.

In addition, a water gas generation system for generating, in the pyrolytic furnace, water gas from carbide supplied from the carbonizing furnace, and further, a power generation system using the water gas are disclosed in PTL 2 and PTL 4, for example.

Meanwhile, as disclosed in NPL 2, for example, a hydrogen gas producing technology enables production of hydrogen from raw material gas which is obtained by directly gasifying wood chips or waste plastics with a high-temperature water steam and which contains hydrogen gas and carbon monoxide gas as main components. Such a technology is basically achieved by including a gasification facility and a hydrogen producing facility. The gasification facility is formed of a gasification furnace, a reforming furnace, an air preheater, a reformed-gas cooler, a dust filter, a gas cooling/purifying tower, a gas purifying facility, a pyrolytic reaction evaporator, a high-temperature steam generator, and the like. The hydrogen producing facility is formed of a pre-treatment apparatus, a carbon monoxide shift converter, and the like.

CITATION LIST

Patent Literature

{PTL 1}
PCT International Publication No. WO 2015/012301
{PTL 2}
Japanese Unexamined Patent Application, Publication No. 2015-165019
{PTL 3}
Publication of Japanese Patent No. 4226066
{PTL 4}
Publication of Japanese Patent No. 5342664

Non Patent Literature

{NPL 1}
Youichi KOGA, et al., "Biomass Solid Fuel Production from Sewage Sludge with Pyrolysis and Co-firing in Coal Power Plant", Mitsubishi Heavy Industries Technical Review, vol. 44, No. 2, 2007, pp. 43-46
{NPL 2}
Koichi YAMAMOTO, "Device for Producing Hydrogen from Raw Material Gas of Unused Resources by Using High-temperature Water Steam" (non-official translation), Energia, No. 14, pp. 16-19

SUMMARY OF INVENTION

Technical Problem

Main problems of conventional carbonizing furnaces include: 1) polymer hydrocarbon which is contained in combustible gas generated by partial combustion of organic waste and which is coagulated, while being cooled, to become liquid (referred to as "tar" in some cases) having high viscosity; 2) the problem of occurrence of fire due to a damage to a carbide conveyance mechanism or contact between air and discharged carbide, which may be caused by insufficient cooling of carbide generated by partial combustion of organic waste; and 3) the problem of the carbonization efficiency of carbide generated by partial combustion of organic waste.

First, the problem of polymer hydrocarbon is that coagulated polymer hydrocarbon is attached onto a carbonizing furnace or devices set downstream therefrom if combustion gas contains a large amount of polymer hydrocarbon. Therefore, it is desirable that the content of polymer hydrocarbon is reduced by improving the combustion efficiency of combustible gas contained in combustion gas.

However, a carbonizing furnace disclosed in PTL 3 supplies air to a carbonizing unit through an air supply port provided in a main body and an air supply port provided in a cylindrical body. Thus, if the amount of air being supplied to the carbonizing unit is adjusted, the amount of air being supplied to a secondary combustion unit accordingly varies. If the amount of air being supplied to the secondary combustion unit is not suited for combustion of combustible gas in the secondary combustion unit, combustible gas contained in combustion gas cannot be appropriately burned. In particular, if an excess amount of air is supplied to the secondary combustion unit, the atmospheric temperature of the secondary combustion unit is lowered, and the combustion efficiency of combustible gas contained in combustion gas is deteriorated. If the combustion efficiency of combustible gas has been deteriorated and combustion gas still contains a large amount of polymer hydrocarbon, a defect may occur in the carbonizing furnace or devices set downstream therefrom.

Next, the problem of occurrence of fire is that, when charge of organic waste from a charge port to a region formed between the main body and the cylindrical body is stopped in the carbonizing furnace disclosed in PTL 3, or for example, if operation of the carbonizing furnace is stopped, the temperature of carbide to be discharged from the carbonizing furnace is not sufficiently lowered, whereas when organic waste is continuously charged from the charge port, the temperature of carbide to be discharged from the carbonizing furnace is lowered to a certain temperature or lower because a fire burning carbide generated in the carbonizing unit is extinguished in a non-combustion unit. That is, in this problem case, carbide, the temperature of which has not been sufficiently lowered, is discharged from the carbonizing furnace to the outside. This causes the problem that excess heat is given to cause a damage to a mechanism which conveys carbide discharged from the carbonizing furnace, or that discharged carbide is brought into contact with air and fire is caused again. The reason for this is that the amount of organic waste accumulated in a region formed between the main body and the cylindrical body gradually decreases so that a region functioning as the non-combustion unit for extinguishing fire burning carbide is narrowed.

Finally, the problem of carbonization efficiency is that the carbonization efficiency of organic waste is reduced because the atmospheric temperature of a carbonizing unit is lowered by external air, which is generally supplied through an air supply port provided in a carbonizing furnace since such air is required for partial combustion of organic waste. For example, in order to address the problem, the carbonizing furnace disclosed in PTL 3 supplies external air to the carbonizing unit through the air supply port provided in the cylindrical body. The carbonizing furnace includes a preheating chamber formed by configuring the cylindrical body to have a double-walled structure. However, the temperature of external air to be supplied to the carbonizing unit fails to be sufficiently controlled in some cases. Thus, sufficiently resolving reduction of the carbonization efficiency is difficult.

Next, main problems of conventional pyrolytic furnaces include: 1) the problem of outflow, to the outside, of combustion gas generated by a carbonizing furnace and supplied to a gap between an outer cylinder and an inner cylinder, and of water gas generated by a pyrolytic furnace; and 2) the problem of the yield of water gas.

First, the problem of the outflow of combustion gas to the outside is as follows. In a structure including an outer cylinder (a main body part) and an inner cylinder (a reaction tube) as disclosed in PTL 4, carbide and a gasification agent are supplied to the inner circumferential side of the inner cylinder and combustion gas generated by a carbonizing furnace is supplied to a gap between the outer cylinder and the inner cylinder. In this structure, when high temperature combustion gas is supplied to the gap, the outer circumferential surface of the inner cylinder is heated by the combustion gas so that a pyrolysis reaction is promoted on the inner circumferential side of the inner cylinder. Accordingly, this problem is caused due to the thermal expansion difference between the inner cylinder and the outer cylinder.

In such a pyrolytic furnace, as illustrated in FIG. 1 of PTL 4, the inner circumferential surface of the outer cylinder is heated by combustion gas. Accordingly, a heat insulating material, etc. may be attached onto the inner circumferential surface of the outer cylinder in light of the durability, and thus, the inner circumferential surface is protected from the heat of combustion gas. However, attachment of a heat insulating material as in the main body part cannot be performed on the inner cylinder, which is also heated, in light of the yield of water gas, etc. Thus, the thermal expansion of the inner cylinder is greater than that of the outer cylinder. Moreover, the length of the inner cylinder in the vertical direction remarkably varies with the thermal expansion because the inner cylinder is formed in a cylindrical shape long in the vertical direction (the longitudinal direction). Accordingly, in the pyrolytic furnace disclosed in PTL 4, the upper end of the inner cylinder is formed into a shape protruding from the upper surface of the outer cylinder. If the inner cylinder expands due to heat, combustion gas in the gap outflows from a portion at which the respective upper surface of the inner cylinder and the outer cylinder are in contact with each other. Furthermore, since the lower end of the inner cylinder protrudes from the lower surface of the outer cylinder, the same problem also arises in a portion at which the lower end of the inner cylinder and the lower surface of the outer cylinder are in contact with each other.

In addition, the problem of the yield of water gas pertains to the low level of the yield due to a narrow gasification region where a conventional pyrolysis reaction is caused.

For example, a pyrolytic furnace disclosed in PTL 4 has a heat storage projection provided at the lower end side of the inside of the inner cylinder. Radiant heat of the heat storage projection can uniformize the temperature distribution of carbide in a gasification region between the heat storage projection and the inner cylinder so as to cause a pyrolytic reaction between carbide and a gasification agent. Thus, the composition ratio of pyrolytic gas can be made uniform. However, even the gasification region in the pyrolytic furnace disclosed in PTL 4 is not regarded as a sufficiently large gasification region and the yield of water gas thereof is not necessarily high.

In addition, PTL 4 proposes a water gas generation system in which the carbonizing furnace and the pyrolytic furnace are combined. The water gas generation system introduces, into the pyrolytic furnace combustion, combustion gas generated together with carbide in the carbonizing furnace, uses the combustion gas as a heat source for a pyrolysis reaction, and uses water steam as a gasification agent for carbide. However, PTL 4 does not specifically disclose a heat source for generating, from water, water steam to be used as a gasification agent. If a dedicated heat source is used for generating water steam, the thermal efficiency of the entire system including the carbonizing furnace, the pyrolytic furnace, and the heat source does not sufficiently become high, and thus, there is room for improvement. In addition, due to the aforementioned problems of the carbonizing furnace and the pyrolytic furnace, high-purity water gas is difficult for the system to efficiently generate.

In order to address the above thermal efficiency problem, PTL 2 discloses a biomass power generation system which uses, as a heat source for water steam to be used as a gasification agent, combustion exhaust gas supplied from a carbonizing furnace or a pyrolytic furnace and which uses water gas generated by the combination of the carbonizing furnace and the pyrolytic furnace. However, due to the aforementioned problems of the carbonizing furnace and the pyrolytic furnace, high-purity water gas is difficult for the system to efficiently generate, and thus, efficient power generation is difficult.

On the other hand, in a hydrogen gas generation system disclosed in NPL 2, the recovery rate of 99.9% hydrogen has reached approximately 60%. However, since organic waste is gasified through a pyrolysis reaction caused by high-temperature water steam, the generated gas contains a large amount of low molecular hydrocarbon (methane, ethane, etc.) and polymer hydrocarbon (tar), other than hydrogen gas and carbon monoxide gas. The cost for equipment required to separate and reform the hydrocarbon is increased.

The present invention has been made in view of the above circumferences, and an object of the present invention is to provide a carbonizing furnace, a pyrolytic furnace, a water gas generation system, a hydrogen gas generation system, and a power generation system, which are summarized as follows.

First, an object of the present invention pertaining to a carbonizing furnace is to provide: a carbonizing furnace capable of suppressing defects in the furnace or devices set downstream therefrom, by improving the combustion efficiency of combustible gas contained in combustion gas generated by partial combustion of organic waste; a carbonizing furnace capable of discharging carbide obtained by combustion of organic waste such that the carbide is discharged after the temperature thereof is appropriately reduced; a carbonizing furnace capable of improving carbonization efficiency of organic waste while supplying external gas as air for combustion of organic waste; and control methods for the same.

Next, an object of the present invention pertaining to a pyrolytic furnace is to provide: a pyrolytic furnace that includes a reaction tube in which a pyrolysis reaction is caused by heating gas flowing between a body part and the reaction tube and that is capable of suppressing outflow of heating gas to outside from the gap between the upper surface of the body part and the outer circumferential surface of the reaction tube when the reaction tube expands due to heat; and a pyrolytic furnace capable of suppressing generation of a region where temperature reduction occurs due to an endothermic reaction caused by pyrolysis, while expanding a region where a pyrolytic reaction between carbide and a gasification agent is caused.

Moreover, an object of the present invention pertaining to a water gas generation system is to provide: a water gas generation system that is capable of improving thermal efficiency without using a dedicated heat source for generating water steam to be used as a gasification agent for carbide, that is capable of promoting a pyrolysis reaction in the pyrolytic furnace, that uses the carbonizing furnace having high carbonization efficiency and being configured to discharge carbide having high combustion efficiency and obtained by combustion of organic waste such that the carbide is discharged after the temperature thereof is appropriately reduced, and that uses the pyrolytic furnace in which outflow of heating gas to the outside is suppressed and a pyrolysis reaction is promoted; and a combustion gas supply method for the water gas generation system.

In addition, an object of the present invention is to provide an efficient hydrogen gas generation system and an efficient power generation system using water gas produced by the water gas generation system.

Solution to Problem

In order to solve the aforementioned various problems, the present invention applies various solutions described below. Descriptions are given in order, of a carbonizing furnace, a pyrolytic furnace, a water gas generation system, a hydrogen gas generation system, and a power generation system.

First of all, a description of a carbonizing furnace according to the present invention is given. First, a carbonizing furnace according one aspect of the present invention is capable of improving combustion efficiency of combustible gas contained in combustion gas, so as to reduce the content of polymer hydrocarbon. The carbonizing furnace includes a body part that is formed into a cylindrical shape extending along an axial line thereof, a cylindrical part that is formed into a cylindrical shape extending along the axial line and that has an outer circumferential surface forming a gap for carbonizing organic waste, between an inner circumferential surface of the body part and the outer circumferential surface of the cylindrical part, a charge portion through which the organic waste is charged into the gap, a carbide discharge unit that discharges, from the gap, carbide obtained by carbonizing the organic waste, a first air supply unit that supplies primary combustion air for partial combustion of the organic waste accumulated in the gap, a second air supply unit that supplies into the body part secondary combustion air for combustion of combustible gas contained in combustion gas generated by combustion of the organic waste, a combustion gas discharge portion through which the combustion gas is discharged, a temperature detection unit that detects the temperature of the combustion gas being discharged from the combustion gas discharge portion, and a control unit that controls the first air supply unit and the second air supply unit. It is preferable that the control unit controls the supply amount of the secondary combustion air from the second air supply unit such that the temperature of the combustion gas detected by the temperature detection unit is equal to or higher than a first combustion gas temperature. It is more preferable that, when the control unit that controls the discharge amount of the carbide, the control unit reduces the supply amount of the secondary combustion air so as to increase the temperature of combustion gas to the first combustion gas temperature or higher, and when the temperature detected by the temperature detection unit is higher than second combustion gas temperature, the control unit increases the supply amount of the secondary combustion air so as to reduce the temperature of the combustion gas to the second first combustion gas temperature or lower. It is still more preferable that the first combustion gas temperature is 900 to 1000° C. and the second combustion gas temperature is 1200 to 1300° C.

A control method for a carbonizing furnace according to one aspect of the present invention is capable of reducing the content of polymer hydrocarbon. The control method is for a carbonizing furnace including a body part that is formed into a cylindrical shape extending along the axial line thereof, a cylindrical part that is formed into a cylindrical shape extending along the axial line and that has an outer circumferential surface forming a gap for carbonizing organic waste, between the inner circumferential surface of the body part and the outer circumferential surface of the cylindrical part, a charge portion through which the organic waste is charged into the gap, a carbide discharge unit that discharges, from the gap, carbide obtained by carbonizing the organic waste, a first air supply unit that supplies primary combustion air for partial combustion of the organic waste accumulated in the gap, a second air supply unit that supplies into the body part secondary combustion air for combustion of combustible gas contained in combustion gas generated by combustion of the organic waste, and a combustion gas discharge portion through which the combustion gas is discharged to outside. The control method includes a temperature detection step of detecting the temperature of the combustion gas being discharged from the combustion gas discharge portion, and a control step of controlling the supply amount of the secondary combustion air from the second air supply unit such that the temperature of the combustion gas detected at the temperature detection step is equal to or higher than a first combustion gas temperature.

Second, a carbonizing furnace according to one aspect of the present invention can solve the problem of occurrence of fire which may be caused by damage to a carbide conveyance mechanism or contact between air and discharged carbide when carbide generated by partial combustion of organic waste is not sufficiently cooled. The carbonizing furnace includes a body part that is formed into a cylindrical shape extending along the axial line thereof, a cylindrical part that is formed into a cylindrical shape extending along the axial line and that has an outer circumferential surface forming a gap for carbonizing organic waste, between the inner circumferential surface of the body part and the outer circumferential surface of the cylindrical part, a charge portion through which the organic waste is charged into the gap, a carbide discharge unit that discharges, from the gap, carbide obtained by carbonizing the organic waste, an air supply unit that supplies combustion air for partial combustion of the organic waste accumulated in the gap, a temperature detection unit that detects the temperature of the carbide accumulated in the lower end side of the gap, and a control unit that controls a discharge amount of the carbide to be discharged by the carbide discharge unit, according to the temperature detected by the temperature detection unit. It is preferable that, in the carbonizing furnace, the carbide discharge unit includes a discharge port through which the carbide is discharged, a rotary body that is disposed at a position opposed to the lower end portion of the gap and that guides the carbide from the lower end portion of the gap to the discharge port by rotating about the axial line, and a driving unit that rotates the rotary body about the axial line. It is more preferable that the control unit controls the rotational speed at which the driving unit rotates the rotary body, according to the temperature detected by the temperature detection unit. It is still more preferable that, when the temperature detected by the temperature detection unit is lower than a predetermined temperature, the control unit controls the driving unit to rotate the rotary body at a first rotational speed, and when the temperature detected by the temperature detection unit is equal to or higher than the predetermined temperature, the control unit controls the driving unit to rotate the rotary body at a second rotational speed lower than the first rotational speed.

In a control method for a carbonizing furnace according to one aspect of the present invention, the temperature of carbide is controlled by detection of the temperature of carbide. The control method is for a carbonizing furnace including a body part that is formed into a cylindrical shape extending along the axial line thereof, a cylindrical part that is formed into a cylindrical shape extending along the axial line and that has an outer circumferential surface forming a gap for carbonizing organic waste, between the inner circumferential surface of the body part and the outer circumferential surface of the cylindrical part, a charge portion through which the organic waste is charged into the gap, a carbide discharge unit that discharges, from the gap, carbide obtained by carbonizing the organic waste, and an air supply unit that supplies combustion air for partial combustion of the organic waste accumulated in the gap. The control method includes a temperature detection step of detecting the temperature of the carbide accumulated in the lower end side of the gap, and a control step of controlling the discharge amount of the carbide being discharged by the carbide discharged unit, according to the temperature detected at the temperature detection step.

A carbonizing furnace according to one aspect of the present invention also can solve the problem of occurrence of fire which may be caused by damage to a carbide conveyance mechanism or contact between air and discharged carbide when carbide generated by partial combustion of organic waste is not sufficiently cooled. The carbonizing furnace includes a body part that is formed into a cylindrical shape extending along the axial line thereof, a cylindrical part that is formed into a cylindrical shape extending along the axial line and that has an outer circumferential surface forming a gap for carbonizing organic waste, between the inner circumferential surface of the body part and the outer circumferential surface of the cylindrical part, a charge portion through which the organic waste is charged into the gap, a carbide discharge unit that discharges, from the gap, carbide obtained by carbonizing the organic waste, an air supply unit that supplies combustion air for partial combustion of the organic waste accumulated in the gap, an deposit amount detection unit that detects the deposit amount of the organic waste accumulated in the gap, and a control unit that controls a discharge amount of the carbide to be discharged by the carbide discharge unit, according to the deposit amount detected by the deposit amount detection unit. It is preferable that, in the carbonizing furnace, the carbide discharge unit includes a discharge port through which the carbide is discharged, a rotary body that is disposed at a position opposed to the lower end portion of the gap and that guides the carbide from the lower end portion of the gap to the discharge port by rotating about the axial line, and a driving unit that rotates the rotary body about the axial line. It is more preferable that the control unit controls the rotational speed at which the driving unit rotates the rotary body, according to the deposit amount detected by the deposit amount detection unit. It is still more preferable that, when the deposit amount detected by the deposit amount detection unit is equal to or larger than a predetermined deposit amount, the control unit controls the driving unit to rotate the rotary body at a first rotational speed, and when the deposit amount detected by the deposit amount detection unit is equal to or smaller than the predetermined deposit amount, the control unit controls the driving unit to rotate the rotary body at a second rotational speed lower than the first rotational speed.

In a control method for a carbonizing furnace according to another aspect of the present invention, the temperature of carbide is controlled by detection of the deposit amount of the organic waste. The control method is for a carbonizing furnace including a body part that is formed into a cylindrical shape extending along the axial line thereof, a cylindrical part that is formed into a cylindrical shape extending along the axial line and that has an outer circumferential surface forming a gap for carbonizing organic waste, between the inner circumferential surface of the body part and the outer circumferential surface of the cylindrical part, a charge portion through which the organic waste is charged into the gap, a carbide discharge unit that discharges, from the gap, carbide obtained by carbonizing the organic waste, and an air supply unit that supplies combustion air for partial combustion of the organic waste accumulated in the gap. The control method includes an deposit amount detection step of detecting the deposit amount of the organic waste accumulated in the gap, and a control step of controlling the discharge amount of the carbide to be discharged to outside by the carbide discharge unit, according to the deposit amount detected at the deposit amount detection step.

Third, a carbonizing furnace according to one aspect of the present invention solves the problem of the carbonization efficiency of carbide generated by partial combustion of organic waste. The carbonizing furnace includes a body part that is formed into a cylindrical shape extending along the axial line thereof, a cylindrical part that is formed into a cylindrical shape extending along the axial line and that has an outer circumferential surface forming a gap for carbonizing organic waste, between the inner circumferential surface of the body part and the outer circumferential surface of the cylindrical part, a charge portion through which the organic waste is charged into the gap, a carbide discharge unit that discharges, from the gap, carbide obtained by carbonizing the organic waste, and an air supply unit that supplies, toward the organic waste accumulated in the gap, combustion air for partial combustion of the organic waste. The air supply unit includes an air blowing unit that sends externally introduced air, a heating unit that heats air sent from the air blowing unit, and an air supply port through which air heated by the heating unit is supplied to the gap. Further, the carbonizing furnace includes a cover portion that is disposed on the outer circumferential side of the gap and that forms, between the outer circumferential surface of the body part and the cover portion, a closed space extending around the axial line. The air blowing unit sends externally introduced air to the closed space. The heating unit is disposed in the closed space and heats air supplied to the closed space by the air blowing unit. Air heated by the heating unit in the closed space is supplied to the gap through the air supply port.

In the above carbonizing furnace, the heating unit has a heat transfer member that transfers heat to the atmosphere in the gap via the outer circumferential surface of the body part. The heat transfer member is disposed below the air supply port, for the purpose of heating air supplied to the closed space by the air blowing unit. Accordingly, it is preferable that the air blowing unit sends externally introduced air toward the outer circumferential surface, of the body part, at a position on a lower outer circumference side of the gap, such that the distance from the inner circumferential surface to the outer circumferential surface of the body part at a position at which the heat transfer member is disposed is shorter than the distance from the inner circumferential surface to the outer circumferential surface of the body part at a position at which the air supply port is disposed. For the same purpose, it is more preferable that the heat transfer member is an annular heat dissipation fin that is in contact with the outer circumferential surface of the body part and that extends around the axial line and along the outer circumferential surface, and the heat dissipation fins are disposed at a plurality of positions. It is still more preferable that the heat transfer member is a heat dissipation fin that is in contact with the outer circumferential surface of the body part and that forms a spiral flow path upwardly swirling about the axial line and along the outer circumferential surface.

Next, a description of a pyrolytic furnace is given. First, a pyrolytic furnace according to one aspect of the present invention can solve the problem of outflow, to the outside, of combustion gas generated by a carbonizing furnace and supplied to a gap between an outer cylinder (a body part) and an inner cylinder (a reaction tube). The pyrolytic furnace includes a body part (an outer cylinder) that is formed into a cylindrical shape extending along the axial line thereof, a reaction tube (an inner cylinder) that is formed into a cylindrical shape extending along the axial line, that has an outer circumferential surface forming, between the inner circumferential surface of the body part and the outer circumferential surface of the reaction tube, a heating gas flow path for circulating heating gas therethrough, and that has an upper end protruding from the upper surface of the body part and a lower end protruding from the bottom surface of the body part, a supply portion through which carbide and a gasification agent are supplied into the reaction tube in order to generate water gas in the reaction tube, a water gas outlet portion which is attached in the lower end of the reaction tube and through which water gas generated by a pyrolysis reaction of the carbide in the reaction tube is guided to outside, a first seal portion that is disposed below the upper surface of the body part so as to be in contact with the upper surface, that has an inner circumferential surface in contact with the outer circumferential surface of the reaction tube, and that blocks outflow of the heating gas from the upper surface of the body part, and a second seal portion that is disposed above the bottom surface of the body part so as to be in contact with the bottom surface, that has an inner circumferential surface in contact with the outer circumferential surface of the reaction tube, and that blocks outflow of the heating gas from the bottom surface of the body part.

Further, in the pyrolytic furnace, portions where outflow of water gas may occur are provided with the solution described below. That is, a pyrolytic furnace according to one aspect of the present invention is the aforementioned pyrolytic furnace further including a third seal portion that has an inner circumferential surface in contact, at an attachment position of the lower end of the reaction tube and the water gas outlet portion, with the outer circumferential surface of the reaction tube and with the outer circumferential surface of the water gas outlet portion, and that blocks outflow of the water gas from the attachment position.

In the pyrolytic furnace according to the present invention, the upper surface of the body part may be formed of an upper plate, a first flange portion may be provided at the upper end of the lateral surface of the body part, and the upper plate and the first flange portion may be fastened to each other with fastening members at a plurality of positions around the axial line such that a fourth seal portion is disposed between the upper plate and the first flange portion. In the pyrolytic furnace of the present invention, the bottom surface of the body part may be formed of a bottom plate, a second flange portion may be provided at the lower end of the lateral surface of the body part, and the bottom plate and the second flange portion may be fastened to each other with fastening members at a plurality of positions around the axial line such that a fifth seal portion is disposed between the bottom plate and the second flange portion. In addition, in the pyrolytic furnace of the present invention, a third flange portion may be provided at the upper end of the reaction tube, a fourth flange portion may be provided at the lower end of the supply portion, and the third flange portion and the fourth flange portion may be fastened to each other with fastening members at a plurality of positions around the axial line such that a sixth seal portion is disposed between the third flange portion and the fourth flange portion.

Second, a pyrolytic furnace according to one aspect of the present invention can solve the problem of the yield of water gas. The pyrolytic furnace includes a body part that is formed into a cylindrical shape extending along the axial line thereof, a reaction tube that is formed into a cylindrical shape extending along the axial line, that has an outer circumferential surface forming, between the inner circumferential surface of the body part and the outer circumferential surface of the reaction tube, a supply portion through which carbide and a gasification agent are supplied into the reaction tube in order to generate water gas in the reaction tube, a water gas outlet portion which is attached in the lower end of the reaction tube and through which the water gas generated in the reaction tube is guided to outside, a heating gas supply portion which is disposed in an upper portion of the body part and through which the heating gas is supplied to the heating gas flow path, a heating gas discharge portion which is disposed in a lower portion of the body part and through which the heating gas is discharged from the heating gas flow path, and a pyrolysis promoting mechanism that is accommodated in the reaction tube and that promotes a pyrolysis reaction between the carbide and the gasification agent by guiding, in a stepwise manner from the upper end side to the lower end side of the cylindrical member, the carbide supplied from the upper end of the reaction tube.

It is preferable that the pyrolysis promoting mechanism includes a plurality of first inclined plates each forming a first inclined surface which is inclined so as to guide the carbide from one end of the inner circumferential surface of the reaction tube to a first opening portion provided in the other end of the reaction tube, a plurality of second inclined plates each forming a second inclined surface which is inclined so as to guide, from the other end to a second opening portion provided in the one end, the carbide downwardly fallen from the first opening portion by the first inclined plates, and a holding part that holds the plurality of first inclined plates and the plurality of second inclined plates such that the first inclined plates and the second inclined plates are alternately disposed along the axial line, and the holding part is formed of a bar-like member extending along the axial line, and the plurality of first inclined plates and the plurality of second inclined plates are held, at a plurality of positions arranged along the axial line, by the bar-like member. It is more preferable that the pyrolysis promoting mechanism is attachable/detachable to/from the cylindrical member.

In addition, a water gas generation system according to one aspect of the present invention is capable of efficiently generating high-purity water gas. The water gas generation system includes a carbonizing furnace that generates carbide and combustion gas by partial combustion of organic waste, a pyrolytic furnace that generates water gas by heating, with the combustion gas, water steam and the carbide generated by the carbonizing furnace, a steam generator that generates the water steam by heating water with the combustion gas, a steam superheater that superheats, with the combustion gas, the water steam generated by the steam generator and that supplies the heated water steam to the carbonizing furnace, a dryer that dries the organic waste with the combustion gas and that supplies the dried organic waste to the carbonizing furnace, and a combustion gas flow path through which the combustion gas generated by the carbonizing furnace is supplied to the pyrolytic furnace, the combustion gas discharged from the pyrolytic furnace is supplied to the steam superheater, the combustion gas discharged from the steam superheater is supplied to the steam generator, and the combustion gas discharged from the steam generator is supplied to the dryer. It is preferable that the water gas generation system further includes a char recovery apparatus which recoveries the carbide that is unreacted but discharged from the pyrolytic furnace, and supplies the unreacted carbide again to the pyrolytic furnace. It is more preferable that the water gas generation system further includes a combustion gas flow path through which the combustion gas discharged from the dryer is supplied to an exhaust gas cooling/cleaning apparatus that removes harmful substance from the combustion gas discharged from the dryer, to detoxify the combustion gas.

In the water gas generation system, the carbonizing furnace which has the means capable of solving the various inherent problems from which conventional carbonizing furnaces suffer as described above, which achieves high combustion efficiency, that discharges combusted carbide the temperature of which has been appropriately lowered, and which achieves high carbonization efficiency, and the pyrolytic furnace which has the means capable of solving the various inherent problems of conventional pyrolytic furnaces as described above and in which outflow of heating gas to outside is suppressed and a pyrolysis reaction is promoted, are used. Accordingly, water gas with higher purity can be efficiently generated.

A combustion gas supply method for a water gas generation system according to one aspect of the present invention, operates the aforementioned water gas generation system. The supply method is for a water gas generation system including a carbonizing furnace that generates carbide and combustion gas by partial combustion of organic waste, a pyrolytic furnace that generates water gas by heating, with the combustion gas, water steam and the carbide generated by the carbonizing furnace, a steam generator that generates the water steam by heating water with the combustion gas, a steam superheater that superheats, with the combustion gas, the water steam generated by the steam generator and that supplies the superheated water steam to the carbonizing furnace, and a dryer that dries the organic waste with the combustion gas and that supplies the dried organic waste to the carbonizing furnace. The supply method includes a first step of supplying the combustion gas generated by the carbonizing furnace to the pyrolytic furnace, a second step of supplying the combustion gas discharged from the pyrolytic furnace to the steam superheater, a third step of supplying the combustion gas discharged from the steam superheater to the steam generator, and a fourth step of supplying the combustion gas discharged from the steam generator to the dryer. It is more preferable that the supply method further includes a fifth step of supplying the combustion gas discharged from the dryer to an exhaust gas cooling/cleaning apparatus.

As a result of use of high-purity water gas produced by the water gas generation system according to the present invention, high-purity hydrogen gas can be efficiently produced and power can be efficiently generated.

A hydrogen gas generation system according to one aspect of the present invention includes a carbonizing furnace that generates carbide and combustion gas by partial combustion of organic waste, a pyrolytic furnace that generates water gas by heating, with the combustion gas, water steam and the carbide generated by the carbonizing furnace, a steam generator that generates the water steam by heating water with the combustion gas, a steam superheater that superheats, with the combustion gas, the water steam generated by the steam generator and that supplies the heated water steam to the carbonizing furnace, a dryer that dries the organic waste with the combustion gas and that supplies the dried organic waste to the carbonizing furnace, a combustion gas flow path through which the combustion gas generated by the carbonizing furnace is supplied to the pyrolytic furnace, the combustion gas discharged from the pyrolytic furnace is supplied to the steam superheater, the combustion gas discharged from the steam superheater is supplied to the steam generator, and the combustion gas discharged from the steam generator is supplied to the dryer, a cyclone that removes a residue contained in water gas, and a hydrogen purification apparatus that purifies water gas generated by the pyrolytic furnace so as to generate hydrogen. It is more preferable that the hydrogen gas generation system includes a water gas cooling apparatus and a water gas holder that stores water gas.

A power generation system according to one aspect of the present invention includes a carbonizing furnace that generates carbide and combustion gas by partial combustion of organic waste, a pyrolytic furnace that generates water gas by heating, with the combustion gas, water steam and the carbide generated by the carbonizing furnace, a steam generator that generates the water steam by heating water with the combustion gas, a steam superheater that superheats, with the combustion gas, the water steam generated by the steam generator and that supplies the heated water steam to the carbonizing furnace, a dryer that dries the organic waste with the combustion gas and that supplies the dried organic waste to the carbonizing furnace, a combustion gas flow path through which the combustion gas generated by the carbonizing furnace is supplied to the pyrolytic furnace, the combustion gas discharged from the pyrolytic furnace is supplied to the steam superheater, the combustion gas discharged from the steam superheater is supplied to the steam generator, and the combustion gas discharged from the steam generator is supplied to the dryer, a cyclone that removes a residue contained in water gas, and a power generator that operates by using, as fuel, water gas generated by the pyrolytic furnace. It is more preferable that the power generation system further includes a water gas cooling apparatus and a water gas holder that stores water gas. It is preferable that the power generator is a gas engine that operates by combustion of water gas.

Advantageous Effects of Invention

According to the present invention, advantageous effects including those below can be provided.

As the first advantageous effect, the present invention can provide a carbonizing furnace capable of improving the combustion efficiency of combustible gas contained in combustion gas generated by partial combustion of organic waste, and thereby, suppressing a defect given to the carbonizing furnace or devices set downstream therefrom, and can also provide a control method for the carbonizing furnace.

As the second advantageous effect, the present invention can provide a carbonizing furnace capable of discharging carbide obtained by combustion of organic waste such that the carbide is discharged after the temperature thereof is appropriately reduced, and can also provide a control method for the carbonizing furnace.

As the third advantageous effect, the present invention can provide a carbonizing furnace capable of improving the carbonization efficiency of organic waste while supplying external air as air for combustion of organic waste.

As the fourth advantageous effect, the present invention can provide a pyrolytic furnace that includes a reaction tube in which a pyrolysis reaction is caused by heating gas flowing between a body part and the reaction tube and that is capable of suppressing outflow of heating gas to outside from the gap between the upper surface of a body part and the outer circumferential surface of the reaction tube when the reaction tube expands due to heat.

As the fifth advantageous effect, the present invention can provide a pyrolytic furnace capable of suppressing generation of a region where temperature reduction occurs due to an endothermic reaction caused by pyrolysis, while expanding a region where a pyrolytic reaction between carbide and a gasification agent is caused.

As the sixth advantageous effect, the present invention can provide a water gas generation system capable of improving thermal efficiency without using a dedicated heat source for generating water steam to be used as a gasification agent for carbide and of promoting a pyrolysis reaction in the pyrolytic furnace, and can also provide a combustion gas supply method for the water gas generation system. As a result of using at least one of the carbonizing furnaces providing the first, second, and third advantageous effects and the pyrolytic furnace providing the fourth and fifth advantageous effects, the water gas generation system can highly efficiently generate water gas with higher purity. Although the type of organic waste and the cost for the system should be taken into consideration, the present invention can provide an industrially practicable water gas generation system that handles all types of organic waste, by adopting the carbonizing furnace and the pyrolytic furnace that provide all the first to fifth advantageous effects.

As the seventh advantageous effect, the present invention can configure a hydrogen gas generation system capable of highly efficiently producing, by using a general hydrogen purification apparatus, high-purity hydrogen gas, which is expected as renewable clean energy, from biomass which is permanently usable and reusable, without causing environmental destruction, because the water gas generation system according to the present invention efficiently generates high-purity water gas which does not discharge harmful substance.

As the eighth advantageous effect, as in the hydrogen gas generation system according to the present invention, the power generation system of the present invention can efficiently provide electric energy with a general power generator, by using, as fuel, water gas generated from biomass.

BRIEF DESCRIPTION OF DRAWINGS

FIG. 4 is a diagram illustrating a clinker crusher illustrated in FIG. 3, in which FIG. 4(a) is a plan view and FIG. 4(b) is an end view along arrows C-C in FIG. 4(a).

FIG. 5 is an end view of the carbonizing furnace illustrated in FIG. 2, in which FIG. 5(a) is an end view along arrows A-A and FIG. 5(b) is an end view along arrows B-B.

FIG. 11 is a cross-sectional view of a reaction tube of the pyrolytic furnace illustrated in FIG. 10, in which FIG. 11(a) is an end view along arrows D-D and FIG. 11(b) is an end view along arrows E-E.

DESCRIPTION OF EMBODIMENTS

Hereinafter, a water gas generation system 100 of an embodiment of the present invention is described with reference to the drawings.

The water gas generation system 100 of the present embodiment generates water gas (mixture gas containing, as the main components, hydrogen gas, carbon monoxide gas, and carbon dioxide gas) by carbonizing organic waste, which is carbon-containing waste, to generate carbide, and then causing a pyrolysis reaction of the carbide by using superheated water steam (hereinafter, also referred to as "steam") as a gasification agent.

Organic waste is food waste, construction waste, shredder dust, livestock waste, wood waste such as thinned wood material or pruned branches, sludge or general waste which is discharged from households. Various types of organic waste including the aforementioned types may be used as a raw material for generation of water gas. However, wood waste (referred to as "woody biomass" in some cases) is particularly favorable to use.

Figure 1:
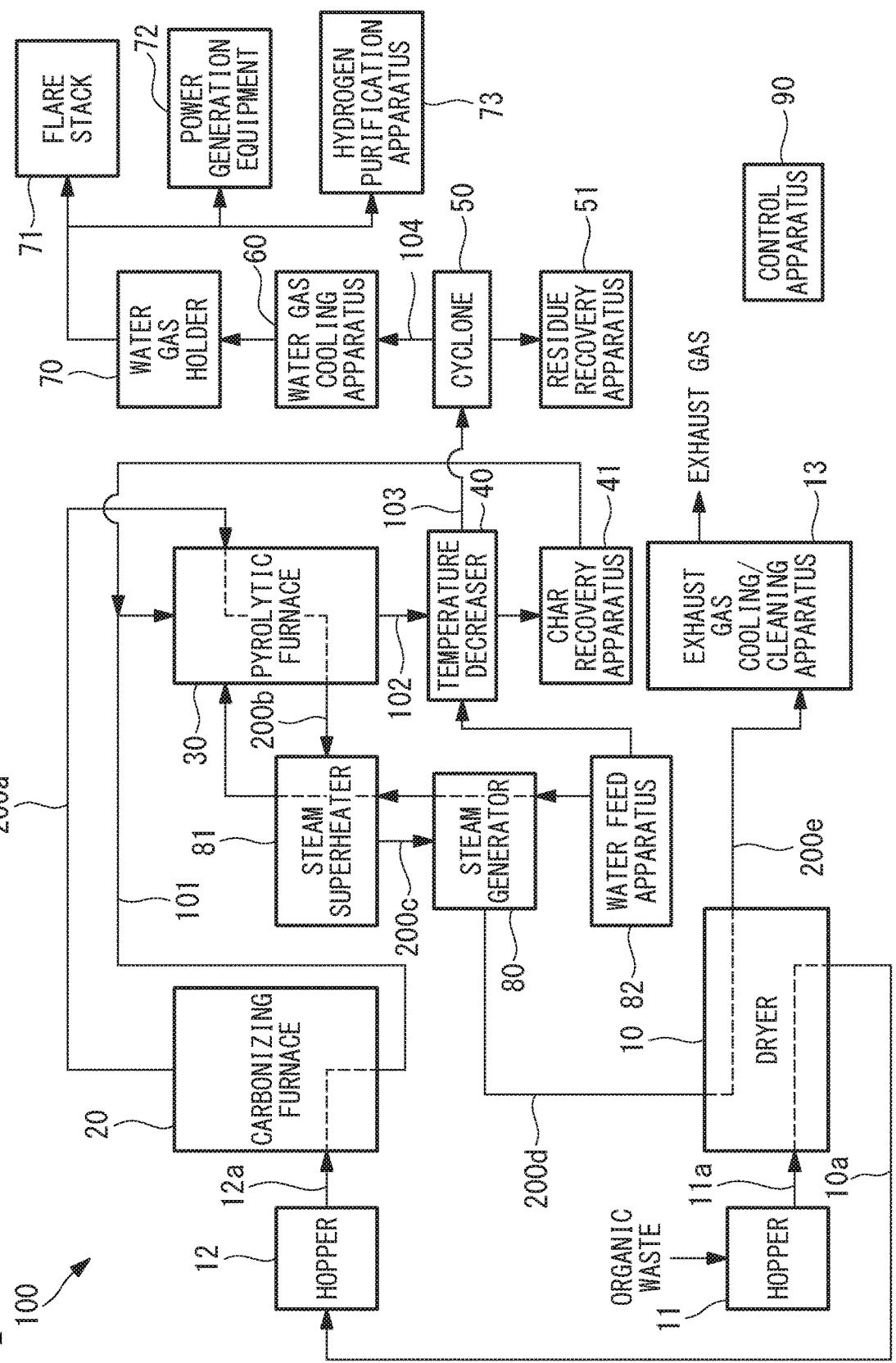
FIG. 1 is an entire configuration diagram illustrating an embodiment of a water gas generation system, a hydrogen gas generation system, and a power generation system.

As illustrated in the entire configuration diagram in FIG. 1, the water gas generation system 100 includes a dryer 10 which dries organic waste, a hopper 11 which stores organic waste to be charged into the dryer 10, a hopper 12 which stores organic waste dried by the dryer 10, a carbonizing furnace 20 which generates carbide from dried organic waste, a pyrolytic furnace 30 in which a pyrolysis reaction of carbide generated by the carbonizing furnace 20 with a gasification agent is caused, a temperature decreaser 40 which cools water gas generated by the pyrolytic furnace 30, a char recovery apparatus 41 which recovers uncombusted carbide discharged from the carbonizing furnace 20, a cyclone 50 which removes a residue from water gas supplied from the temperature decreaser 40, and a residue recovery apparatus 51 which recovers a residue removed by the cyclone 50.

The water gas generation system 100 further includes a water gas cooling apparatus 60 which cools water gas from which a residue has been removed by the cyclone 50, a water gas holder 70 which stores water gas having been cooled by the water gas cooling apparatus 60, a flare stack 71 which performs incineration treatment on surplus water gas, etc., a power generation equipment 72 which generates power by using water gas as fuel, a hydrogen purification apparatus 73 which purifies water gas to generate hydrogen gas, a steam generator 80 which generates saturated steam from water, a steam superheater 81 which superheats steam generated by the steam generator 80, a water feed apparatus 82 which supplies water to the steam generator 80, and a control apparatus 90 which controls the entire water gas generation system 100.

Hereinafter, components included in the water gas generation system 100 are described.

The dryer 10 dries organic waste by using combustion gas, and supplies dried organic waste to the carbonizing furnace 20. Organic waste is supplied from the hopper 11, which stores therein organic waste, to the dryer 10 through a raw material supply path 11a. In addition, combustion gas discharged from the steam generator 80 is supplied, as a heat source for drying organic waste, to the dryer 10 through a combustion gas flow path 200d.

Organic waste to be supplied from the hopper 11 to the dryer 10 is woody chips each having a length of 5 mm or more and 60 mm or less, for example. Organic waste containing moisture at a weight ratio of approximately 55%, for example, is used. The dryer 10 heats and dries woody chips containing moisture at a weight ratio of approximately 55%, so that the weight ratio of moisture contained in organic waste is reduced to approximately 15%.

The dryer 10 supplies organic waste that has been dried by heat of combustion gas, to the hopper 12 through a raw material supply path 10a. Further, the dryer 10 supplies combustion gas that has been used as a heat source for drying organic waste, to an exhaust gas cooling/cleaning apparatus 13 through a combustion gas flow path 200e. The temperature of combustion gas to be supplied from the dryer 10 to the exhaust gas cooling/cleaning apparatus 13 is adjusted to 150° C. or higher and 210° C. or lower.

The exhaust gas cooling/cleaning apparatus 13 detoxifies combustion gas by removing harmful substances such as sulfur oxides ($SO_x$), sulfuric acids ($H_2SO_4$), and hydrochloric acids (HCl) which are contained in the combustion gas. The exhaust gas cooling/cleaning apparatus 13 cools combustion gas from which harmful substances have been removed (the exhaust gas), during detoxification, and thereafter, discharges the cooled combustion gas to the atmosphere. The exhaust gas cooling/cleaning apparatus 13 is a scrubber, for example, and adjusts the temperature of combustion gas to be discharged to the atmosphere, to 120° C. or higher 180° C. or lower.

The carbonizing furnace 20 generates carbide and combustion gas by partial combustion of dried organic waste. Dried organic waste is supplied from the hopper 12, which stores therein organic waste, to the carbonizing furnace 20 through a raw material supply path 12a. The carbonizing furnace 20 supplies carbide generated by combustion of organic waste to the pyrolytic furnace 30 through a carbide supply path 101. Further, the carbonizing furnace 20 supplies combustion gas generated by combustion of organic waste to the pyrolytic furnace 30 through a combustion gas flow path 200a.

The pyrolytic furnace 30 heats carbide generated by the carbonizing furnace 20, together with superheated steam by using combustion gas, causes a pyrolysis reaction of the carbide, and thereby, generates water gas. Carbide generated by the carbonizing furnace 20 is supplied to the pyrolytic furnace 30 through the carbide supply path 101. Furthermore, superheated steam generated by the steam superheater 81 is supplied, as a gasification agent, to the pyrolytic furnace 30. Moreover, combustion gas is supplied, as a heat source for promoting a pyrolysis reaction, to the pyrolytic furnace 30 through the combustion gas flow path 200a.

The pyrolytic furnace 30 generates water gas, which contains hydrogen gas, carbon monoxide gas, and carbon dioxide gas as the main components, by causing a pyrolysis reaction between carbide and superheated steam. A pyrolysis reaction between carbide and superheated steam is mainly expressed by equations (1) and (2) below. A water gas reaction expressed by equation (1) is an endothermic reaction. A water gas shift reaction expressed by equation (2) is an exothermic reaction. The endothermic amount in the endothermic reaction expressed by equation (1) is greater than the exothermic amount in the endothermic reaction expressed by equation (2). For this reason, a pyrolysis reaction between carbide and superheated steam results, as a whole, in an endothermic reaction.

$$C+H_2O \rightarrow CO+H_2 \quad (1)$$

$$CO+H_2O \rightarrow CO_2+H_2 \quad (2)$$

The temperature of carbide to be supplied to the pyrolytic furnace 30 is adjusted to an ordinary temperature (for example, 25° C.) or higher and 350° C. or lower. Furthermore, the temperature of superheated steam to be supplied to the pyrolytic furnace 30 is adjusted to 730° C. or higher and 830° C. or lower. Moreover, the temperature of combustion gas to be supplied to the pyrolytic furnace 30 is adjusted to 900° C. or higher and 1300° C. or lower. Furthermore, the temperature of water gas generated by the pyrolytic furnace 30 is adjusted to 650° C. or higher and 850° C. or lower.

The pyrolytic furnace 30 supplies, to the temperature decreaser 40 through a water gas supply path 102, a residue, unreacted carbide, and water gas generated by a pyrolysis reaction. Further, the pyrolytic furnace 30 supplies combustion gas that has been used as a heat source for a pyrolysis reaction, to the steam superheater 81 through a combustion gas flow path 200b. The temperature of combustion gas to be supplied to the steam superheater 81 is adjusted to 820° C. or higher and 920° C. or lower.

The temperature decreaser 40 decreases the temperature of water gas supplied from the water gas supply path 102, by spraying water which is liquid. Water is supplied from the water feed apparatus 82 to the temperature reducer 40 via a water feed pump (not illustrated). The temperature reducer 40 supplies water gas the temperature of which has been reduced, to the cyclone 50 through a water gas supply path 103. In addition, the temperature decreaser 40 supplies to the char recovery apparatus 41 unreacted carbide and a residue supplied through the water gas supply path 102. The temperature decreaser 40 adjusts the spray amount of water such that the temperature of water gas, which has been adjusted to 650° C. or higher and 850° C. or lower by the pyrolytic furnace 30, to 220° C. or higher and 280° C. or lower.

The char recovery apparatus 41 recovers unreacted carbide and supplies the unreacted carbide to the pyrolytic furnace 30 again. As a result of providing the char recovery apparatus 41, a case where unreacted carbide is discarded without being used for generation of water gas, is avoided. Accordingly, as a result of providing the char recovery apparatus 41, the yield of water gas from carbide is improved.

The cyclone 50 removes a residue included in water gas supplied through the water gas supply path 103. The cyclone 50 separates, by means of a centrifugal force, a residue included in water gas supplied through the water gas supply path 103, by causing the water gas to swirl in the cyclone 50, and guides the separated residue downwardly so as to be supplied to the residue recovery apparatus 51. Further, the cyclone 50 guides water gas, from which a residue has been removed, upwardly so as to be supplied to the water gas cooling apparatus 60 through a water gas supply path 104.

The water gas cooling apparatus 60 reduces the temperature of water gas supplied through the water gas supply path 104, by spraying water which is liquid. The water gas cooling apparatus 60 recovers cooling water which has been sprayed into water gas, and circulates the cooling water via a circulation pump (not illustrated) so as to be sprayed into water gas again.

The water gas cooling apparatus 60 supplies cooled water gas to the water gas holder 70. The water gas cooling apparatus 60 includes a temperature sensor (not illustrated) configured to detect the temperature of water gas to be supplied to the water gas holder 70, and controls the amount of cooling water to be circulated via the circulation pump (not illustrated) such that the detected temperature becomes equal to a target temperature. The water gas cooling apparatus 60 adjusts a spray amount of water such that the temperature of water gas, which has been adjusted to 220° C. or higher and 280° C. or lower by the temperature decreaser 40, becomes 30° C. or higher and 50° C. or lower.

The water gas holder 70 stores water gas supplied from the water gas cooling apparatus 60. The water gas holder 70 is capable of supplying stored water gas to the flare stack 71, the power generation equipment 72, and the hydrogen purification apparatus 73, separately.

The flare stack 71 performs incineration treatment when surplus water gas is generated, for example, when the storage amount in the water gas holder 70 becomes excessive. In the flare stack 71, combustion is constantly conducted by using fuel such as liquefied natural gas. Accordingly, when water gas is supplied to the flare stack 71, incineration treatment is performed on the water gas.

The power generation equipment 72 drives a power generator by operating with water gas as fuel, and thereby, obtains power generation output. As a power source by which the power generation equipment 72 drives the power generator, a gas engine configured to operate by combustion of water gas is used, for example. However, the power source is not limited thereto.

The hydrogen purification apparatus 73 purifies water gas to obtain hydrogen gas with a high purity (for example, hydrogen gas with a purity of 99.995% or higher) by removing components such as carbon monoxide gas and carbon dioxide gas contained in the water gas. For example, the hydrogen purification apparatus 73 purifies water gas to obtain hydrogen gas with a high purity by pressurizing the water gas to a predetermined pressure with a compressor (not illustrated), and supplying the pressurized water gas to an adsorbent tower (not illustrated) which is filled with adsorbent (that is suitable to remove components such as carbon monoxide gas and carbon dioxide gas) such that the adsorbent adsorbs and removes components such as carbon monoxide gas and carbon dioxide gas. After completion of the adsorption, the adsorbent tower of the hydrogen purification apparatus 73 is depressurized, and accordingly, components such as carbon monoxide gas and carbon dioxide gas are desorbed. Hydrogen can be obtained through purification and be delivered continuously by using a plurality of adsorbent towers alternately. As the hydrogen purification apparatus 73, a hydrogen purification module using a palladium alloy film which does not allow transmission of any substance other than hydrogen may be used.

The steam generator 80 generates saturated water steam by heating water with combustion gas so as to vaporize the water. Water is supplied from the water feed apparatus 82 to the steam generator 80 via a water feed pump (not illustrated). In addition, combustion gas discharged from the steam superheater 81 is supplied to the steam generator 80 through a combustion gas flow path 200c. The temperature of combustion gas to be supplied to the steam generator 80 is adjusted to 750° C. or higher and 850° C. or lower.

Saturated water steam generated by the steam generator 80 is supplied to the steam superheater 81. In addition, combustion gas that has been used as a heat source for vaporizing water in the steam generator 80 is supplied to the dryer 10 through the combustion gas flow path 200d. The temperature of combustion gas to be supplied to the dryer 10 is adjusted to 540° C. or higher and 640° C. or lower.

The steam superheater 81 generates superheated steam from saturated water steam by heating the saturated water steam with combustion gas. Saturated water steam generated by the steam generator 80 is supplied to the steam superheater 81. In addition, combustion gas discharged from the pyrolytic furnace 30 is supplied to the steam superheater 81 through the combustion gas flow path 200b. The temperature of combustion gas to be supplied to the steam superheater 81 is adjusted to 820° C. or higher and 920° C. or lower. Superheated steam generated by the steam superheater 81 is supplied, as a gasification agent, to the pyrolytic furnace 30. In addition, combustion gas that has been used as a heat source for generating superheated steam in the steam superheater 81 is supplied to the steam generator 80 through the combustion gas flow path 200c.

The control apparatus 90 controls the water gas generation system 100. The control apparatus 90 can communicate with respective control units (not illustrated) provided to the components included in the water gas generation system 100. The control apparatus 90 is configured to control the components included in the water gas generation system 100 by transmitting control commands to the respective control units provided to the components. Further, the control apparatus 90 can receive, from the components included in the water gas generation system 100, signals indicating the statuses including the temperatures or pressures of the components. The control apparatus 90 can cause the components included in the water gas generation system 100 to perform desired operations, by reading out and executing a control program stored in a storage unit (not illustrated).

In the water gas generation system 100 illustrated in FIG. 1, combustion gas generated by the carbonizing furnace 20 flows through a combustion gas flow path formed of the combustion gas flow paths 200a, 200b, 200c, 200d, and 200e, in the following manner. First, combustion gas generated by the carbonizing furnace 20 is supplied to the pyrolytic furnace 30 through the combustion gas flow path 200a. Second, combustion gas discharged from the pyrolytic furnace 30 is supplied to the steam superheater 81 through the combustion gas flow path 200b. Third, combustion gas discharged from the steam superheater 81 is supplied to the steam generator 80 through the combustion gas flow path 200c. Fourth, combustion gas discharged from the steam generator 80 is supplied to the dryer 10 through the combustion gas flow path 200d. Fifth, combustion gas discharged from the dryer 10 is supplied to the exhaust gas cooling/cleaning apparatus 13 through the combustion gas flow path 200e. Sixth, combustion gas detoxified by the exhaust gas cooling/cleaning apparatus 13 is discharged into the atmosphere by the exhaust gas cooling/cleaning apparatus 13.

Here, combustion gas generated by the carbonizing furnace 20 is supplied to the pyrolytic furnace 30 without exchanging heat with any other heat medium, such that combustion gas which is kept at high temperature is used to promote a pyrolysis reaction in the pyrolytic furnace 30 so as to improve the yield of water gas from carbide. The temperature in the pyrolytic furnace 30 in this case can be kept at higher temperature, compared with a case where combustion gas generated by the carbonizing furnace 20 is supplied to the pyrolytic furnace 30 after exchanging heat with another heat medium. Accordingly, a pyrolysis reaction is promoted so that the yield of water gas from carbide is improved.

Next, the carbonizing furnace 20 of the present embodiment is described in detail with reference to FIGS. 2 to 5.

Figure 2:
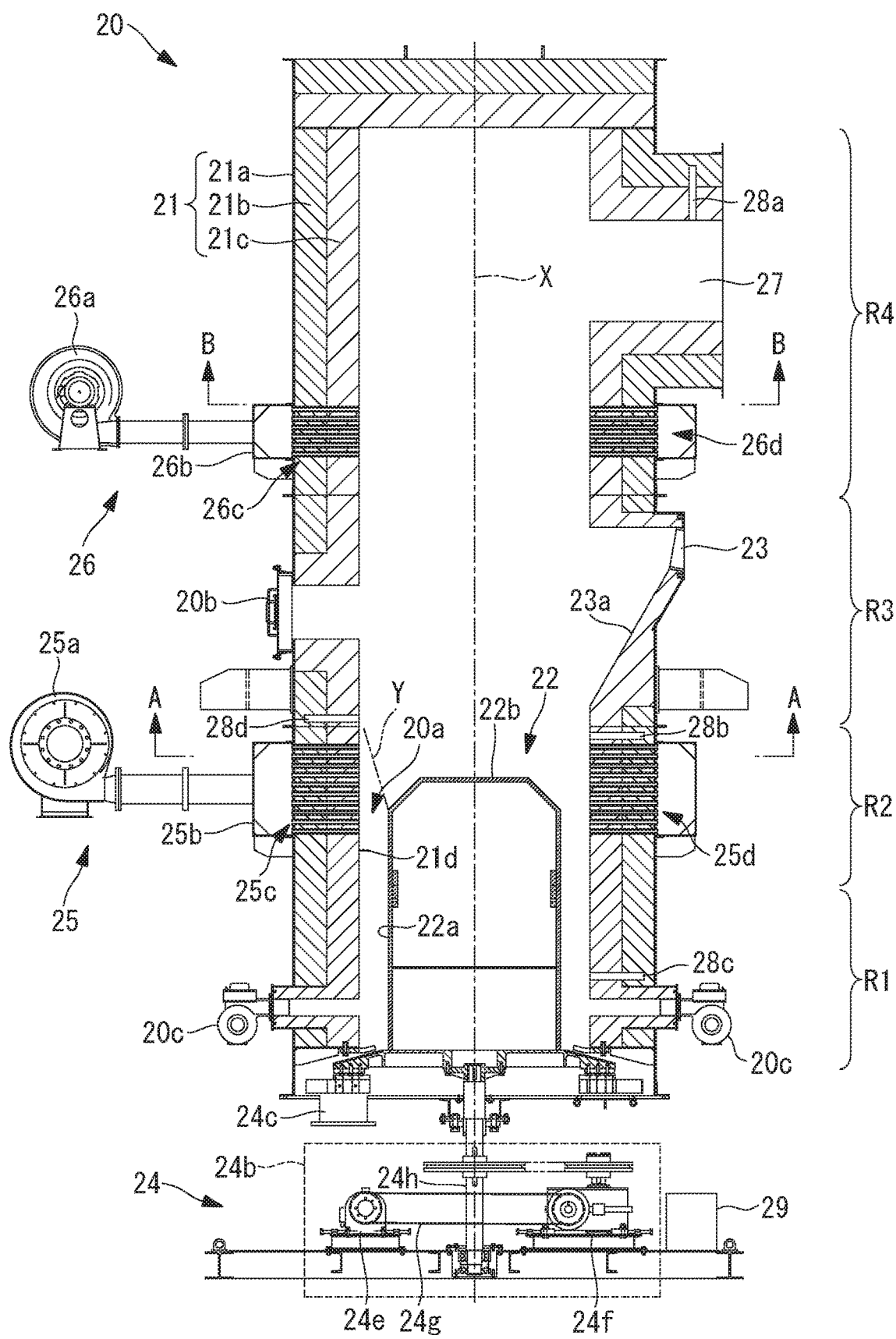
FIG. 2 is a longitudinal cross-sectional view of the carbonizing furnace illustrated in FIG. 1.

FIG. 2 is a longitudinal cross-sectional view of the carbonizing furnace 20 illustrated in FIG. 1. In FIG. 2, an axial line X represents a vertical direction (the gravity direction) that is orthogonal to an installation surface (not illustrated) on which the carbonizing furnace 20 is installed.

As illustrated in FIG. 2, the carbonizing furnace 20 of the present embodiment includes a body part 21, a cylindrical part 22 (a cylindrical part), an organic waste charge portion 23 (a charge portion), a carbide discharge unit 24, a primary air supply unit 25, a secondary air supply unit 26, a combustion gas discharge portion 27, a temperature sensor 28a (a temperature detection unit), a temperature sensor 28b (a temperature detection unit), a temperature sensor 28c (a temperature detection unit), a level sensor 28d (an deposit amount detection unit), ignition burners 20c, and a carbonizing furnace control unit 29 (a control unit).

The body part 21 is formed into a substantially cylindrical shape extending along the axial line X, and is an exterior member of the carbonizing furnace 20. In the body part 21, a primary combustion region R2 in which partial combustion of organic waste is performed and a secondary combustion region R4 in which combustion of combustible gas contained in combustion gas generated from organic waste is performed are formed. The body part 21 includes a metallic (for example, iron-made) housing 21a forming the exterior of the carbonizing furnace 20, a heat insulating material 21b attached on the inner circumferential surface of the housing 21a, and a refractory material 21c attached on the inner circumferential surface of the heat insulating material 21b.

A cylindrical part 22 is a member formed into a substantially cylindrical shape extending along the axial line X. The cylindrical part 22 has an outer circumferential surface 22a forming, relative to an inner circumferential surface 21d of the body part 21, a gap 20a in which carbide is generated by combustion of organic waste. The cylindrical part 22 is preferably made from heat-resistant material (for example, metal material such as stainless material) because the temperature therein becomes high during combustion of organic waste. As illustrated in FIG. 2, the inside of the cylindrical part 22 is a closed hollow space. The closed space is not connected to any other space. Accordingly, a certain amount of heat can be stored in the cylindrical part 22, and the cylindrical part 22 is less susceptible to an external temperature change.

The cylindrical part 22 is mounted on a turntable 24a (described later), and is configured to rotate about the axial line X according to rotation of the turntable 24a about the axial line X. Through rotation of the cylindrical part 22 about the axial line X, organic waste in and above the gap 20a is guided downwardly along the gap 20a.

Organic waste supplied into the gap 20a is partially burned, in the primary combustion region R2, with primary combustion air which is supplied from the primary air supply unit 25, so that solid substance containing much carbide and combustion gas containing combustible gas are generated. The solid substance containing much carbide is downwardly guided, along the gap 20a, to a carbide refining/cooling region R1. The combustion gas containing combustible gas is guided to a secondary combustion region R4. The upper side of the carbide refining/cooling region R1 is covered with organic waste, and primary combustion air from the primary air supply unit 25 is not supplied to the carbide refining/cooling region R1. Accordingly, carbide is cooled and refined in the carbide refining/cooling region R1.

The organic waste charge portion 23 is an opening portion which is provided in the body part 21 and through which organic waste (not illustrated) supplied from the hopper 12 through the raw material supply path 12a is charged into the body part 21. At the lower side of the organic waste charge portion 23, an inclined surface 23a is formed so as to be inclined downwardly toward the axial line X. Organic waste supplied from the organic waste charge portion 23 is guided, along the inclined surface 23a, to an upper surface 22b of the cylindrical part 22 and the gap 20a.

As illustrated in FIG. 2, a region in which the organic waste charge portion 23 is disposed is a raw material charging region R3. In the raw material charging region R3, a check window 20b is disposed on a side opposite to the organic waste charge portion 23 side with respect to the axial line X. Through the check window 20b, the inside of the carbonizing furnace 20 is visible.

Figure 4:
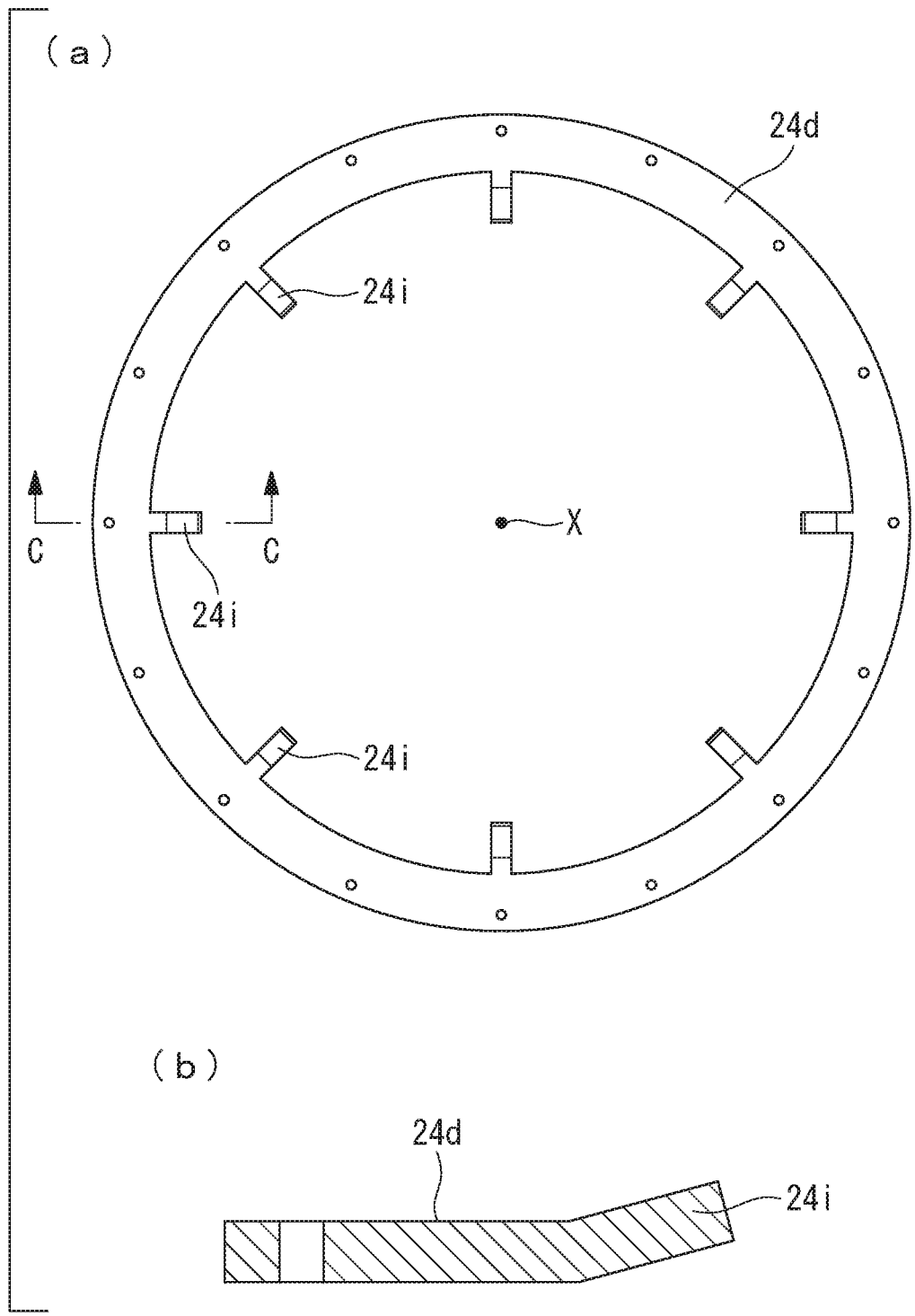

The carbide discharge unit 24 is a mechanism that discharges, to the carbide supply path 101, carbide generated by partial combustion of organic waste in the gap 20a. Carbide discharged from the carbide discharge unit 24 to the carbide supply path 101, is supplied to the pyrolytic furnace 30. As illustrated in FIGS. 2 and 4, the carbide discharge unit 24 includes the turntable 24a (a rotary body), a driving unit 24b, and a carbide discharge port 24c.

Figure 3:
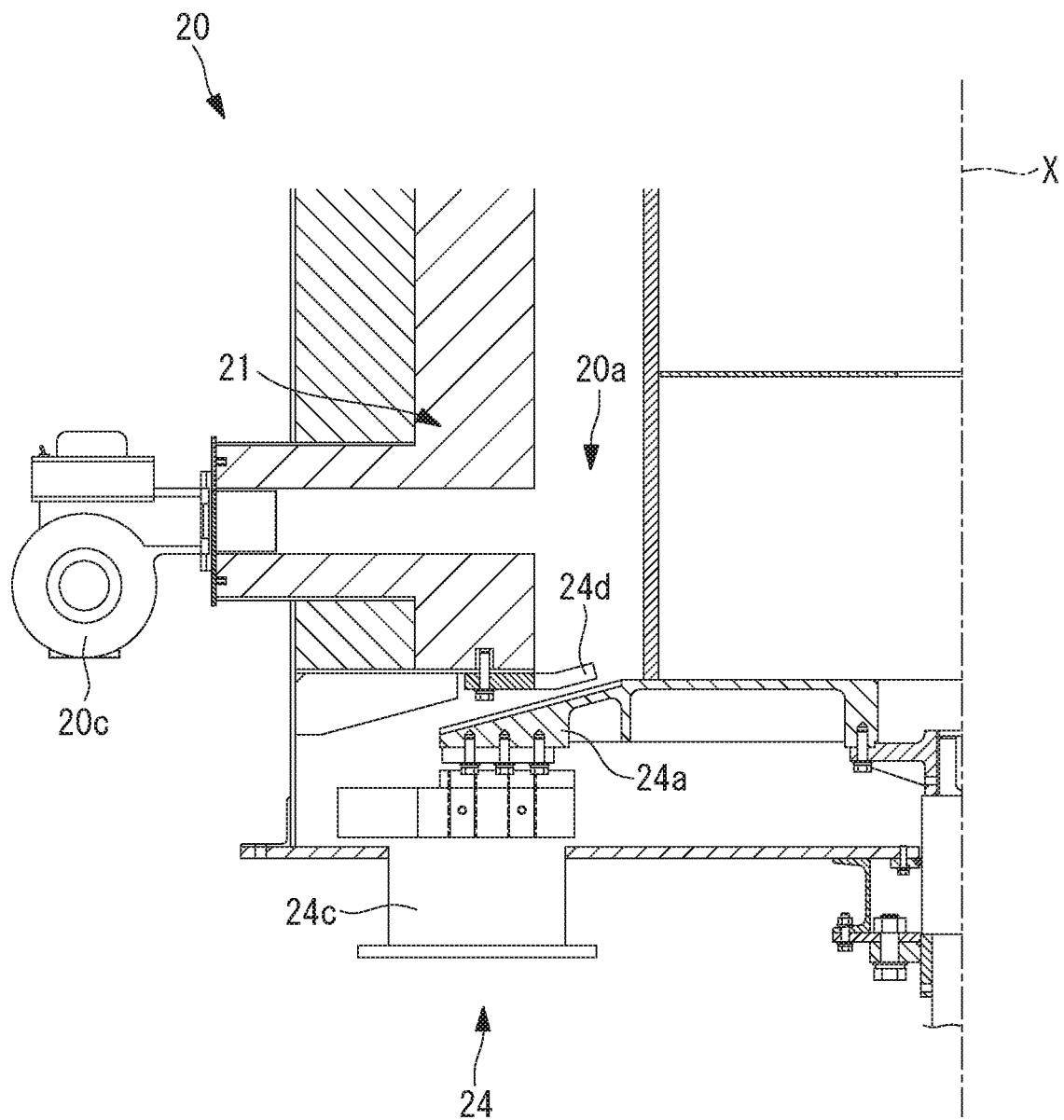
FIG. 3 is an enlarged diagram of a main part of the carbonizing furnace illustrated in FIG. 2.

As illustrated in FIG. 3, the turntable 24a is a member disposed at a position opposed to the lower end, in the axial line X, of the gap 20a, and is an annular rotary body extending in the circumferential direction around the axial line X. The turntable 24a rotates about the axial line X by a driving force transmitted from the driving unit 24b. As illustrated in FIG. 3, a surface of the turntable 24a facing the lower end of the gap 20a is inclined downwardly away from the axial line X. Accordingly, a space is formed between the lower end of the gap 20a and the inclined surface of the turntable 24a.

According to rotation of the turntable 24a about the axial line X, carbide (not illustrated) existing in the lower end of the gap 20a is moved downwardly along the inclined surface of the turntable 24a to the carbide discharge port 24c. Thus, when the rotational speed of the turntable 24a increases, the amount of carbide guided from the lower end of the gap 20a to the carbide discharge port 24c accordingly increases. Similarly, when the rotational speed of the turntable 24a decreases, the amount of carbide guided from the lower end of the gap 20a to the carbide discharge port 24c accordingly decreases.

The driving unit 24b transmits a driving force to the turntable 24a to rotate the turntable 24a about the axial line X. As illustrated in FIG. 2, the driving unit 24b includes a driving motor 24e, a speed reducer 24f, a driving belt 24g, and a driving shaft 24h.

The driving motor 24e is an inverter motor the rotational speed of which is controlled by a control signal transmitted from the carbonizing furnace control unit 29. The rotational power of the driving motor 24e is transmitted to the speed reducer 24f via the driving belt 24g. The speed reducer 24f increases torque while reducing of the rotational speed of the rotational power transmitted from the driving motor 24e via the driving belt 24g. The speed reducer 24f transmits the rotational power with the increased torque, to the driving shaft 24*h* extending around the axial line X. The turntable 24*a* is connected to the driving shaft 24*h*. Thus, rotation of the driving shaft 24*h* about the axial line X causes rotation of the turntable 24*a* about the axial line X.

The carbide discharge port 24*c* is an opening portion through which carbide is discharged to the carbide supply path 101. Carbide discharged from the carbide discharge port 24*c* to the carbide supply path 101 is supplied to the pyrolytic furnace 30 through the carbide supply path 101.

A clinker crusher 24*d* crushes clinkers that are lumps larger than the space formed between the lower end of the gap 20*a* and the inclined surface of the turntable 24*a*. Here, combustion ash generated as a result of combustion of organic waste in the primary combustion region R2 is melted to form lumps, which are clinkers. As illustrated in FIG. 4(*a*), the clinker crusher 24*d* is a substantially annular member disposed around the axial line X, and is provided with claws 24*i*, at a plurality of positions in the circumferential direction of the clinker crusher 24*d*, protruding radially inward. As illustrated in FIG. 4(*b*) (an end view along arrows C-C in FIG. 4(*a*)), each of the claws 24*i* has a shape bent upward along the inclined surface of the turntable 24*a*.

As illustrated in FIG. 3, the clinker crusher 24*d* is attached on the body part 21 with fastening bolts. The clinker crusher 24*d* remains fixed to the body part 21 even when the turntable 24*a* rotates about the axial line X. When clinkers are moved by rotation of the turntable 24*a*, the clinkers collide against the claw 24*i* and are crushed.

Next, the primary air supply unit 25 is described. The primary air supply unit 25 supplies, toward organic waste accumulated in the gap 20*a*, primary combustion air for partial combustion of organic waste. The primary air supply unit 25 includes a primary combustion fan 25*a* (an air blowing unit), a cover portion 25*b*, and air supply ports 25*c*.

The primary combustion fan 25*a* sends externally introduced air (the atmosphere), and includes an inverter motor (not illustrated) and a fan (not illustrated) that is driven by the inverter motor. The primary combustion fan 25*a* can adjust the amount of air to be sent, by controlling the rotational speed of the inverter motor.

Figure 5:
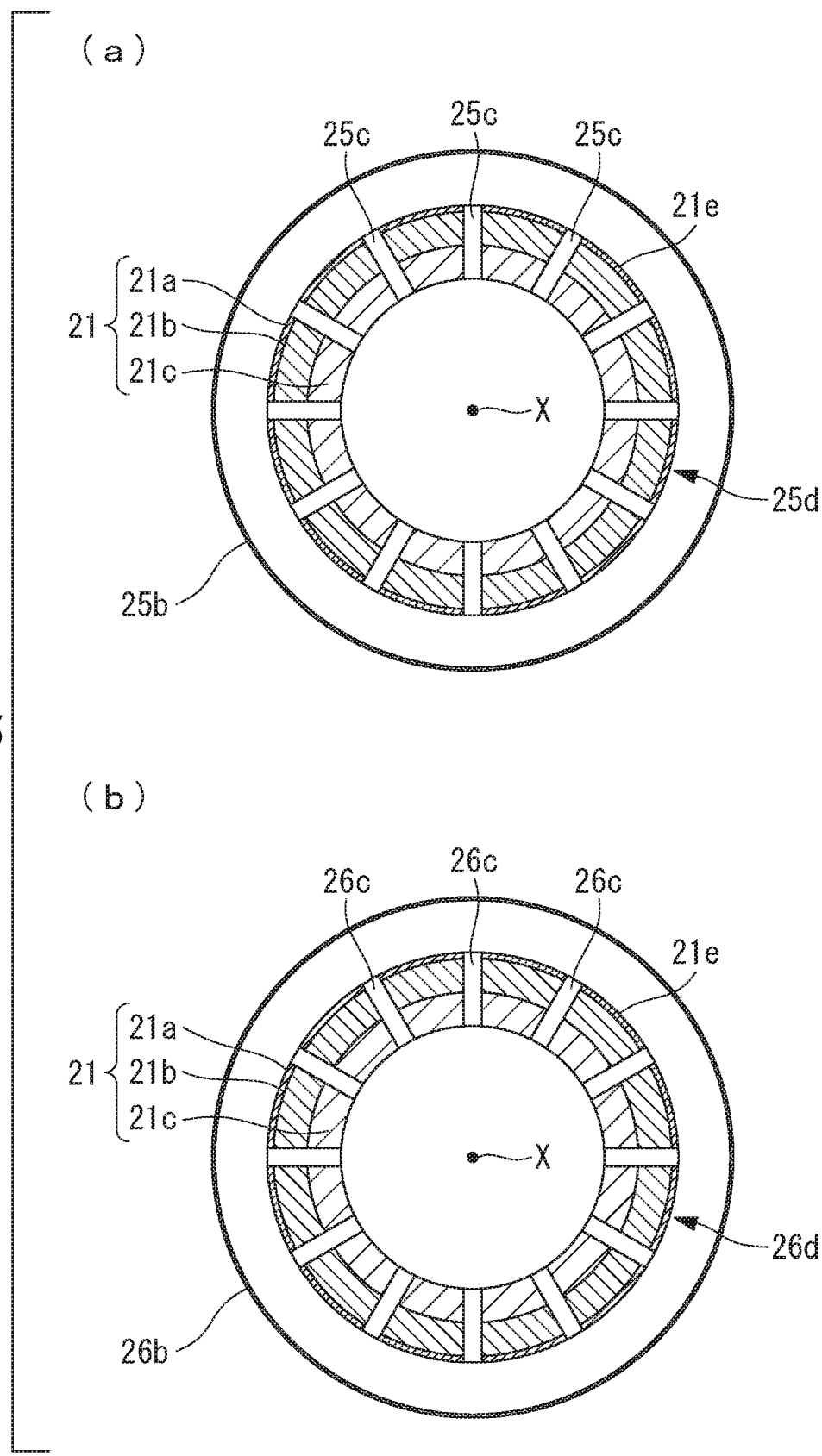

The cover portion 25*b* is a member forming a closed space 25*d* into which air sent from the primary combustion fan 25*a* is introduced and which supplies air to the air supply ports 25*c*. As illustrated in FIG. 5(*a*) (an end view of the carbonizing furnace 20 along arrows A-A in FIG. 2), the closed space 25*d* extending around the axial line X is formed between the cover portion 25*b* and an outer circumferential surface 21*e* of the body part 21.

The air supply ports 25*c* are flow paths through which air sent from the primary combustion fan 25*a* to the closed space 25*d* is supplied from the closed space 25*d* to the primary combustion region R2 in the body part 21. As illustrated in FIG. 2, in the primary combustion region R2 in which organic waste is partially burned with primary combustion air, the air supply ports 25*c* are disposed at a plurality of positions in the vertical direction along the axial line X.

Further, as illustrated in FIG. 5(*a*), the air supply ports 25*c* are provided, in the body part 21, at equal intervals (in FIG. 5(*a*), at intervals of 30°) in the circumferential direction around the axial line X. Moreover, as illustrated in FIG. 5(*a*), the air supply ports 25*c* are linear flow paths each extending from the outer circumferential surface 21*e* of the body part 21 toward the axial line X. In the embodiment illustrated in FIG. 5(*a*), the air supply ports 25*c* are disposed at intervals of 30° in the circumferential direction around the axial line X. Alternatively, the air supply ports 25*c* may be disposed at other intervals (for example, intervals of 20° or 45°, etc.), or at arbitrary intervals which are not equal to each other.

The primary air supply unit 25 illustrated in FIG. 2 includes a heating unit (not illustrated) that heats air sent from the primary combustion fan 25*a*. The primary air supply unit 25 supply air heated by the heating unit to the air supply ports 25*c*. Thus, compared with a case where air sent from the primary combustion fan 25*a* is not heated, the atmospheric temperature of the primary combustion region R2 in this case can be kept at higher temperature.

Figure 6:
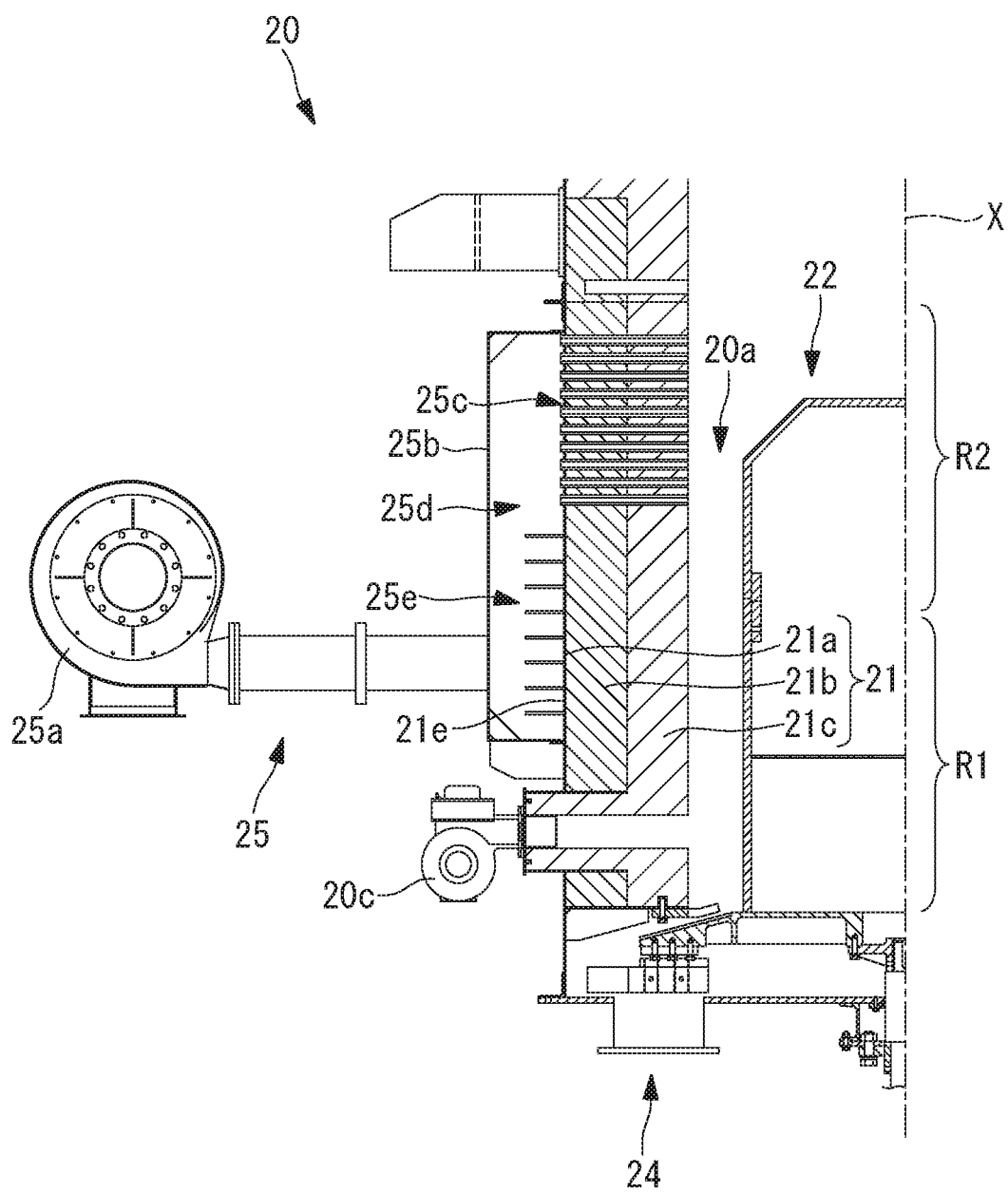
FIG. 6 is a longitudinal cross-sectional view of a first modification of a primary air supply unit of the carbonizing furnace.
Figure 7:
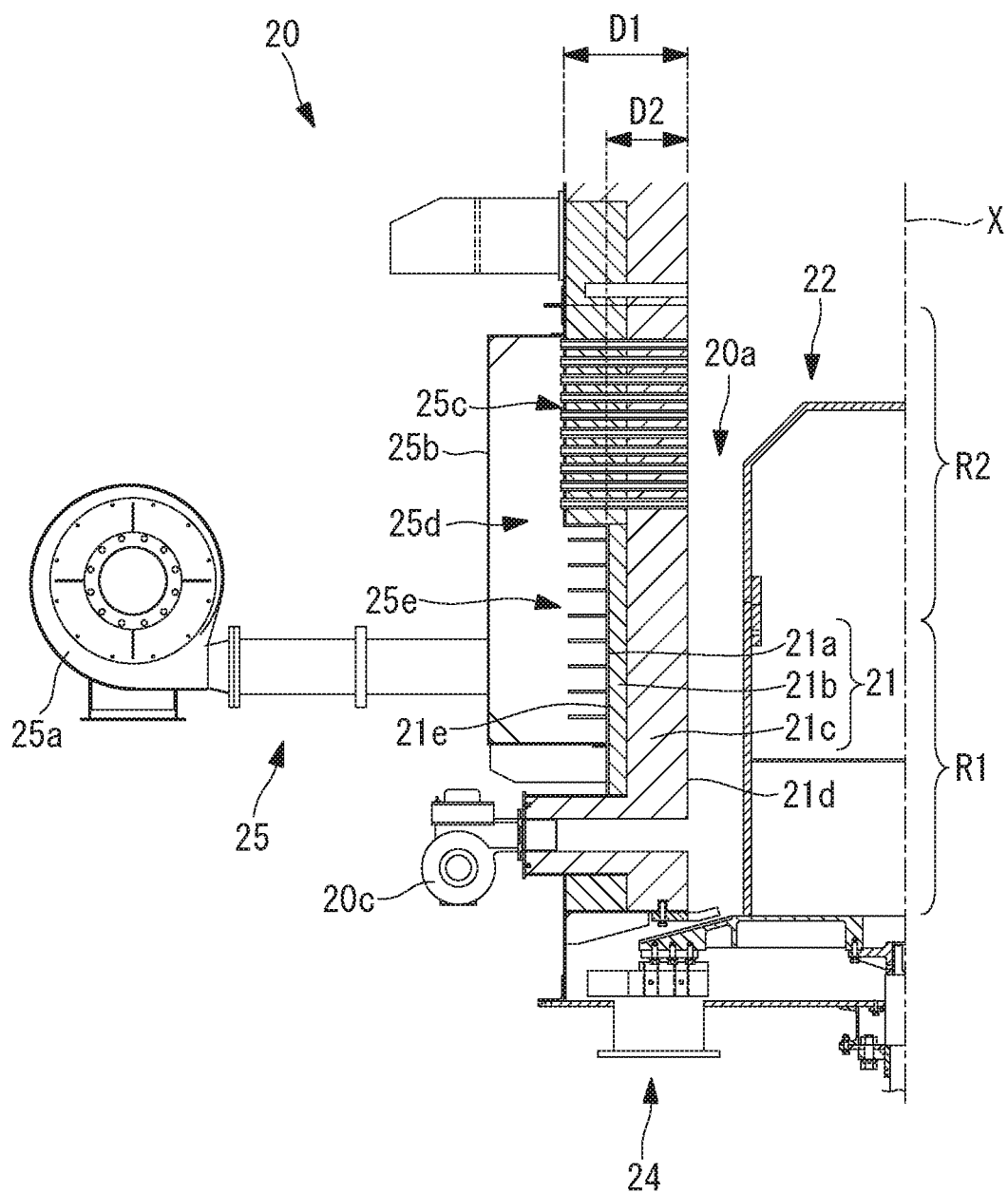
FIG. 7 is a longitudinal cross-sectional view of a second modification of the primary air supply unit of the carbonizing furnace.

As the heating unit included in the primary air supply unit 25, heat dissipation fins 25*e* illustrated in FIGS. 6 and 7 may be adopted. Modifications of the primary air supply unit 25, which are illustrated in FIGS. 6 and 7, each include the heat dissipation fins 25*e* that heat air sent from the primary combustion fan 25*a* by using heat transmitted from the gap 20*a* of the carbonizing furnace 20 via the body part 21. As illustrated in FIGS. 6 and 7, the heat dissipation fins 25*e* are annular members which are in contact with the outer circumferential surface 21*e* of the body part 21 and which extend along the outer circumferential surface 21*e* around the axial line X. The heat dissipation fins 25*e* are disposed at plurality of positions along the axial line X. The heat dissipation fins 25*e* are attached on the outer circumferential surface 21*e* of the body part 21 by welding, etc.

FIG. 6 is a longitudinal cross-sectional view illustrating a first modification of the primary air supply unit 25. The cover portion 25*b* of the primary air supply unit 25 illustrated in FIG. 2 is disposed only at a position substantially the same, in the axial line X direction, as those of the air supply ports 25*c*. In contrast, the cover portion 25*b* of the primary air supply unit 25 illustrated in FIG. 6 is disposed over a region including not only the position substantially the same, in the axial line X direction, as those of the air supply ports 25*c* but also a position below the air supply ports 25*c*.

The heat dissipation fins 25*e* illustrated in FIG. 6 are heat transfer members to which heat having the atmospheric temperature of the gap 20*a* is transferred via the outer circumferential surface 21*e* of the body part 21. Although the outer circumferential surface 21*e* of the body part 21 is protected with the refractory material 21*c* and the heat insulating material 21*b* so as to prevent the housing 21*a* from being excessively heated, the circumferential surface 21*e* is in a heated state at approximately 50 to 70° C. Thus, the heat dissipation fins 25*e* can heat air (the atmosphere) sent from the primary combustion fan 25*a*.

As illustrated in FIG. 6, the primary combustion fan 25*a* sends externally introduced air toward the outer circumferential surface 21*e* of the body part 21 on the outer circumferential side of the lower portion of the gap 20*a*. The reason for this configuration is that the outer circumferential surface 21*e* of the body part 21 on the outer circumferential side of the lower portion of the gap 20*a* is to be cooled by externally introduced air.

As illustrated in FIG. 6, the lower portion of the gap 20*a* is in the carbide refining/cooling region R1. In the carbide refining/cooling region R1, carbide generated in the primary combustion region R2 is refined while being cooled. Thus, it is desirable that the temperature of the carbide refining/cooling region R1 is kept low to some extent. Therefore, in the present embodiment, a portion toward which air is sent from the primary combustion fan 25*a* is set such that the carbide refining/cooling region R1 is cooled.

FIG. 7 is a cross-sectional view of a second modification of the primary air supply unit 25. The second modification of the primary air supply unit 25 illustrated in FIG. 7 is identical to the first modification illustrated in FIG. 6 except that the thickness, of the heat insulating material 21b, at a position at which each of the heat dissipation fins 25e are disposed and the position of the outer circumferential surface 21e of the body part 21.

As illustrated in FIG. 7, in the portion at which the air supply ports 25c are disposed, a distance from an inner circumferential surface 21d to the outer circumferential surface 21e of the body part 21 is defined as a distance D1. On the other hand, in the portion at which the heat dissipation fins 25e are disposed, a distance from the inner circumferential surface 21d to the outer circumferential surface 21e of the body part 21 is defined as a distance D2. As illustrated in FIG. 7, the distance D2 is shorter than the distance D1.

According to the second modification of the primary air supply unit 25 illustrated in FIG. 7, the atmospheric temperature of the gap 20a is more easily transferred, in the portion where the heat dissipation fins 25e are disposed, to the outer circumferential surface 21e, compared to the first modification of the primary air supply unit 25 illustrated in FIG. 6. For this reason, according to the second modification, the heat dissipation fins 25e are heated to higher temperature than in the first modification. Thus, according to the primary air supply unit 25 of the second modification, air sent from the primary combustion fan 25a in a heated state at higher temperature can be supplied to the air supply ports 25c.

The heat dissipation fins 25e illustrated in FIGS. 6 and 7 are annular members extending around the axial line X. However, other embodiments of the heat dissipation fins 25e may be adopted. For example, the heat dissipation fins 25e may be configured to be in contact with the outer circumferential surface 21e of the body part 21 and to form a spiral flow path upwardly swirling about the axial line X and along the outer circumferential surface 21e.

Next, the secondary air supply unit 26 is described. The secondary air supply unit 26 supplies, into the body part 21, secondary combustion air for combustion of combustible gas contained in combustion gas which is generated as a result of combustion of organic waste in the primary combustion region R2. As illustrated in FIG. 2, the secondary air supply unit 26 is disposed in the secondary combustion region R4, and supplies secondary combustion air toward the secondary combustion region R4. The secondary air supply unit 26 includes a secondary combustion fan 26a, a cover portion 26b, and air supply ports 26c.

The secondary combustion fan 26a sends externally introduced air (the atmosphere), and includes an inverter motor (not illustrated) and a fan (not illustrated) that is driven by the inverter motor. The secondary combustion fan 26a can adjust the amount of air to be sent, by controlling the rotational speed of the inverter motor.

The cover portion 26b is a member forming a closed space 26d into which air sent from the secondary combustion fan 26a is introduced and which supplies air to the air supply ports 26c. As illustrated in FIG. 5(b) (an end view of the carbonizing furnace 20 along arrows B-B in FIG. 2), the closed space 26d extending around the axial line X is formed between the cover portion 26b and the outer circumferential surface 21e of the body part 21.

The air supply ports 26c are flow paths through which air sent from the secondary combustion fan 26a to the closed space 26d is supplied from the closed space 26d to the secondary combustion region R4 in the body part 21. As illustrated in FIG. 2, in the secondary combustion region R4 in which combustible gas contained in combustion gas is burned with secondary combustion air, the air supply ports 26c are disposed at a plurality of positions in the vertical direction along the axial line X.

In addition, as illustrated in FIG. 5(b), the air supply ports 26c are provided, in the body part 21, at equal intervals (in FIG. 5(b), at intervals of 30°) in the circumferential direction around the axial line X. Moreover, as illustrated in FIG. 5(b), the air supply ports 26c are linear flow paths each extending from the outer circumferential surface 21e of the body part 21 toward the axial line X. In the embodiment illustrated in FIG. 5(b), the air supply ports 26c are disposed at intervals of 30° in the circumferential direction around the axial line X. Alternatively, the air supply ports 26c may be disposed at other intervals (for example, intervals of 20° or 45°, etc.), or at arbitrary intervals which are not equal to each other.

The combustion gas discharge portion 27 is a discharge port through which combustion gas, which has been generated in the primary combustion region R2 and of which the combustible gas components has been burnt, is discharged to the combustion gas flow path 200a. Combustion gas discharged to the combustion gas flow path 200a is supplied to the pyrolytic furnace 30 so as to be used as a heat source for a pyrolysis reaction.

The temperature sensor 28a detects the temperature of combustion gas being discharged through the combustion gas discharge portion 27. The temperature sensor 28a transmits, to the carbonizing furnace control unit 29, a temperature detection signal indicating the detected temperature. As illustrated in FIG. 2, the temperature sensor 28a is disposed in a portion near the combustion gas flow path 200a in the secondary combustion region R4. Accordingly, a combustion gas temperature Tg detected by the temperature sensor 28a substantially matches the temperature of combustion gas being discharged to the combustion gas flow path 200a.

The temperature sensor 28b detects the atmospheric temperature of the primary combustion region R2. The temperature sensor 28b transmits, to the carbonizing furnace control unit 29, a temperature detection signal indicating the detected temperature.

The temperature sensor 28c detects a carbide temperature Tc which is the temperature of carbide accumulated in the lower end side of the gap 20a. The temperature sensor 28c transmits, to the carbonizing furnace control unit 29, a temperature detection signal indicating the detected carbide temperature Tc.

The level sensor 28d detects the deposit amount of organic waste accumulated in the gap 20a. In the primary combustion region R2, the level sensor 28d detects the deposit amount of organic waste existing in the axial line Y direction shown in FIG. 2, by obtaining an output signal corresponding to the deposit amount. The level sensor 28d may be a reflection type sensor that detects the deposit amount by receiving the reflected light or ultrasound, etc. of light or ultrasound emitted from the level sensor 28d. Alternatively, the level sensor 28d may be a transmission type sensor with a reception unit provided on the cylindrical part 22 so as to receive X-rays emitted from the level sensor 28d.

As described later, the level sensor 28d is a sensor for detecting that the deposit amount of organic waste existing in the gap 20a has been decreased when, for example, new organic waste charge from the organic waste supply portion 23 is stopped. Thus, the level sensor 28d detects an deposit amount along the axial line Y which extends from the attachment position of the level sensor 28d toward the lower side in terms of the vertical direction. When the level sensor 28d outputs a detection signal indicating that an deposit amount Ao, which is the deposit amount of organic waste detected by the level sensor 28d, is zero, the carbonizing furnace control unit 29 determines that the deposit amount of organic waste existing in the gap 20a has been decreased to a predetermined first deposit amount Ao1 or smaller.

The ignition burners 20c are used for igniting organic waste at the start of combustion of organic waste in the carbonizing furnace 20. As illustrated in FIG. 2, the ignition burners 20c are disposed at lower end sides of the gap 20a. Further, as illustrated in FIG. 2, the ignition burners 20c are disposed at two positions which are opposite to each other with respect to the axial line X.

The ignition burners 20c generate flame by using ignition fuel such as kerosene so as to burn organic waste accumulated in the lower end side of the gap 20a. The ignition burners 20c generate flame at a start of combustion of organic waste in the carbonizing furnace 20 in accordance with a control instruction from the carbonizing furnace control unit 29. Further, in accordance with a control instruction from the carbonizing furnace control unit 29, the ignition burners 20c stop generating flame at a predetermined timing.

The carbonizing furnace control unit 29 controls components included in the carbonizing furnace 20 by receiving, from the components, detection signals indicating the statuses of the respective components, and by transmitting control signals to the respective components on the basis of the detection signals. Further, the carbonizing furnace control unit 29 transmits, to the control apparatus 90, a signal indicating the status of the carbonizing furnace 20, and controls the carbonizing furnace 20 in accordance with a control signal transmitted from the control apparatus 90.

The carbonizing furnace control unit 29 receives temperature detection signals indicating respective temperatures detected by the temperature sensors 28a, 28b, and 28c, and receives an deposit amount detection signal indicating the deposit amount Ao of organic waste detected by the level sensor 28d. Further, the carbonizing furnace control unit 29 transmits, to the primary air supply unit 25, a control signal for controlling an air blowing amount from the primary combustion fan 25a. In addition, the carbonizing furnace control unit 29 transmits, to the secondary air supply unit 26, a control signal for controlling the air blowing amount from the secondary combustion fan 26a. Moreover, the carbonizing furnace control unit 29 transmits a control signal to the ignition burners 20c, to cause the ignition burners 20c to generate flame at a start of combustion of organic waste, and transmits, at a predetermined timing, a control signal to the ignition burners 20c to cause the ignition burners 20c to stop generating flame. Further, the carbonizing furnace control unit 29 transmits, to the driving motor 24e, a control signal for controlling the rotational speed of the turntable 24a.

Next, a control method by which the carbonizing furnace control unit 29 controls the air blowing amount from the primary combustion fan 25a, is described. The carbonizing furnace control unit 29 controls the air blowing amount from the primary combustion fan 25a on the basis of the atmospheric temperature of the primary combustion region R2 detected by the temperature sensor 28b. The air blowing amount from the primary combustion fan 25a matches an air amount of primary combustion air being supplied from the air supply ports 25c to the primary combustion region R2 in the carbonizing furnace 20. For this reason, the carbonizing furnace control unit 29 can adjust the air amount of first combustion air to be sent to the primary combustion region R2, by controlling the air blowing amount from the primary combustion fan 25a.

The carbonizing furnace control unit 29 controls the air blowing amount from the primary combustion fan 25a on the basis of the atmospheric temperature of the primary combustion region R2 detected by the temperature sensor 28b, so as to maintain a combustion state suited for carbonizing organic waste accumulated in the gap 20a. Specifically, the carbonizing furnace control unit 29 controls the air blowing amount from the primary combustion fan 25a such that the atmospheric temperature of the primary combustion region R2 falls within a range of 1000° C. or higher and 1200° C. or lower.

Next, a control method by which the carbonizing furnace control unit 29 controls the air blowing amount from the secondary combustion fan 26a is described with reference to the flowchart of FIG. 8. The carbonizing furnace control unit 29 controls the air blowing amount from the secondary combustion fan 26a on the basis of the combustion gas temperature Tg detected by the temperature sensor 28a. The air blowing amount from the secondary combustion fan 26a matches the air amount of secondary combustion air being supplied from the air supply ports 26c to the secondary combustion region R4 in the carbonizing furnace 20. For this reason, the carbonizing furnace control unit 29 can adjust the air amount of secondary combustion air to be sent to the secondary combustion region R4 by controlling the air blowing amount from the secondary combustion fan 26a.

The carbonizing furnace control unit 29 controls the air blowing amount from the secondary combustion fan 26a on the basis of the combustion gas temperature Tg detected by the temperature sensor 28a so as to maintain a combustion state suited for burning combustible gas contained in combustion gas in the secondary combustion region R4. Specifically, the carbonizing furnace control unit 29 controls the air blowing amount from the secondary combustion fan 26a in accordance with the flowchart shown in FIG. 8. The processes of the flowchart shown in FIG. 8 are conducted by an operation unit (not illustrated) included in the carbonizing furnace control unit 29 executing a control program stored in a storage unit (not illustrated).

Figure 8:
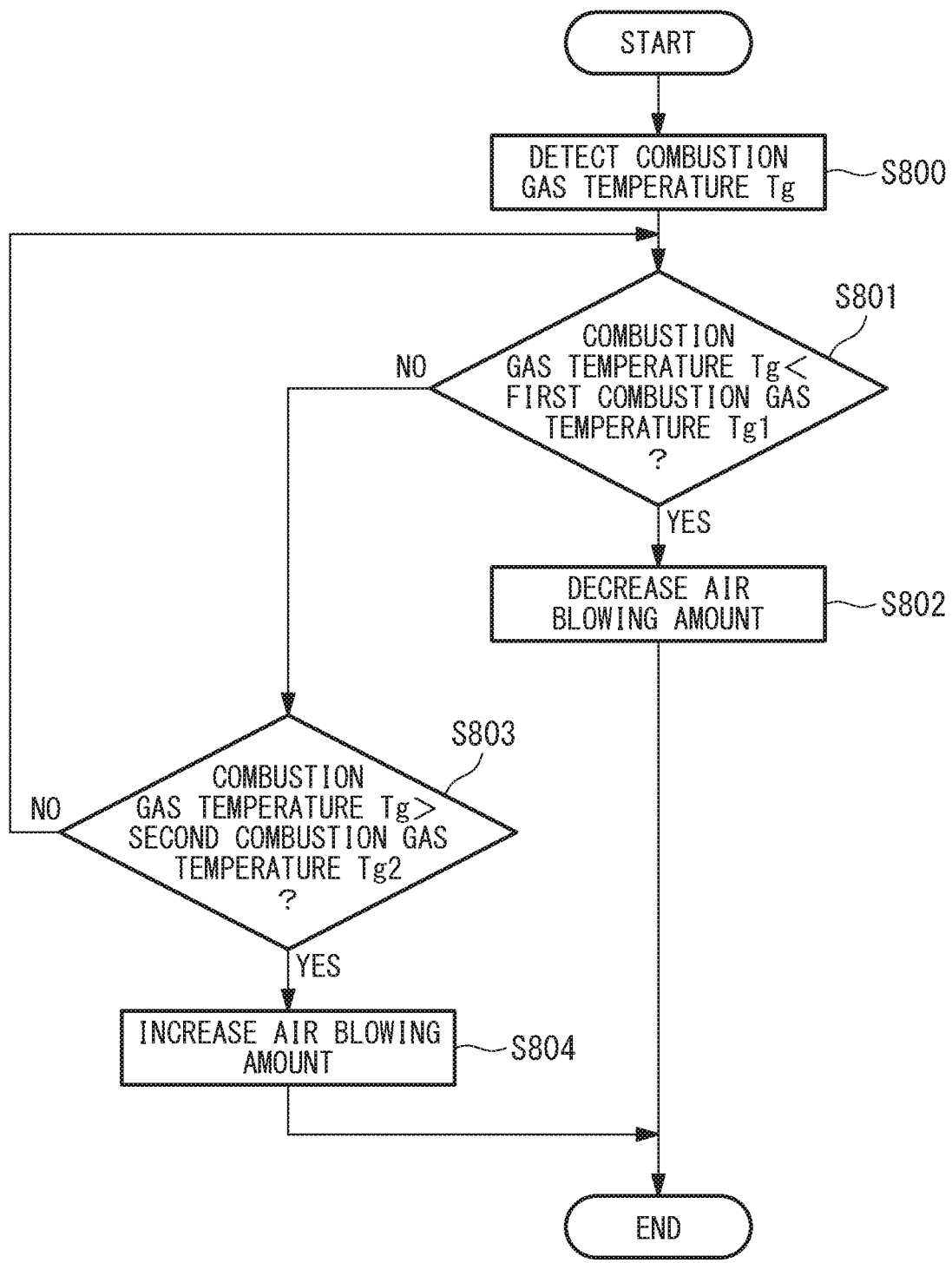
FIG. 8 is a flowchart showing a control method by which a carbonizing furnace control unit controls the air blowing amount from a secondary combustion fan.

Prior to the processes shown in the flowchart of FIG. 8, the carbonizing furnace control unit 29 causes, at a start of combustion of organic waste in the carbonizing furnace 20, the ignition burners 20c to generate flame to start combustion of organic waste accumulated in the gap 20a. Thereafter, the carbonizing furnace control unit 29 causes the secondary combustion fan 26a to start blowing external air (the atmosphere). The carbonizing furnace control unit 29 controls the secondary combustion fan 26a to send a fixed amount of air until the combustion gas temperature Tg detected by the temperature sensor 28a reaches a first combustion gas temperature Tg1. After the combustion gas temperature Tg detected by the temperature sensor 28a reaches the first combustion gas temperature Tg1, the processes shown in the flowchart of FIG. 8 are started.

The amount of secondary combustion air sent from the secondary combustion fan 26a until the combustion gas temperature Tg reaches the first combustion gas temperature Tg1 or higher is equal to an amount obtained by adding a fixed surplus amount to an amount required for complete combustion of combustible gas which is expected to exist in the secondary combustion region R4.

At step S800, the carbonizing furnace control unit 29 detects the combustion gas temperature Tg, which represents the temperature of combustion gas discharged from the combustion gas discharge portion 27, by receiving a temperature detection signal transmitted from the temperature sensor 28a.

At step S801, the carbonizing furnace control unit 29 determines whether or not the combustion gas temperature Tg detected by the temperature sensor 28a is lower than the first combustion gas temperature Tg1. When determining that the combustion gas temperature Tg is lower than the first combustion gas temperature Tg1, the carbonizing furnace control unit 29 proceeds to a process at step S802. Otherwise, the carbonizing furnace control unit 29 proceeds to a process at step S803.

At step S802, the carbonizing furnace control unit 29 transmits, to the secondary combustion fan 26a, a control signal for decreasing the air blowing amount from the secondary combustion fan 26a. Upon receiving a control signal from the carbonizing furnace control unit 29, the secondary combustion fan 26a decreases the air blowing amount. Here, the reason why the air blowing amount from the secondary combustion fan 26a is decreased when it is determined that the combustion gas temperature Tg is lower than the first combustion gas temperature Tg1, is as follows.

The amount of secondary combustion air being supplied from the secondary air supply unit 26 to the secondary combustion region R4 is preferably larger, by a fixed amount, than the amount required for complete combustion of combustible gas contained in combustion gas existing in the secondary combustion region R4. That is, the excess air ratio in the secondary combustion region R4 is preferably set to a fixed value greater than 1.0.

However, the amount of combustible gas existing in the secondary combustion region R4 generally varies due to the characteristics of organic waste, the combustion state of organic waste in the primary combustion region R2, and the like. Accordingly, if the amount of secondary combustion air being supplied from the secondary air supply unit 26 to the secondary combustion region R4 is kept fixed, the amount of air suited for complete combustion of combustible gas cannot be maintained.

In a case where the amount of secondary combustion air is excessively larger than the amount required for complete combustion of combustible gas, a large amount of surplus air which has not been used for combustion of combustible gas is supplied to the secondary combustion region R4. Since the temperature of air (the atmosphere) being sent from the secondary combustion fan 26a is lower than the atmospheric temperature of the secondary combustion region R4, a large amount of surplus air reduces the atmospheric temperature of the secondary combustion region R4.

In this case, the combustion efficiency of combustible gas in the secondary combustion region R4 is deteriorated so that combustion gas containing much combustible gas is discharged from the combustion gas discharge portion 27. Combustion gas contains polymer hydrocarbon which forms tar by being coagulated. Accordingly, if combustion gas contains a large amount of component which becomes tar by being coagulated, the combustion gas may damage the carbonizing furnace 20 and the devices set downstream therefrom. For this reason, it is desirable that combustion gas is prevented from containing a large amount of component which forms tar by being coagulated so as to inhibit the carbonizing furnace 20 and the devices set downstream therefrom from being damaged. Accordingly, when determining that the combustion gas temperature Tg is lower than the first combustion gas temperature Tg1, the carbonizing furnace control unit 29 decreases the air blowing amount from the secondary combustion fan 26a in order to decrease an amount of surplus air to be supplied to the secondary combustion region R4.

At step S803, the carbonizing furnace control unit 29 determines whether or not the combustion gas temperature Tg detected by the temperature sensor 28a is higher than the second combustion gas temperature Tg2. When determining that the detected combustion gas temperature Tg is higher than the second combustion gas temperature Tg2, the carbonizing furnace control unit 29 proceeds to a process at step S804. Otherwise, the carbonizing furnace control unit 29 proceeds to the process at step S801.

At step S804, the carbonizing furnace control unit 29 transmits, to the secondary combustion fan 26a, a control signal for increasing the air blowing amount from the secondary combustion fan 26a. Upon reception of a control signal from the carbonizing furnace control unit 29, the secondary combustion fan 26a increases the air blowing amount. After the processes of the flowchart shown in FIG. 8 are ended, the carbonizing furnace control unit 29 starts executing the processes shown in FIG. 8 again. Here, the reason why the air blowing amount from the secondary combustion fan 26a is increased when the combustion gas temperature Tg is determined to be higher than the second combustion gas temperature Tg2, is as follows.

When the carbonizing furnace 20 is operated without defining the upper limit of the combustion gas temperature Tg, the carbonizing furnace 20 and the combustion gas flow path 200a need to be designed on the basis of the hypothesis based on the highest expectable gas temperature such that sufficient heat resistance is maintained even at the highest expectable gas temperature. In this case, since the carbonizing furnace 20, etc. needs to be manufactured by using an expensive member having high heat resistance, the manufacturing cost for the carbonizing furnace 20, etc. increases. In order to prevent increase in manufacturing cost for the carbonizing furnace 20, etc., it is preferable that the combustion gas temperature Tg is controlled to a predetermined upper limit temperature or lower.

For this reason, when determining that the combustion gas temperature Tg is higher than the second combustion gas temperature Tg2, the carbonizing furnace control unit 29 increases the air blowing amount from the secondary combustion fan 26a. As described above, when a large amount of surplus air is supplied to the secondary combustion region R4 as a result of increase of the air blowing amount from the secondary combustion fan 26a, the atmospheric temperature of the secondary combustion region R4 is lowered.

In this way, the carbonizing furnace control unit 29 controls the air blowing amount from the secondary combustion fan 26a on the basis of the combustion gas temperature Tg detected by the temperature sensor 28a. Accordingly, the combustion gas temperature Tg is controlled to the first combustion gas temperature Tg1 or higher and the combustion gas temperature Tg2 or lower. Here, for example, the first combustion gas temperature Tg1 and the second combustion gas temperature Tg2 may be set to 900° C. and 1300° C., respectively.

The reason why the first combustion gas temperature Tg1 is set to 900° C. is that most of polymer hydrocarbon can be removed from combustion gas when the temperature of the secondary combustion region R4 is kept at 900° C. or higher. Polymer hydrocarbon is a component which is in combustible gas contained in combustion gas and which becomes tar by being coagulated. Thus, as a result of removal of most of polymer hydrocarbon from combustion gas, damages to the carbonizing furnace 20 and the devices set downstream therefrom can be inhibited.

Alternatively, for example, the first combustion gas temperature Tg1 and the second combustion gas temperature Tg2 may be set to 1000° C. and 1200° C., respectively. Alternatively, for example, both the first combustion gas temperature Tg1 and the second combustion gas temperature Tg2 may be set to 1100° C. In this case, the carbonizing furnace control unit 29 controls the secondary combustion fan 26a such that the air blowing amount is reduced when the combustion gas temperature Tg is lower than the first combustion gas temperature Tg1, and the air blowing amount is increased when the combustion gas temperature Tg is higher than the second combustion gas temperature Tg2.

Next, a control method by which the carbonizing furnace control unit 29 controls the rotational speed of the turntable 24a is described with reference to a flowchart in FIG. 9. The processes of the flowchart shown in FIG. 9 are performed by an operation unit (not illustrated) included in the carbonizing furnace control unit 29 executing a control program stored in a storage unit (not illustrated).

Figure 9:
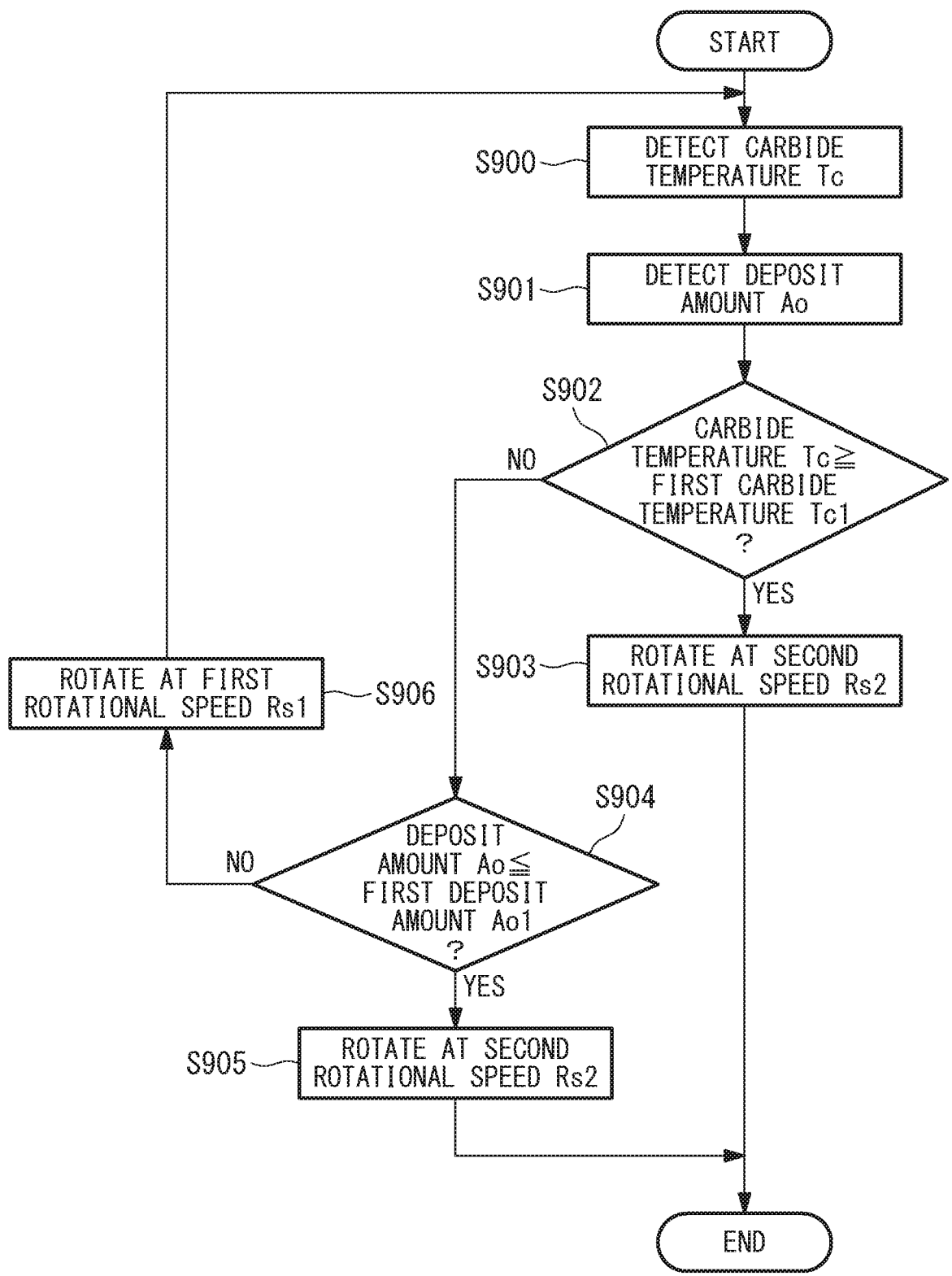
FIG. 9 is a flowchart showing a control method by which the carbonizing furnace control unit controls the rotational speed of a turntable.

In the flowchart shown in FIG. 9, the carbonizing furnace control unit 29 controls the discharge amount of carbide discharged from the carbide discharge unit 24. In the present embodiment, the discharge amount of carbide discharged from the carbide discharge unit 24 is controlled in order to prevent increase in temperature of carbide to be discharged from the carbide discharge unit 24, which may be caused by stop of charge of organic waste from the organic waste charge portion 23 into the gap 20a.

When the amount of organic waste accumulated in the gap 20a gradually becomes smaller, the carbide refining/cooling region R1 for extinguishing fire burning carbide becomes narrower. In this case, when the rotational speed of the turntable 24a is kept fixed, carbide which has not been sufficiently cooled is discharged from the lower end of the gap 20a. The reason for this is that carbide, the temperature of which has become high after undergoing carbonization in the primary combustion region R2, is not sufficiently cooled in the carbide refining/cooling region R1. For this reason, the carbonizing furnace control unit 29 controls the discharge amount of carbide to be discharged from the carbide discharge unit 24, and thereby, adjusts the temperature of carbide to be discharged from the carbide discharge unit 24.

In the present embodiment, the carbonizing furnace control unit 29 adjusts the temperature of carbide being discharged from the carbide discharge unit 24, by using both the temperature sensor 28c and the level sensor 28d. The former is a sensor that directly detects the temperature of carbide, and the latter is a sensor that indirectly detects that the temperature of carbide becomes high, on the basis of the deposit amount of carbide.

Steps of the flowchart in FIG. 9 are described below. At step S900, the carbonizing furnace control unit 29 detects the carbide temperature Tc, which is the temperature of carbide accumulated in the lower end side of the gap 20a, by receiving a temperature detection signal transmitted from the temperature sensor 28c. At step S901, the carbonizing furnace control unit 29 detects the deposit amount Ao, which is the deposit amount of organic waste accumulated in the gap 20a, by receiving an deposit amount detection signal transmitted from the level sensor 28d.

At step S902, the carbonizing furnace control unit 29 determines whether or not the carbide temperature Tc detected by the temperature sensor 28c is equal to or higher than a first carbide temperature Tc1. When determining that the detected carbide temperature Tc is equal to or higher than the first carbide temperature Tc1, the carbonizing furnace control unit 29 proceeds to a process at step S903. Otherwise, the carbonizing furnace control unit 29 proceeds to a process at step S904. Here, the first carbide temperature Tc1 may be set to an arbitrary temperature within a range of 250° C. or higher and 300° C. or lower, for example.

At step S903, the carbonizing furnace control unit 29 controls the driving unit 24b to rotate the turntable 24a at a second rotational speed Rs2. The second rotational speed Rs2 is lower than a first rotational speed Rs1 (described later). Here, the first rotational speed Rs1 is set so as to cause the carbide discharge unit 24 to discharge a required amount of carbide for maintaining the normal operation state of the carbonizing furnace 20. At step S903, the rotational speed of the turntable 24a is set to the second rotational speed Rs2 lower than the first rotational speed Rs1, such that the temperature of carbide to be discharged from the carbide discharge unit 24 is reduced when the carbide temperature Tc detected by the temperature sensor 28c becomes equal to or higher than the first carbide temperature Tc1. As a result of reduction in the rotational speed of the turntable 24a, a time during which carbide resides in the carbide refining/cooling region R1 becomes longer, and accordingly, the temperature of carbide to be discharged from the carbide discharge unit 24 is reduced.

At step S904, the carbonizing furnace control unit 29 determines whether or not the deposit amount Ao detected by the level sensor 28d is equal to or smaller than the first deposit amount Ao1. When determining that the detected deposit amount Ao is equal to or smaller than the first deposit amount Ao1, the carbonizing furnace control unit 29 proceeds to a process at step S905. Otherwise, the carbonizing furnace control unit 29 proceeds to a process at step S906.

At step S905, the carbonizing furnace control unit 29 controls the driving unit 24b to rotate the turntable 24a at a second rotational speed Rs2. The second rotational speed Rs2 is lower than a first rotational speed Rs1 (described later). At step S905, the rotational speed of the turntable 24a is set to the second rotational speed Rs2 lower than the first rotational speed Rs1, such that the temperature of carbide to be discharged from the carbide discharge unit 24 is reduced when the deposit amount Ao detected by the level sensor 28d becomes equal to or lower than the first deposit amount Ao1.

At step S906, the carbonizing furnace control unit 29 controls the driving unit 24b to rotate the turntable 24a at the first rotational speed Rs1. As described above, the first rotational speed Rs1 is set so as to cause the carbide discharge unit 24 to discharge a required amount of carbide for maintaining the normal operation state of the carbonizing furnace 20. Since the carbide temperature Tc is lower than the first carbide temperature Tc1 and the deposit amount Ao is larger than the first deposit amount Ao1, the carbonizing furnace control unit 29 controls, at step S906, the driving unit 24b such that an amount of carbide required for maintaining the operation state is discharged from the carbide discharge unit 24.

After completing the processes of the flowchart shown in FIG. 9, the carbonizing furnace control unit 29 starts executing the processes shown in FIG. 9 again. In this way, the carbonizing furnace control unit 29 controls the rotational speed at which the driving unit 24b rotates the turntable 24a, on the basis of the carbide temperature Tc detected by the temperature sensor 28c and the organic waste deposit amount Ao detected by and the level sensor 28d.

In the aforementioned flowchart shown in FIG. 9, the rotational speed of the turntable 24a is switched in two stages, depending on whether the carbide temperature Tc detected by the temperature sensor 28c is the first carbide temperature Tc1 or higher. However, other aspects may be adopted. For example, the rotational speed of the turntable 24a may be switched in two or greater stages, depending on the carbide temperature Tc. Alternatively, for example, the rotational speed of the turntable 24a may be controlled so as to be in inverse proportion to the carbide temperature Tc detected by the temperature sensor 28c, instead of being switched in stages.

Further, in the aforementioned flowchart shown in FIG. 9, the rotational speed of the turntable 24a is switched in two stages, depending on whether or not the deposit amount Ao detected by the level sensor 28d is equal to or larger than the first deposit amount Ao1. However, other aspects may be adopted. For example, the rotational speed of the turntable 24a may be switched in two or greater stages, depending on the deposit amount Ao. Alternatively, for example, the rotational speed of the turntable 24a may be controlled so as to be in proportion to the deposit amount Ao detected by the level sensor 28d, instead of being switched in stages.

Moreover, in the aforementioned flowchart shown in FIG. 9, the rotational speed of the turntable 24a is controlled by using both the carbide temperature Tc detected by the temperature sensor 28c and the deposit amount Ao detected by the level sensor 28d. However, other aspects may be adopted. For example, the rotational speed of the turntable 24a may be controlled by using either one of the carbide temperature Tc detected by the temperature sensor 28c and the deposit amount Ao detected by the level sensor 28d.

Figure 10:
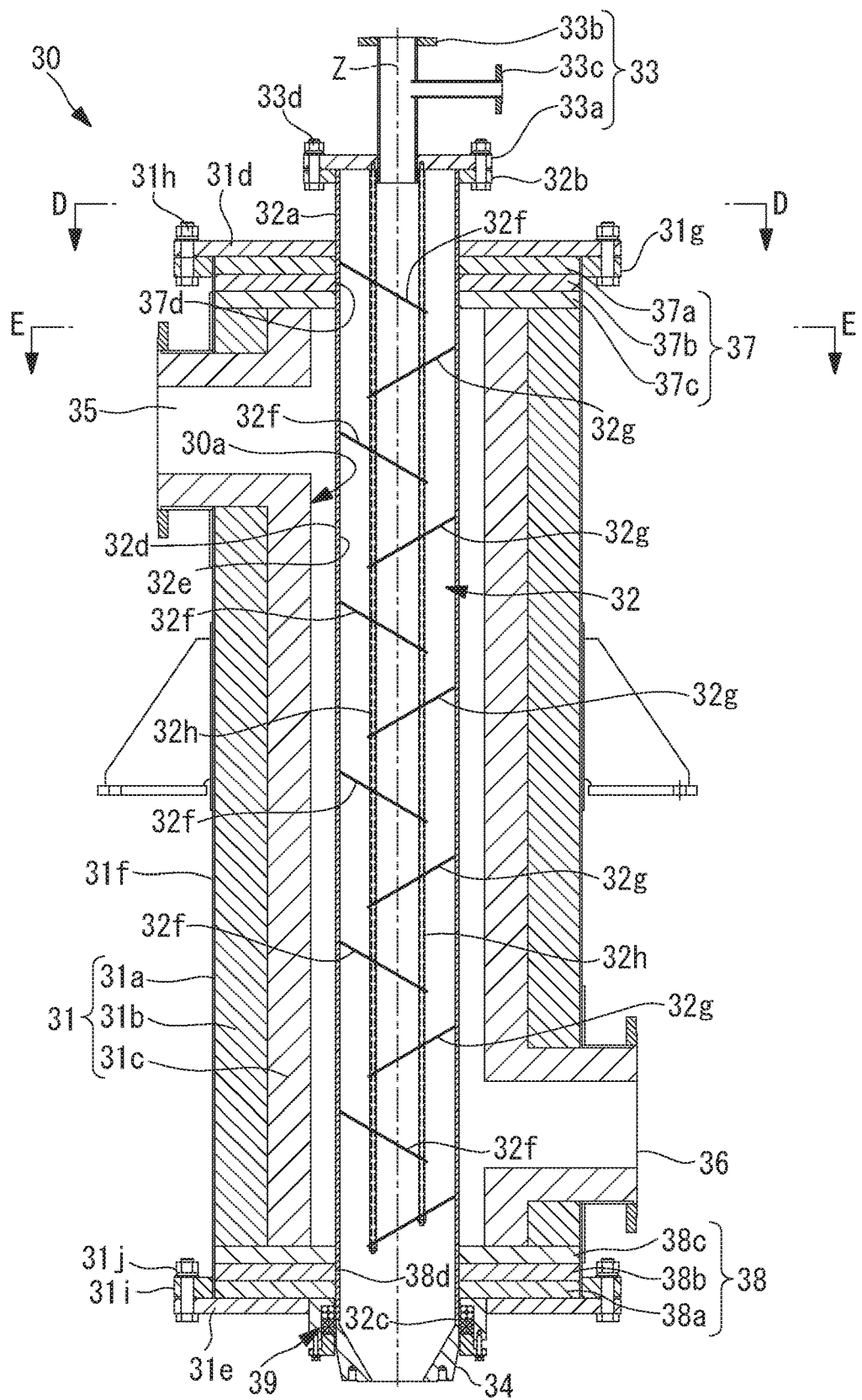
FIG. 10 is a longitudinal cross-sectional view of a pyrolytic furnace illustrated in FIG. 1.

Next, the pyrolytic furnace 30 of the present embodiment is described in detail with reference to FIGS. 10 to 12. FIG. 10 is a longitudinal cross-sectional view of the pyrolytic furnace 30 illustrated in FIG. 1. In FIG. 10, an axial line Z represents a vertical direction (the gravity direction) that is orthogonal to an installation surface (not illustrated) on which the pyrolytic furnace 30 is installed.

As illustrated in FIG. 10, the pyrolytic furnace 30 of the present embodiment includes a body part 31, a reaction tube 32, a reaction tube head 33 (a supply portion), a water gas outlet nozzle 34 (a water gas outlet portion), a combustion gas supply portion 35 (a heating gas supply portion), a combustion gas discharge portion 36 (a heating gas discharge portion), a gland packing 37 (a first seal portion), a gland packing 38 (a second seal portion), and a gland packing 39 (a third seal portion).

The body part 31 is a member formed into a substantially cylindrical shape extending in the axial line Z. The body part 31 has therein a space in which the reaction tube 32 is accommodated. The body part 31 includes a metallic (for example, iron-made) housing 31a forming the exterior of the pyrolytic furnace 30, a heat insulating material 31b attached on the inner circumferential surface of the housing 31a, and a refractory material 31c attached on the inner circumferential surface of the heat insulating material 31b.

The upper surface of the substantially cylindrical body part 31 is formed of an upper plate 31d that has an annular shape in planar view, and the bottom surface of the body part 31 is formed of a bottom plate 31e that has an annular shape in planar view. In addition, an upper end flange 31g (a first flange portion) is provided at the upper end of a lateral surface 31f of the body part 31, and a lower end flange 31i (a second flange portion) is provided at the lower end of the lateral surface 31f of the body part 31.

The upper plate 31d and the upper end flange portion 31g are fastened by fastening bolts 31h (fastening members) at a plurality of positions around the axial line Z, with a gasket (a fourth seal portion, not illustrated) interposed between the upper plate 31d and the upper end flange portion 31g. Similarly, the bottom plate 31e and the lower end flange 31i are fastened by fastening bolts 31j (fastening members) at a plurality of positions around the axial line Z, with a gasket (a fifth seal portion, not illustrated) interposed between the bottom plate 31e and the lower end flange 31i.

The reaction tube 32 is a mechanism formed in a substantially cylindrical shape extending in the axial line Z. The reaction tube 32 has an outer circumferential surface 32d forming a combustion gas flow path 30a which extends between the outer circumferential surface 32d and the inner circumferential surface of the body part 31 and through which combustion gas (heating gas) flows. The reaction tube 32 includes a center pipe 32a (a tubular member), an upper end flange 32b (a third flange portion), a plurality of first inclined plates 32f, a plurality of second inclined plates 32g, and a plurality of holding bars 32h (holding parts).

As illustrated in FIG. 10, the upper end flange 32b and the end, of the center pipe 32a, on the upper end flange 32b side of the reaction tube 32, each protrude upwardly from the upper plate 31e (the upper surface) of the body part 31. Further, a lower end 32c of the reaction tube 32 protrudes downwardly from the bottom plate 31d (the bottom surface) of the body part 31.

The center pipe 32a is a member formed in a substantially cylindrical shape extending in the axial line Z. In the center pipe 32a, a pyrolysis promoting mechanism formed of the plurality of first inclined plates 32f, the plurality of second inclined plates 32g, and the plurality of holding bars 32h (holding parts) is accommodated. The pyrolysis promoting mechanism guides carbide, in a stepwise manner, from the upper end side to the lower end side of the center pipe 32a such that the carbide resides in the reaction tube 32. Thus, a pyrolysis reaction between carbide and superheated steam (a gasification agent) is promoted.

Figure 11:
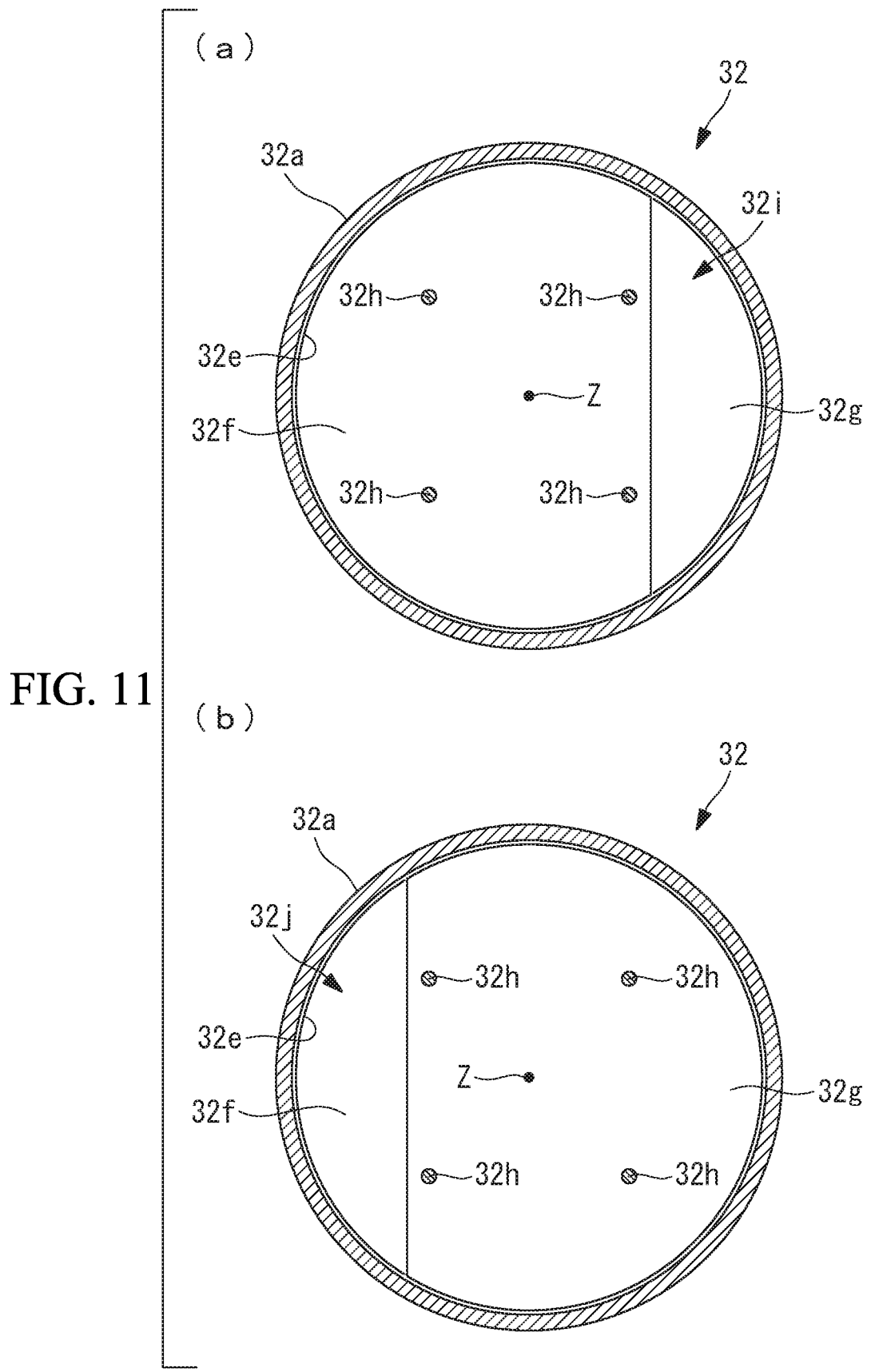

As illustrated in FIGS. 10 and 11, the plurality of first inclined plates 32f and the plurality of second inclined plates 32g are held, at a plurality of positions along the axial line Z, by the four holding bars 32h. Further, the first inclined plates 32f and the second inclined plates 32g are disposed alternately along the axial line Z. The respective upper ends of the four holding bars 32h are attached on the lower surface of a lower end flange 33a of the reaction tube head 33. The pyrolysis promoting mechanism can come off (be detached) upwardly from the center pipe 32a by releasing fastening of the lower end flange 33a of the reaction tube head 33 to the upper end flange 32b of the reaction tube 32.

The first inclined plate 32f illustrated in FIG. 11(a) is arranged to form a first inclined surface which is inclined so as to guide carbide from one end (the left end in FIG. 11(a)) to a first opening portion 32i provided in the other end (the right end in FIG. 11(a)) of the inner circumferential surface 32e of the reaction tube 32. Further, the second inclined plate 32g illustrated in FIG. 11(b) is arranged to form a second inclined surface which is inclined so as to guide carbide from the other end (the right end in FIG. 11(b)) to a second opening portion 32j provided in one end (the right end in FIG. 11(b)) of the inner circumferential surface 32e of the reaction tube 32.

As illustrated in FIG. 10, the respective first inclined surfaces formed by the first inclined plates 32f are inclined such that carbide fallen from the second opening portion 32j is guided downward. The respective second inclined surfaces formed by the second inclined plates 32g are inclined such that carbide fallen from the first opening portion 32i is guided downward. In this way, the pyrolysis promoting mechanism can guide carbide from the upper end side to the lower end side of the center pipe 32a in a stepwise manner by using the first inclined plates 32*f* and the second inclined plates 32*g* disposed alternately along the axial line Z.

The respective inclination angles of each of the first inclined surfaces and each of the second inclined surfaces relative to the plane orthogonal to the axial line Z may be arbitrarily set according to the characteristics of carbide. However, in order to surely cause carbide to move along the inclined surfaces, it is preferable that each of the inclination angles is equal to or larger than the repose angle of carbide. On the other hand, when the inclination angles are excessively large, a time during which carbide resides in the reaction tube 32 is short, and thus, a pyrolysis reaction is not sufficiently promoted. Accordingly, it is particularly preferable that the respective inclination angles of each of the first inclined surfaces and each of the second inclined surfaces relative to the plane orthogonal to the axial line Z are defined to fall within a range of 20° or larger and 60° or smaller and of an angle equal to or larger than the repose angle of carbide.

The reaction tube head 33 is to be attached to the reaction tube 32, and supplies carbide and superheated steam (a gasification agent) into the reaction tube 32 so as to generate water gas in the reaction tube 32. The reaction tube head 33 includes the lower end flange 33*a* (the fourth flange) to be attached to the reaction tube 32, an upper end flange 33*b* to be attached to the carbide supply path 101, and a side flange 33*c* to be attached to a flow path (not illustrated) through which superheated steam is supplied from the steam superheater 81.

The lower end flange 33*a* of the reaction tube head 33 and the upper end flange 32*b* of the reaction tube 32 are fastened by fastening bolts 33*d* at a plurality of positions around the axial line Z, with a gasket (a sixth seal portion, not illustrated) interposed therebetween.

The water gas outlet nozzle 34 is a substantially cylindrical member attached on the lower end 32*c* of the reaction tube 32. The water gas outlet nozzle 34 guides water gas, unreacted carbide, the residues such as ashes, and the like, which are generated by a pyrolysis reaction of carbide in the reaction tube 32, to the temperature decreaser 40 via the water gas supply path 102.

The combustion gas supply portion 35 is an opening portion which is provided in the upper portion of the body part 31 and through which combustion gas guided from the combustion gas flow path 200*a* is supplied to the combustion gas flow path 30*a*. The combustion gas discharge portion 36 is an opening portion which is provided in the lower portion of the body part 31 and which discharges combustion gas from the combustion gas flow path 30*a* to the combustion gas flow path 200*b*. Combustion gas being supplied from the combustion gas supply portion 35 to the combustion gas flow path 30*a* flows from the upper end side to the lower end side of the center pipe 32*a* while heating the outer circumferential surface 32*d* of the center pipe 32*a*, and is discharged from the combustion gas discharge portion 36.

The gland packing 37 is a member that blocks combustion gas in the combustion gas flow path 30*a* from outflowing from the upper plate 31*d* of the body part 31. The gland packing 37 is an annular member in planar view, and has an inner circumferential surface 37*d* provided so as to be in contact with both the lower surface of the upper plate 31*d* of the body part 31 and the outer circumferential surface 32*d* of the reaction tube 32.

The gland packing 37 is formed of a ceramic board 37*a*, a ceramic board 37*b*, and a ceramic fiber 37*c* which are in close contact with each other. Since the ceramic fiber 37*c* which is a relatively deformable fibrous material is used, the seal performance of a portion to be in contact with the heat insulating material 31*b* and the refractory material 31*c* is enhanced.

The gland packing 38 is a member that blocks combustion gas in the combustion gas flow path 30*a* from outflowing to the outside from the bottom plate 31*e* of the body part 31. The gland packing 38 is an annular member in planar view, and has an inner circumferential surface 38*d* provided so as to be in contact with both the upper surface of the bottom plate 31*e* of the body part 31 and the outer circumferential surface 32*d* of the reaction tube 32.

The gland packing 38 is formed of a ceramic board 38*a*, a ceramic board 38*b*, and a ceramic fiber 38*c* which are in close contact with each other. Since the ceramic fiber 38*c* which is a relatively deformable fibrous material is used, the seal performance of a portion to be in contact with the heat insulating material 31*b* and the refractory material 31*c* is enhanced.

Figure 12:
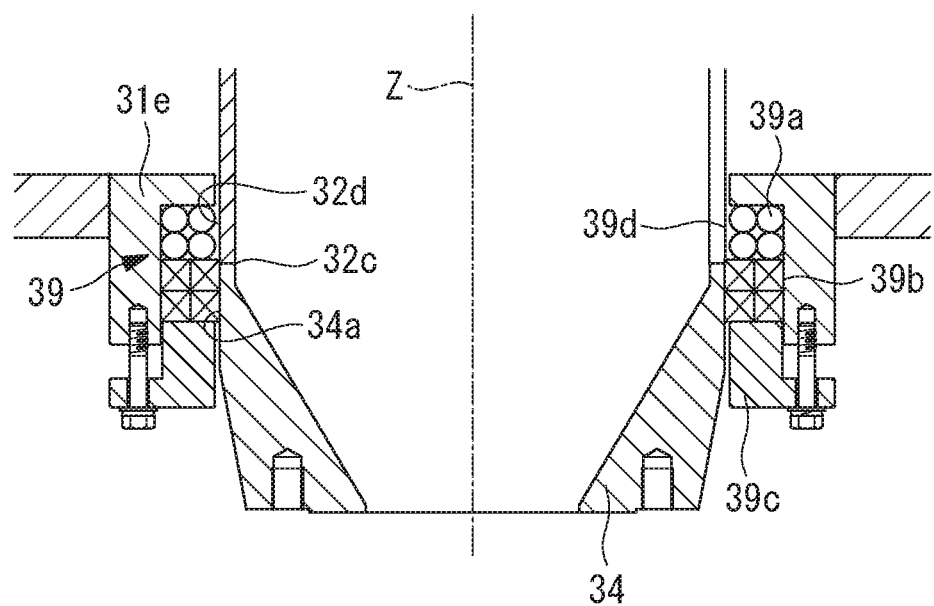
FIG. 12 is an enlarged view of a main part of the pyrolytic furnace illustrated in FIG. 10.

As illustrated in FIG. 12, the gland packing 39 is a member that blocks outflow of water gas from the attachment position at which the lower end 32*c* of the reaction tube 32 and the water gas outlet nozzle 34 are attached to each other. The gland packing 39 is an annular member in planar view, and has an inner circumferential surface 39*d* in contact with both the outer circumferential surface 32*d* of the reaction tube 32 and the outer circumferential surface 34*a* of the water gas outlet nozzle 34.

As illustrated in FIG. 12, the gland packing 39 includes an annular packing member 39*a*, an annular packing member 39*b*, and a packing pressing member 39*c*. The packing pressing member 39*c* is fastened to the bottom plate 31*e* with a fastening bolt. Accordingly, the packing member 39*a* and the packing member 39*b* contract in the axial line Z direction and expand in a radial direction orthogonal to the axial line Z. As a result of expansion of the gland packing 39 in the radial direction, the inner circumferential surface 39*d* of the gland packing 39 comes into contact with the outer circumferential surface 32*d* of the reaction tube 32 and with the outer circumferential surface 34*a* of the water gas outlet nozzle 34, so that a seal region is formed.

Figure 13:
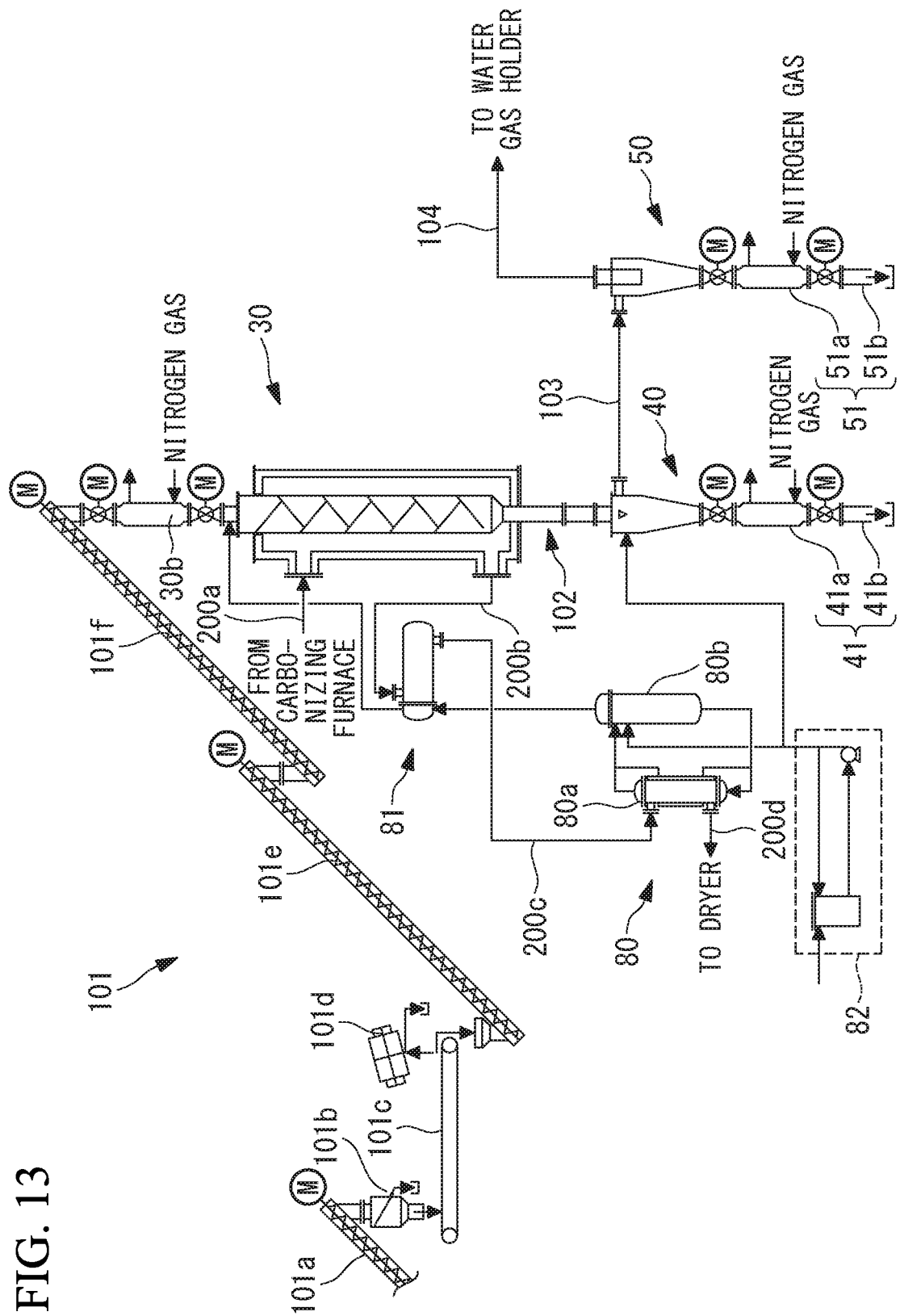
FIG. 13 is a configuration diagram illustrating the pyrolytic furnace, a temperature decreaser, a cyclone, a steam generator, and a steam superheater illustrated in FIG. 1.

Next, the pyrolytic furnace 30, the temperature decreaser 40, the cyclone 50, the steam generator 80, the steam superheater 81, and the peripheral devices thereof of the present embodiment are described in detail with reference to FIG. 13. As illustrated in FIG. 13, the carbide supply path 101 includes a screw conveyor 101*a*, a clinker removing device 101*b*, a belt conveyor 101*c*, a magnetic separator 101*d*, a screw conveyor 101*e*, and a screw conveyor 101*f*.

The screw conveyor 101*a* conveys carbide discharged from the carbonizing furnace 20. The screw conveyor 101*a* has a linearly extending cylindrical body housing a screw therein. The screw conveyor 101*a* conveys carbide in the extension direction of the cylindrical body, by rotating the screw inside the cylindrical body with a driving force from a motor.

The clinker removing device 101*b* removes clinkers having a certain grain diameter or greater from carbide discharged from the screw conveyor 101*a*, by using a net, etc. The belt conveyor 101*c* conveys carbide, from which clinkers have been removed, to the magnetic separator 101*d*. The magnetic separator 101*d* removes scrap iron such as a nail contained in carbide by using a magnet. Carbide from which iron scrap has been removed is supplied to the screw conveyor 101*e*.

The screw conveyor 101*e* and the screw conveyor 101*f* each convey carbide. The screw conveyor 101*f* supplies carbide to a nitrogen replacement device 30*b* included in the pyrolytic furnace 30. Each of the structures of the screw conveyor 101e and the screw conveyor 101f is identical to that of the screw conveyor 101a, and the explanation thereof is omitted.

Carbide is conveyed to a position above the pyrolytic furnace 30 by the screw conveyor 101e and the screw conveyor 101f such that carbide is supplied from above the pyrolytic furnace 30, and passes through the inside of the reaction tube 32 of the pyrolytic furnace 30, by the weight of the carbide itself. As a result of passing of carbide through the reaction tube 32 of the pyrolytic furnace 30 by the weight of the carbide itself, the entire region from the upper end to the lower end of the reaction tube 32 can be used as a region for promoting a pyrolysis reaction. In addition, since carbide passes through the inside of the reaction tube 32 by the weight of the carbide itself, any special power for moving carbide is not needed.

Carbide is conveyed by the screw conveyor 101e and the screw conveyor 101f, in two stages, such that power which is required by the screw conveyors to rotate the screws is reduced, and thereby, an expensive motor having a large driving force is not needed.

The nitrogen replacement device 30b is included in the pyrolytic furnace 30, and is configured to replace, with inert nitrogen gas, oxygen contained in air supplied together with carbide from the screw conveyor 101f. The nitrogen replacement device 30b has electric control valves (for example, ball valves) which are disposed on the upper portion of the nitrogen replacement device 30b connected to the screw conveyor 101f and on the lower portion connected to the reaction tube head 33, respectively, and the open/closed states of which are controlled by the control apparatus 90.

The control apparatus 90 supplies carbide into the nitrogen replacement device 30b, by bringing the upper control valve into the opened state and the lower control valve into the closed state. When the amount of supplied carbide in the nitrogen replacement device 30b reaches a certain level, the control apparatus 90 stops the screw conveyor 101f from conveying carbide and closes the upper control valve of the nitrogen replacement device 30b.

Nitrogen gas is constantly supplied from a nitrogen-gas generating device such as an air separating device, to the nitrogen replacement device 30b. Accordingly, when a certain time has been elapsed since closing of the upper and lower control valves of the nitrogen replacement device 30b, air having been supplied together with carbide in the nitrogen replacement device 30b, is discharged to the outside so that the inside of the nitrogen replacement device 30b is replaced with nitrogen gas.

After the inside of the nitrogen replacement device 30b is replaced with nitrogen gas, the control apparatus 90 switches the lower control valve of the nitrogen replacement device 30b to the open state, and supplies carbide to the reaction tube head 33 from the nitrogen replacement device 30b. After supplying carbide to the reaction tube head 33 from the nitrogen replacement device 30b, the control apparatus 90 switches the lower control valve of the nitrogen replacement device 30b to the closed state. In addition, the control apparatus 90 thereafter switches the upper control valve of the nitrogen replacement device 30b to the open state, and supplies new carbide into the nitrogen replacement device 30b.

The control apparatus 90 controls opening/closing of the upper and lower control valves of the nitrogen replacement device 30b as described above, so that nitrogen gas is supplied together with carbide to the reaction tube head 33. Nitrogen gas is inert gas that does not react with water gas generated in the reaction tube 32. For this reason, air containing oxygen can be suppressed from being supplied together with carbide to the reaction tube 32, and thus, reduction in yield of water gas due to a reaction between oxygen and water gas can be suppressed.

The char recovery apparatus 41 includes a nitrogen replacement device 41a and a char recovery unit 41b. The nitrogen replacement device 41a substitutes, with inert nitrogen gas, water gas supplied together with unreacted carbide from the temperature decreaser 40. The char recovery unit 41b recoveries unreacted carbide and supplies the unreacted carbide to the nitrogen replacement device 30b through a supply path (not illustrated). The nitrogen replacement device 41a has electric control valves (for example, ball valves) which are disposed on the upper portion of the nitrogen replacement device 41a connected to the temperature decreaser 40 and on the lower portion connected to the char recovery unit 41b, respectively, and the open/closed states of which are controlled by the control apparatus 90.

By bringing the upper control valve to the open state and bringing the lower control valve in the lower portion to the closed state, the control apparatus 90 supplies unreacted carbide into the nitrogen replacement device 41a. When the amount of unreacted carbide supplied to the nitrogen replacement device 41a reaches a certain amount, the control apparatus 90 brings the upper control valve of the nitrogen replacement device 41a into the closed state.

Nitrogen gas is constantly supplied from a nitrogen-gas generating device such as an air separating device, to the nitrogen replacement device 41a. Accordingly, when a certain time has been elapsed since closing of the upper and lower control valves of the nitrogen replacement device 41a, water gas having been supplied together with unreacted carbide into the nitrogen replacement device 41a is discharged to the outside so that the inside of the nitrogen replacement device 41a is replaced with nitrogen gas. Water gas discharged from the nitrogen replacement device 41a is supplied to the flare stack 71.

After the inside of the nitrogen replacement device 41a is replaced with nitrogen gas, the control apparatus 90 switches the lower control valve of the nitrogen replacement device 41a to the open state, and supplies unreacted carbide to the char recovery unit 41b from the nitrogen replacement device 41a. After supplying unreacted carbide to the char recovery unit 41b from the nitrogen replacement device 41a, the control apparatus 90 switches the lower control valve of the nitrogen replacement device 41a to the closed state. In addition, the control apparatus 90 thereafter switches the upper control valve of the nitrogen replacement device 41a to the open state, and supplies new unreacted carbide into the nitrogen replacement device 41a.

As described above, the control apparatus 90 prevents water gas to be supplied together with unreacted carbide to the char recovery unit 41b, from being supplied to the char recovery unit 41b, by controlling opening/closing of the upper and lower control valves of the nitrogen replacement device 41a.

The residue recovery apparatus 51 includes a nitrogen replacement device 51a and a residue recovery unit 51b. The nitrogen replacement device 51a substitutes, with inert nitrogen gas, water gas supplied together with a residue from the cyclone 50. The residue recovery unit 51b recovers a residue discharged from the nitrogen replacement device 51a.

The nitrogen replacement device 51a has electric control valves (for example, ball valves) which are disposed on the upper portion of the nitrogen replacement device 51a connected to the cyclone 50 and on the lower portion connected to the residue recovery unit 51b, respectively, and the open/closed states of which are controlled by the control apparatus 90. Nitrogen gas is constantly supplied from a nitrogen-gas generating device such as an air separating device, to the nitrogen replacement device 51a.

The control apparatus 90 prevents water gas from being supplied to the residue recovery unit 51b, by controlling the control valves of the nitrogen replacement device 51a in a similar manner to that for controlling the control valves of the nitrogen replacement device 41a. Because the control apparatus 90 controls the nitrogen replacement device 51a using a similar method to that for controlling the control valves of the nitrogen replacement device 41a, the explanation thereof is omitted.

The steam generator 80 includes a steam generating unit 80a and a steam circulation tank 80b. The steam generating unit 80a includes a heat transfer tube (not illustrated) through which water to exchange heat with combustion gas is circulated, and a jacket (not illustrated) which is provided to a cylindrical body formed so as to cover the heat transfer tube and through which water is circulated. Water is supplied from the steam circulation tank 80b to the heat transfer tube and the jacket.

The water feed apparatus 82 supplies water to the steam circulation tank 80b, and the steam circulation tank 80b supplies water to the heat transfer tube and the jacket of the steam generating unit 80a. Hot water heated by the jacket and steam generated by the heat transfer tube heated by combustion gas are recovered to the steam circulation tank 80b. The steam circulation tank 80b supplies, to the steam superheater 81, steam (saturated steam) supplied from the heat transfer tube of the steam generating unit 80a.

Figure 14:
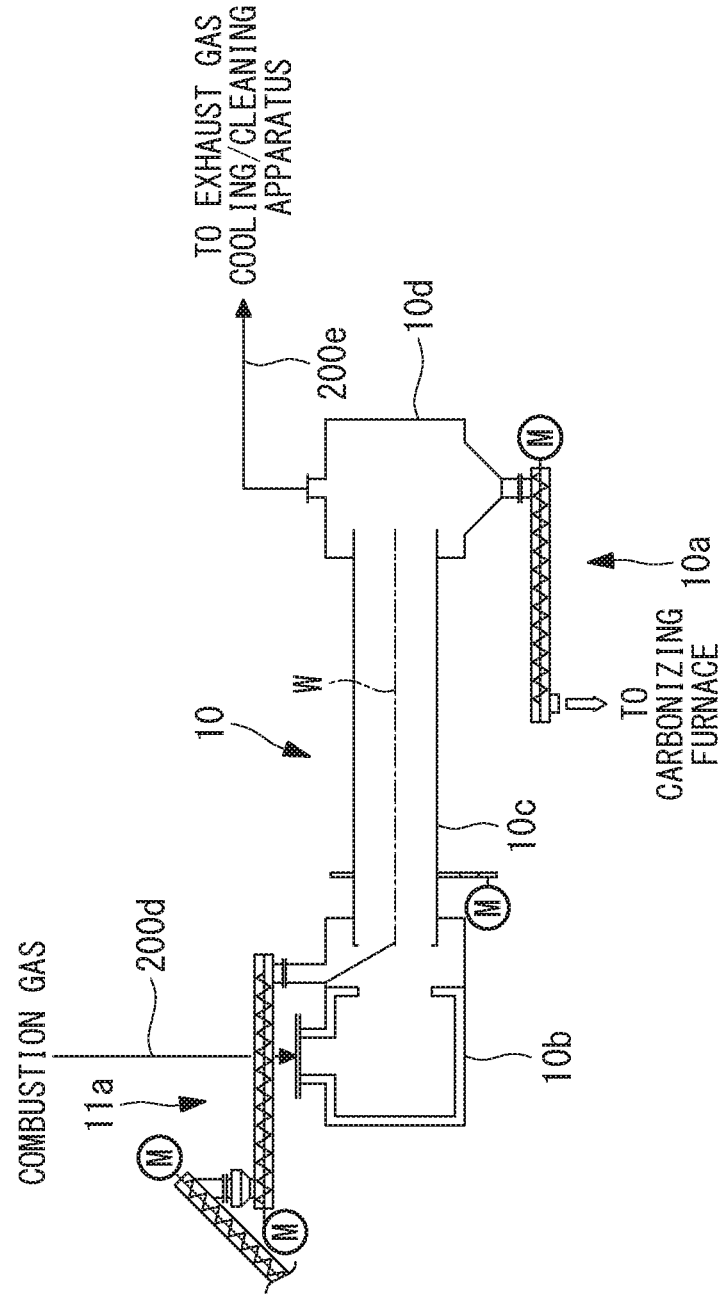
FIG. 14 is a configuration diagram illustrating a dryer illustrated in FIG. 1.

Next, the dryer 10 of the present embodiment is described in detail with reference to FIG. 14. The dryer 10 is a so-called rotary kiln type dryer, and includes a combustion gas introduction unit 10b, a rotary body 10c, and a discharge unit 10d. The combustion gas introduction unit 10b introduces combustion gas supplied from the combustion gas flow path 200d into the dryer 10, and guides the introduced combustion gas into the rotary body 10c.

The rotary body 10c is a cylindrical member formed so as to extend along an axial line W, and is rotated about the axial line W upon reception of rotation power from a driving motor. Further, organic waste is supplied from the raw material supply path 11a into the rotary body 10c. Organic waste supplied into the rotary body 10c is guided toward the discharge unit 10d while being dried by combustion gas guided from the combustion gas introduction unit 10b. Organic waste is heated directly by combustion gas while being stirred by rotation of the rotary body 10c, and conveyed from one end to the other end of the rotary body 10c by the flow of combustion gas.

The discharge unit 10d recovers dried organic waste which has been dried while being conveyed by the rotary body 10c and supplies the recovered organic waste to the raw material supply path 10a. Organic waste supplied to the raw material supply path 10a, is supplied to the carbonizing furnace 20 via the hopper 12. Further, the discharge unit 10d supplies combustion gas guided from the combustion gas introduction unit 10b through the inside of the rotary body 10c to the combustion gas flow path 200e. Combustion gas supplied to the combustion gas flow path 200e is supplied to the exhaust gas cooling/cleaning apparatus 13.

Operations and effects provided by the embodiment according to the present invention having been described above are described.

First, a description of the carbonizing furnace according to the present invention is given. In the carbonizing furnace 20 of one embodiment of the present invention, organic waste is charged from the organic waste charge portion 23 into the gap 20a which is formed between the inner circumferential surface 21d of the body part 21 and the outer circumferential surface 22a of the cylindrical part 22, and the organic waste is partially burned with primary combustion air supplied from the primary air supply unit 25 to the gap 20a. In the normal operation state of the carbonizing furnace 20, organic waste charged from the organic waste charge portion 23 is accumulated from the lower portion to the upper portion, along the axial line X, of the gap 20a between the body part 21 and the cylindrical part 22.

The upper side of the gap 20a is the primary combustion region R2 in which organic waste is partially burned with primary combustion air. In the primary combustion region R2, organic waste is partially burned with primary combustion air, and thereby, solid material containing much carbide and combustion gas containing combustible gas are generated. On the other hand, organic waste in the lower side of the gap 20a is covered with organic waste in the upper side, and the lower side is the carbide refining/cooling region R1 in which solid material containing much carbide is refined and cooled. In the carbide refining/cooling region R1, solid material containing much carbide is further carbonized and refined in a state where the concentration of oxygen is low, and the fire is gradually extinguished as approaching the lower end of the gap 20a. Accordingly, carbide discharged from the lower end of the gap 20a is cooled.

Further, the carbonizing furnace 20 of one embodiment of the present invention has a system which includes, in addition to the primary air supply unit 25 configured to supply primary combustion air for partial combustion of organic waste toward the gap 20a, the secondary air supply unit 26 configured to supply, to the secondary combustion region R4 in the body part 21, secondary combustion air for combustion of combustible gas contained in combustion gas, and in which the supply amount of secondary combustion air from the secondary air supply unit 26 is controlled by the carbonizing furnace control unit 29, according to a temperature detected by the temperature sensor 28a.

However, there have conventionally been problems including: 1) the problem of polymer hydrocarbon which is contained in combustible gas generated by partial combustion of organic waste and which is coagulated, while being cooled, to become liquid (referred to as "tar" in some cases) having high viscosity; 2) the problem of occurrence of fire due to a damage to a carbide conveyance mechanism or contact between air and discharged carbide, which may be caused by insufficient cooling of carbide generated by partial combustion of organic waste; and 3) the problem of the carbonization efficiency of carbide generated by partial combustion of organic waste.

The problem of polymer hydrocarbon is caused as follows. In a case where the amount of secondary combustion air is excessively increased relative to an amount required for complete combustion of combustible gas contained in combustion gas in the secondary combustion region R4, and where much surplus air which is not used for combustion of combustible gas is supplied to the secondary combustion region R4, the temperature of air (the atmosphere) sent from the secondary combustion fan 26a is lower than the atmospheric temperature of the secondary combustion region R4. Accordingly, due to much surplus air, the atmospheric temperature of the secondary combustion region R4 is reduced. As a result, the combustion efficiency of combustible gas in the secondary combustion region R4 is deteriorated and combustion gas containing much combustible gas is discharged from the combustion gas discharge portion 27. Such combustible gas contains polymer hydrocarbon which becomes tar by being coagulated. Accordingly, if a large amount of tar contained in combustible gas is coagulated, the carbonizing furnace 20 and the devices set downstream therefrom are damaged.

Therefore, in the carbonizing furnace 20 according to one embodiment of the present invention, when determining that the combustion gas temperature Tg detected by the temperature sensor 28a is lower than the first combustion gas temperature Tg1, the carbonizing furnace control unit 29 reduces the amount of air sent from the secondary combustion fan 26a such that the amount of surplus air to be supplied to the secondary combustion region R4 is reduced. This provides an advantageous effect that the atmospheric temperature of the secondary combustion region R4 is kept without being reduced, combustible gas is burned such that combustion gas does not contain a large amount of a component which becomes tar by being coagulated, and thereby, damages to the carbonizing furnace 20 and the devices set downstream therefrom can be suppressed.

In contrast, if the combustion gas temperature Tg becomes excessively high, expensive material having excellent heat resistance are required for the carbonizing furnace 20 and the combustion gas flow path 200a.

In order to address this problem, when determining that the combustion gas temperature Tg detected by the temperature sensor 28a is higher than the first combustion gas temperature Tg1, the carbonizing furnace control unit 29 controls the supply amount of secondary combustion air from the secondary air supply unit 26 such that the combustion gas temperature Tg becomes lower than the second combustion gas temperature Tg2. As a result, the temperature Tg of combustion gas discharged from the combustion gas discharge portion 27 becomes equal to and lower than the second combustion gas temperature Tg2. Thus, a heat resistant temperature required for the carbonizing furnace 20 and the combustion gas flow path 200a which guides combustion gas from the carbonizing furnace 20 to the pyrolytic furnace 30 can be set to the combustion gas temperature Tg2 or lower. Therefore, this provides an advantageous effect that the carbonizing furnace 20 and the combustion gas flow path 200a can be manufactured from inexpensive materials each having a relatively low heat resistant temperature.

Regarding the combustion gas temperature Tg, it is preferable that the carbonizing furnace control unit 29 controls the supply amount of secondary combustion air such that the first combustion gas temperature Tg1 and the second combustion gas temperature Tg2 are 900° C. and 1300° C., respectively. Moreover, it is more preferable that the carbonizing furnace control unit 29 controls the supply amount of secondary combustion air such that the first combustion gas temperature Tg1 and the second combustion gas temperature Tg2 are 1000° C. and 1200° C., respectively. As a result, combustion gas can be burned in the secondary combustion region R4 inside the carbonizing furnace 20 in such a way that much polymer hydrocarbon, which forms tar by being coagulated, is not contained in combustion gas, and a heat resistant temperature required for the carbonizing furnace 20 and the combustion gas flow path 200a which guides combustion gas from the carbonizing furnace 20 to the pyrolytic furnace 30 can be further lowered.

The problem of the temperature of carbide is caused as follows. When charge of organic waste from the charge portion 23 to the gap 20a is stopped, the amount of organic waste accumulated in the gap 20a gradually decreases, and thus, the carbide refining/cooling region R1 in which fire burning carbide is extinguished is gradually narrowed. In this case, if the rotational speed of the turntable 24a is kept constant, carbide having a high temperature after undergoing carbonization in the primary combustion region R2 is not sufficiently cooled in the carbide refining/cooling region R1. This causes a problem that carbide that has not sufficiently been cooled is discharged from the lower end portion of the gap 20a.

Accordingly, in the carbonizing furnace 20 of one embodiment according to the present invention, the carbonizing furnace control unit 29 controls the discharge amount of carbide to be discharged to the outside by the carbide discharge unit 24, according to the temperature of carbide detected by the temperature sensor 28b. More specifically, when the temperature of carbide detected by the temperature sensor 28b is lower than the first carbide temperature Tc1, the carbonizing furnace control unit 29 controls the driving unit 24b to rotate the turntable 24a at the first rotational speed Rs1, and when the temperature of carbide detected by the temperature sensor 28b is equal to or higher than the first carbide temperature Tc1, the carbonizing furnace control unit 29 controls the driving unit 24b to rotate the turntable 24a at the second rotational speed Rs2 lower than the first rotational speed Rs1.

When the temperature of carbide detected by the temperature sensor 28b is equal to or higher than the first carbide temperature Tc1, the carbonizing furnace control unit 29 reduces the rotation speed at which the turntable 24a is rotated. Accordingly, the amount of carbide being guided from the lower end portion of the gap 20a to the carbide discharge port 24c per unit time is reduced. As a result, a time during which carbide having been carbonized in the primary combustion region R2 to have high temperature resides in the lower portion of the gap 20a becomes longer, the carbide is sufficiently cooled in the carbide refining/cooling region R1, and thus, an advantageous effect that carbide having been sufficiently cooled is discharged from the lower end portion of the gap 20a, is provided.

Therefore, the one embodiment of the present invention can provide the carbonizing furnace 20 in which carbide obtained by combustion of organic waste is discharged after the temperature thereof is appropriately reduced. For example, even when charge of organic waste is stopped, the temperature of carbide to be discharged can be appropriately reduced. In addition, since carbide the temperature of which has been appropriately lowered can be discharged from the carbonizing furnace, the problem that contact between discharged carbide and air causes fire again can be solved.

The same problem also can be solved by another embodiment of the present invention. The solution is as follows. In the carbonizing furnace 20 according to one embodiment of the present invention, the carbonizing furnace control unit 29 controls the discharge amount of carbide to be discharged to the outside by the carbide discharge unit 24, according to the deposit amount Ao of organic waste detected by the level sensor 28d. More specifically, when the deposit amount of carbide detected by the level sensor 28d is equal to or larger than the first deposit amount Ao1, the carbonizing furnace control unit 29 controls the driving motor 24e to rotate the turntable 24a at the first rotational speed Rs1, and when the deposit amount of carbide detected by the level sensor 28d is equal to or smaller than the first deposit amount Ao1, the carbonizing furnace control unit 29 controls the driving motor 24e to rotate the turntable 24a at the second rotational speed Rs2 lower than the first rotational speed Rs1.

When the deposit amount of organic waste detected by the level sensor 28d is equal to or smaller than the first deposit amount Ao1, the carbonizing furnace control unit 29 reduces the rotation speed at which the turntable 24a is rotated. Accordingly, the amount of carbide being guided from the lower end portion of the gap 20a to the carbide discharge port 24c per unit time is reduced. As a result, a time during which carbide that is carbonized in the primary combustion region R2 to have high temperature resides in the lower portion of the gap 20a becomes longer, the carbide is sufficiently cooled in the carbide refining/cooling region R1, and thus, an advantageous effect that carbide having been sufficiently cooled is discharged from the lower end portion of the gap 20a, is provided.

Either one of the aforementioned means can solve the problem of occurrence of fire which may be caused by damage to a carbide conveyance mechanism or contact between air and discharged carbide when carbide generated by partial combustion of organic waste is not sufficiently cooled. However, more stable control of the carbide temperature can be achieved by use of both the means.

Next, the problem of the carbonization efficiency of organic waste is described. The cause of the problem of the carbonization efficiency of organic waste is as follows. When external air (the atmosphere) is used as primary combustion air to be supplied to the primary combustion region R2, the atmospheric temperature of the primary combustion region R2 is lowered due to external air because the temperature of external air is lower than the atmospheric temperature of the primary combustion region R2.

In order to address this problem, in the carbonizing furnace 20 according to one embodiment of the present invention, air sent from the primary combustion fan 25a is heated by the heat dissipation fins 25e, and the heated air is supplied through the air supply ports 25c to the gap 20a. Since air to be supplied to the gap 20a is heated by the heat dissipation fins 25e, reduction of the atmospheric temperature of the primary combustion region R2 can be further suppressed, compared to a case where air to be supplied to the gap 20a is not heated. Therefore, the embodiment of the present invention can provide the carbonizing furnace 20 capable of improving the carbonization efficiency of organic waste while supplying external air as air for combustion of organic waste.

Furthermore, it is preferable that at least one of the following various means for solving the problem of the carbonization efficiency is incorporated in the aforementioned means.

As first means, it is preferable that the primary air supply unit 25 of the carbonizing furnace 20 according to one embodiment of the present invention includes the cover portion 25b that is disposed on the outer circumferential side of the gap 20a and that forms, between the outer circumferential surface 21e of the body part 21 and the cover portion 25b, the closed space 25d extending around the axial line X. As a result of provision of the closed space 25d, air externally introduced by the primary combustion fan 25a is heated in the closed space 25d, and is further heated by the heat dissipation fins 25e disposed inside the closed space 25d, and thus, an advantageous effect that air can be supplied through the air supply ports 25c to the gap 20a after being sufficiently heated in an efficient manner, is provided.

As second means, it is preferable that the heat dissipation fins 25e of the primary air supply unit 25 in the carbonizing furnace 20 according to one embodiment of the present invention is used as the heat transfer member that transfers heat of the atmospheric temperature of the gap 20a via the outer circumferential surface 21e of the body part 21. As a result, an advantageous effect that air externally introduced by the primary combustion fan 25a can be heated by not using a dedicated heat source for heating the closed space 25d, but using the atmospheric temperature of the gap 20a in the carbonizing furnace 20 is provided.

As third means, in the carbonizing furnace 20 according to one embodiment of the present invention, the heat dissipation fins 25e of the primary air supply unit 25 are disposed below the air supply ports 25c. Through the air supply ports 25c, air is supplied toward the gap 20a. Thus, the outer circumferential surface 21e, of the body part 21, below the air supply ports 25c is a region to which heat of the atmospheric temperature of the gap 20a is transferred, and heat of the atmospheric temperature of the gap 20a is also transferred to the heat dissipation fins 25e via the outer circumferential surface 21e of the body part 21. Therefore, an advantageous effect that air externally introduced by the primary combustion fan 25a can be efficiently heated by the heat dissipation fins 25e, and can be supplied through the air supply port 25c to the gap 20a, is provided.

As fourth means, in the carbonizing furnace 20 according to one embodiment of the present invention, the primary combustion fan 25a of the primary air supply unit 25 supplies externally introduced air toward the outer circumferential surface 21e, of the body part 21, at a position on the lower outer circumferential side of the gap 20a. Since the lower portion in the gap 20a is the carbide refining/cooling region R1 in which solid material containing much carbide generated by combustion of organic waste is refined and cooled, the temperature of the lower portion of the gap 20a is desired to be kept at relatively low temperature. According to the present embodiment, the outer circumferential surface 21e, of the body part 21, at the position on the lower outer circumference side of the gap 20a is cooled by air sent by the primary combustion fan 25a, and thus, an advantageous effect that the temperature of the lower portion in the gap 20a can be kept relatively low, is provided.

As fifth means, in the carbonizing furnace 20 according to one embodiment of the present invention, the distance D2 from the inner circumferential surface 21d to the outer circumferential surface 21e of the body part 21 at a position at which the heat dissipation fins 25e are disposed is shorter than the distance D1 from the inner circumferential surface 21d to the outer circumferential surface 21e of the body part 21 at a position at which the air supply ports 25c are disposed. Accordingly, heat of the atmosphere of the gap 20a is more easily transferred to the position at which the heat dissipation fins 25e are disposed. Therefore, heat of the atmosphere of the gap 20a is more efficiently transferred via the heat dissipation fins 25e, so that air externally introduced by the primary combustion fan 25a can be heated to higher temperature.

As sixth means, in the carbonizing furnace 20 according to one embodiment of the present invention, the heat dissipation fins 25e are in contact with the outer circumferential surface 21e of the body part 21, are each formed into an annular shape extending around the axial line X and along the outer circumferential surface 21e, and are disposed at a plurality of positions along the axial line X. The adjacent heat dissipation fins 25e provided at the plurality of positions along the axial line X, form a plurality of air flow paths extending along the outer circumferential surface 21e of the body part 21. Therefore, an advantageous effect that air flowing through the air flow paths is efficiently heated, is provided.

Moreover, it is more preferable that the heat dissipation fins 25e are in contact with the outer circumferential surface 21e of the body part 21, and form a spiral flow path upwardly swirling about the axial line X and along the outer circumferential surface 21e. As a result of formation of the spiral flow path, air sent by the primary combustion fan 25a is guided to the air supply ports 25c while upwardly swirling about the axial line X and along the outer circumferential surface 21e. Therefore, the flow of air becomes smooth and an effect of heating air flowing through the air flow path formed by the heat dissipation fins 25e is improved.

Next, the pyrolytic furnace according to the present invention is described. Conventional pyrolytic furnaces suffer from the problem of outflow, to the outside, of combustion gas which has been generated by the carbonizing furnace and which is to be supplied to the gap between the outer cylinder and the inner cylinder and outflow, to the outside, of water gas generated by the pyrolytic furnace, and the problem of the yield of water gas.

First, outflow of combustion gas is described. In the pyrolytic furnace 30 according to one embodiment of the present invention, carbide supplied from the reaction tube head 33 into the reaction tube 32 and superheated steam as a gasification agent are heated by high-temperature combustion gas (heating gas) flowing through the combustion gas flow path 30a. Accordingly, a pyrolysis reaction is caused to generate water gas. Here, the outer circumferential surface 32d of the reaction tube 32 is heated by combustion gas flowing through the combustion gas flow path 30a and expands due to heat, so that the length of the reaction tube 32 along the axial line Z increases. The reaction tube 32 is disposed so as to extend along the axial line Z. Thus, when the state where the lower end 32c of the reaction tube 32 is fixed to the bottom plate 31e of the body part 31 is maintained even if the reaction tube 32 expands due to heat, there is a possibility that the upper end flange 32b of the reaction tube 32 is moved upward in terms of the position along the axial line Z, due to heat expansion of the reaction tube 32.

Therefore, the pyrolytic furnace 30 according to one embodiment of the present invention includes the gland packing 37 that is provided below the upper plate 31d of the body part 31 so as to be in contact with the upper plate 31d. The gland packing 37 is an annular member, in planar view, having the inner circumferential surface 37d in contact with the outer circumferential surface 32d of the reaction tube 32. When the reaction tube 32 expands due to heat, the outer circumferential surface 32d of the reaction tube 32 and the inner circumferential surface 37d of the gland packing 37 slide relatively to each other, but the state in which a seal region is formed by contact between the outer circumferential surface 32d of the reaction tube 32 and the inner circumferential surface 37d of the gland packing 37 is maintained. Moreover, since the gland packing 37 is provided so as to be in contact with the upper plate 31d, the state in which a seal region is also formed between the gland packing 37 and the upper plate 31d is maintained.

Therefore, according to the one embodiment of the present invention, an advantageous effect that, when the reaction tube 32, in which a pyrolysis reaction is caused by combustion gas flowing between the body part 31 and the reaction tube 32, expands due to heat, outflow of combustion gas to the outside from the gap between the upper plate 31d of the body part 31 and the outer circumferential surface 32d of the reaction tube 32 can be suppressed, is provided.

Further, in the pyrolytic furnace 30 according to one embodiment according to the present invention, since the lower end 32c of the reaction tube 32 protrudes downward from the bottom plate 31e of the body part 31, the same phenomenon as that occurring in the upper end of the reaction tube 32 may occur. Therefore, the pyrolytic furnace 30 according to one embodiment of the present invention includes the gland packing 38 that is provided on the upper side of the bottom plate 31e of the body part 31 so as to be in contact with the bottom plate 31e and that has the inner circumferential surface 38d in contact with the outer circumferential surface 32d of the reaction tube 32. The gland packing 38 is an annular member, in planar view, having the inner circumferential surface 38d in contact with the outer circumferential surface 32d of the reaction tube 32. The reaction tube 32, which is heated, has a temperature distribution. Since expansion of the reaction tube 32 due to heat is relatively small at the lower end 32c side, a state in which a seal region is formed by contact between the outer circumferential surface 32d of the reaction tube 32 and the inner circumferential surface 38d of the gland packing 38 is maintained. Further, since the gland packing 38 is provided so as to be in contact with the bottom plate 31e, a state in which a seal region is also formed between the gland packing 38 and the bottom plate 31e is maintained.

Therefore, according to the one embodiment of the present invention, an advantageous effect that outflow of combustion gas to the outside from the gap between the bottom plate 31e of the body part 31 and the outer circumferential surface 32d of the reaction tube 32, in which a pyrolysis reaction is caused by combustion gas flowing between the body part 31 and the reaction tube 32, can be suppressed, when the reaction tube 32 expands due to heat, is provided.

In addition, in the pyrolytic furnace 30 according to one embodiment of the present invention, fastening portions are provided with means for addressing the possibility that combustion gas outflows from the fastening portions due to heat expansion of the reaction tube 32 caused by high-temperature combustion gas flowing though the combustion gas flow path 30a. The fastening portions are the position at which the upper plate 31d and the upper end flange portion 31g are fastened to each other, and the position at which the bottom plate 31e and the lower end flange 31i are fastened to each other.

That is, in the pyrolytic furnace 30 according to the one embodiment of the present invention, the upper end flange 31g provided on the upper end of the lateral surface 31f of the body part 31 and the upper plate 31d are fastened to each other by the fastening bolts 31h at a plurality of positions around the axial line Z, with a gasket interposed between the upper end flange 31g and the upper plate 31d. Also, the lower end flange 31i provided on the lower end of the lateral surface 31f of the body part 31 and the bottom plate 31e are fastened to each other by the fastening bolts 31j at a plurality of positions around the axial line Z, with a gasket interposed between the lower end flange 31i and the bottom plate 31e. As a result, an advantageous effect that, at the position at which the upper plate 31d and the upper end flange portion 31g are fastened to each other and at the position at which the bottom plate 31e and the lower end flange 31i are fastened to each other, combustion gas flowing through the combustion gas flow path 30a can be suppressed from outflowing to the outside, is provided.

Similarly, water gas may outflow at the attachment position of the reaction tube 32 due to thermal expansion of the reaction tube 32. At the attachment position, the water gas outlet nozzle 34 and the reaction tube head 33 are attached.

In the pyrolytic furnace 30 according to one embodiment of the present invention, the water gas outlet nozzle 34 that guides, to the outside, water gas generated by a pyrolysis reaction of carbide in the reaction tube 32 is attached at the lower end 32c of the reaction tube 32. The gland packing 39 that blocks outflow of water gas from the attachment position of the water gas outlet nozzle 34 is provided. The gland packing 39 has an annular shape, in planar view, having the inner circumferential surface 39d in contact with both the outer circumferential surface 32d of the reaction tube 32 and the outer circumferential surface 34a of the water gas outlet nozzle 34. Therefore, the one embodiment of the present invention provides an advantageous effect that water gas generated in the reaction tube 32 can be suppressed from outflowing to the outside from the attachment position of the lower end 32c of the reaction tube 32 and the water gas outlet nozzle 34.

In addition, in the pyrolytic furnace 30 according to one embodiment of the present invention, the reaction tube 32 is provided with the upper end flange 32b, and the lower end of the reaction tube head 33 is provided with the lower end flange 33a. The upper end flange portion 32b of the reaction tube 32 and the lower end flange portion 33a of the reaction tube head 33 are fastened to each other with the fastening bolts 33d at a plurality of positions around the axial line Z with a gasket interposed therebetween. As a result, an advantageous effect that water gas generated in the reaction tube 32 can be suppressed from outflowing to the outside from the position at which the lower end flange 33a of the reaction tube head 33 and the upper end flange 32b of the reaction tube 32 are fastened to each other, is provided.

Next, the problem of the yield of water is described. In the pyrolytic furnace 30 according to one embodiment of the present invention, carbide supplied from the reaction tube head 33 into the reaction tube 32 and superheated steam which is a gasification agent are moved from the upper end to the lower end of the reaction tube 32, and thus, the entire region from the upper end to the lower end of the reaction tube 32 is heated by high-temperature combustion gas flowing through the combustion gas flow path 30a, and a pyrolysis reaction is caused to generate water gas. Since a pyrolysis reaction between the carbide and the superheated steam is an endothermic reaction, the atmospheric temperature inside and at the upper end side of the reaction tube 32 is likely to decrease, so that a phenomenon occurs in which the atmospheric temperature inside the reaction tube 32 is lowered. Accordingly, there is the possibility that a pyrolysis reaction is not promoted and the yield of water gas is deteriorated.

Therefore, first, in the pyrolytic furnace 30 according to one embodiment of the present invention, the combustion gas supply portion 35 through which combustion gas is supplied to the combustion gas flow path 30a is provided in the upper portion of the body part 31, and the combustion gas discharge portion 36 through which combustion gas is discharged from the combustion gas flow path 30a is provided in the lower portion of the body part 31. As a result, high-temperature combustion gas is supplied from the upper end side of the reaction tube 32, where the inner atmospheric temperature is easily lowered, and thus, generation of a region where temperature reduction occurs can be suppressed at the upper end side of the reaction tube 32. Therefore, deterioration of the yield of water gas due to reduction in the atmospheric temperature inside the reaction tube 32 can be suppressed.

Further, in the pyrolytic furnace 30 according to one embodiment of the present invention, the reaction tube 32 includes the center pipe 32a that is formed into a cylindrical shape extending along the axial line Z and the pyrolysis promoting mechanism that is accommodated in the pyrolytic furnace 30 and that promotes a pyrolysis reaction between carbide and superheated steam (a gasification agent) by guiding carbide supplied from the upper end to the lower end 32c in a stepwise manner. Specifically, the pyrolysis promoting mechanism is formed of the plurality of first inclined plates 32f, the plurality of second inclined plates 32g, and the plurality of holding bars 32h holding these plates.

The first inclined plates 32f have the respective first inclined surfaces that are inclined so as to guide carbide from one end of the inner circumferential surface 32e of the reaction tube 32 to the first opening portion 32i provided in the other end. On the other hand, the second inclined plates 32g have the respective second inclined surfaces that are inclined so as to guide carbide having fallen downward from the first opening portion 32i, from the other end of the inner circumferential surface 32e of the reaction tube 32 to the second opening portion 32j provided in the one end.

The first inclined plates 32f and the second inclined plates 32g are held by the plurality of holding bars 32h so as to be alternately disposed along the axial line Z. Accordingly, carbide repeats stepwise movement in which carbide falls downward from the upper end of the reaction tube 32 onto the first inclined surface, is guided to the first opening portion 32i to fall onto the second inclined surface, and then, is guided to the second opening portion 32j to further fall downward. In this way, an advantageous effect that a time period during which carbide resides in the reaction tube 32 becomes longer (for example, 10 to 15 seconds), a pyrolysis reaction is accordingly promoted, and thereby, the yield of water gas is improved, is provided.

It is preferable that the pyrolysis promoting mechanism composed of the plurality of first inclined plates 32f, the plurality of second inclined plates 32g, and the plurality of holding bars 32h holding these plates is attachable/detachable to/from the center pipe 32a, although an advantageous effect provided in this case is indirect one. Specifically, the upper end flange 32b and the lower end flange 33a of the reaction tube head 33 are fastened to the reaction tube 32 with the fastening bolts 33d. When the fastening bolts 33d are removed, the pyrolysis promoting mechanism can be easily removed from the center pipe 32a. Thus, the plurality of first inclined plates 32f, the plurality of second inclined plates 32g, and the plurality of holding bars 32h holding these plates, which are included in the pyrolysis promoting mechanism, can be easily cleaned. Such cleaning is efficiently performed, and thus, an advantageous effect of improving the yield of water gas is provided.

Moreover, the pyrolytic furnace 30 according to one embodiment of the present invention has, at the outside thereof, the char recovery apparatus 41 that recovers unreacted carbide (char) discharged from the water gas outlet nozzle 34 of the pyrolytic furnace 30 and supplies recovered carbide again to the reaction tube head 33 of the pyrolytic furnace 30. As a result of re-supply of unreacted carbide recovered by the char recovery apparatus 41 to the reaction tube head 33, the yield of water gas can be further improved.

Finally, the water gas generation system, the hydrogen gas generation system, and the power generation system are described.

Conventional water gas generation systems use dedicated heat sources for generating superheated steam to be used as gasification agents for carbide and heat sources for drying organic waste, and thus, suffer from the problem of the low thermal efficiency of entire systems.

Thus, the water gas generation system 100 according to one embodiment of the present invention has the configuration below. The carbonizing furnace 20 generates carbide and combustion gas by partial combustion of organic waste, and supplies carbide to the reaction tube head 33 of pyrolytic furnace 30. Carbide supplied to the reaction tube head 33 is supplied together with superheated steam, which is also supplied to the reaction tube head 33, into the center pipe 32a through the upper end side of the center pipe 32a of the reaction tube 32. On the other hand, combustion gas supplied from the carbonizing furnace 20 to the combustion gas flow path 200a is supplied to the combustion gas supply port 35 of the pyrolytic furnace 30 while keeping the high temperature thereof. Combustion gas supplied from the combustion gas supply port 35 to the combustion gas flow path 30a is guided downwardly while heating the upper end side of the center pipe 32a of the reaction tube 32, and is discharged from the combustion gas discharge portion 36 in the lower end side of the center pipe 32a to the combustion gas flow path 200b. Since the high-temperature state inside the reaction tube 32 is maintained by combustion gas, a pyrolysis reaction between carbide and superheated steam is promoted inside the reaction tube 32.

In this way, according to the water gas generation system 100 of the embodiment of the present invention, combustion gas generated by the carbonizing furnace 20 is supplied to the pyrolytic furnace 30, while keeping the high temperature thereof without exchanging heat with another heat medium. Therefore, a pyrolysis reaction can be further promoted to improve the yield of water gas, compared to a case where combustion gas the temperature of which has been reduced by heat exchange with another heat medium is supplied to the pyrolytic furnace 30.

Furthermore, in the water gas generation system 100 according to one embodiment of the present invention, combustion gas having been used for promoting a pyrolysis reaction in the pyrolytic furnace 30 is used for a heat source for the steam superheater 81, and further, is used for a heat source for the steam generator 80. The steam superheater 81 generates superheated steam having a temperature equal to or higher than the saturated temperature, by heating saturated water steam generated by the steam generator 80 while keeping the pressure thereof. The steam generator 80 generates saturated water steam by heating water that is liquid. For this reason, the steam superheater 81 requires a heat source having higher temperature than that for the steam generator 80. Thus, as a result of supply of combustion gas to the steam superheater 81 and then to the steam generator 80, water steam can be generated from water that is liquid, and the water steam can be heated to generate superheated steam and be supplied, as a gasification agent, to the pyrolytic furnace 30. Therefore, as a result of generation of superheated steam having an appropriately increased temperature in the steam superheater 81, an advantageous effect that condensation of water steam in the pyrolytic furnace 30 can be prevented even if the temperature of superheated steam in the pyrolytic furnace 30 is reduced due to a pyrolysis reaction (an endothermic reaction), is provided.

As described above, according to the water gas generation system 100 of the one embodiment of the present invention, combustion gas that has been used to promote a pyrolysis reaction in the pyrolytic furnace 30 is also used as a heat source for generating superheated steam from water. Therefore, compared to a case where a dedicated heat source is used for generating superheated steam, the thermal efficiency of the entire water gas generation system 100 can be improved.

Moreover, in the water gas generation system 100 according to one embodiment of the present invention, combustion gas having been used as a heat source for water steam generation by the steam generator 80, is thereafter supplied to the dryer 10 though the combustion gas flow path 200d. Although combustion gas supplied to the dryer 10 has a lowered temperature after being used as a heat source for the steam superheater 81 and the steam generator 80, the temperature thereof is still high enough to reduce moisture contained in organic waste such as wood biomass. Accordingly, compared to a case where a dedicated heat source for drying organic waste is used, the thermal efficiency of the entire water gas generation system 100 can be improved.

It is more preferable that, in the water gas generation system 100 according to one embodiment of the present invention, combustion gas discharged from the carbonizing furnace 20 is used as a heat source for the pyrolytic furnace 30, the steam superheater 81, the steam generator 80, and the dryer 10, and thereafter, is supplied to the exhaust gas cooling/cleaning apparatus 13. The exhaust gas cooling/cleaning apparatus 13 needs to reduce the temperature of combustion gas so as to discharge combustion gas to the atmosphere. However, the temperature of combustion gas supplied to the exhaust gas cooling/cleaning apparatus 13 has been sufficiently reduced by being used as a heat source for drying organic waste. Accordingly, according to the water gas generation system 100 of the one embodiment of the present invention, the width of temperature to be reduced by the exhaust gas cooling/cleaning apparatus 13 is narrowed, so that the exhaust gas cooling/cleaning apparatus 13 can be manufactured at relatively low cost.

As described above, according to the water gas generation system 100 of the one embodiment according to the present invention, the thermal efficiency can be improved without using a dedicated heat source for generating superheated steam to be used as a gasification agent for carbide, and the water gas generation system 100 capable of promoting a pyrolysis reaction in the pyrolytic furnace 30 can be provided. Moreover, an advantageous effect that not only combustion gas can be used as a heat source for drying organic waste so as to improve the thermal efficiency of the entire water gas generation system 100, but also the exhaust gas cooling/cleaning apparatus 13 can be manufactured at relatively low cost, is provided.

The carbonizing furnace which is also exemplified as one embodiment of the present invention and which discharges carbide having high combustion efficiency and having appropriately reduced temperature when being discharged after combustion, and which achieves high carbonization efficiency, and the pyrolytic furnace which is exemplified as one embodiment of the present invention and in which outflow of heating gas to the outside is suppressed and a pyrolysis reaction is provided, are applied to the water gas generation system 100 of one embodiment according to the present invention. Accordingly, a water gas generation system capable of more efficiently generating water gas having higher purity can be provided.

The water gas generation system 100 which is one embodiment of the present invention can efficiently generate water gas having higher purity so that the hydrogen gas generation system having excellent productivity can be configured. In conventional systems for generating hydrogen gas from water gas, the purity of water gas is low. Thus, a hydrogen gas generation system requires a facility which removes impurity or enhances the concentration of hydrogen (for example, NPL 2). However, the hydrogen gas generation system that is one embodiment of the present invention includes the water gas generation system 100 that is one embodiment of the present invention and the general hydrogen purification apparatus 73 that adsorbs impurity, and can efficiently generate hydrogen gas.

Similarly, the water gas generation system 100 according to one embodiment of the present invention can efficiently generate high-purity water gas having the constant composition ratio, and thereby, can configure a power generation system with excellent productivity. In conventional systems for power generation from water gas, since the purity of water gas is low, the combustion efficiency is poor, and impurity substance is removed in some cases. However, the power generation system according to one embodiment of the present invention includes the water gas generation system 100 according to one embodiment of the present invention and the general power generation equipment 72 that operates by combustion of water gas, and thus, can efficiently produce electricity.

OTHER EMBODIMENTS

The present invention is not limited to the above embodiments, and changes may be optionally made without departing from the scope of the present invention.

INDUSTRIAL APPLICABILITY

The carbonizing furnace and the pyrolytic furnace, and the water gas generation system, the hydrogen gas generation system, and the power generation system which include the carbonizing furnace and the pyrolytic furnace according to the present invention generate carbide obtained by direct combustion of biomass, particularly, organic waste derived from living resources, and perform energy conversion using the carbide. Thus, the furnaces and systems can be used as renewable energy production apparatuses and systems that make a significant contribution over establishment of a recycling-based society structure which results in reuse and reduction of organic waste.

The carbonizing furnace can be used not only for producing carbide to be used by the pyrolytic furnace but also for producing alternative fuel to coal. The pyrolytic furnace is effective for pyrolysis of not only carbide produced by the carbonizing furnace according to the present invention but also carbide produced by other various methods.

REFERENCE SIGNS LIST

10 Dryer
20 Carbonizing furnace
20a Gap
21 Body part
22 Cylindrical part (cylinder part)
23 Organic waste charge portion (charge portion)
24 Carbide discharge unit
24a Turntable (rotary body)
24b Driving unit
24c Carbide discharge port (discharge port)
24d Clinker crusher
25 Primary air supply unit (first air supply unit)
25a Primary combustion fan (air blowing unit)
25b Cover portion
25c Air supply port
25d Closed space
25e Heat dissipation fin (heating unit)
26 Secondary air supply unit (second air supply unit)
26a Secondary combustion fan
26b Cover portion
26c Air supply port
26d Closed space
27 Combustion gas discharge portion
28a, 28b, 28c Temperature sensor (temperature detection unit)
28d Level sensor (deposit amount detection unit)
29 Carbonizing furnace control unit (control unit)
30 Pyrolytic furnace
30a Combustion gas flow path (heating gas flow path)
31 Body part
32 Reaction tube
32a Center pipe (tubular member)
32b Upper end flange (third flange portion)
32c Lower end
32f First inclined plate
32g Second inclined plate
32h Holding bar (holding part)
33 Reaction tube head (supply portion)
33a Lower end flange (fourth flange portion)
33d Fastening bolt (fastening member)
34 Water gas outlet nozzle (water gas outlet portion)
35 Combustion gas supply portion (heating gas supply portion)
36 Combustion gas discharge portion (heating gas discharge portion)
40 Temperature decreaser
41 Char recovery apparatus
60 Water gas cooling apparatus
70 Water gas holder
80 Steam generator
81 Steam superheater
82 Water feed apparatus
90 Control apparatus
100 Water gas generation system
102, 103, 104 Water gas supply path
200a, 200b, 200c, 200d, 200e Combustion gas flow path
R1 Carbide refining/cooling region
R2 Primary combustion region
R3 Raw material charge region
R4 Secondary combustion region
W, X, Y, Z Axial line

The invention claimed is:
1. A water gas generation system comprising:
a carbonizing furnace that generates carbide and combustion gas by partial combustion of organic waste;
a pyrolytic furnace that generates water gas by heating, with the combustion gas, water steam and the carbide generated by the carbonizing furnace;
a steam generator that generates the water steam by heating water with the combustion gas;
a steam superheater that superheats, with the combustion gas, the water steam generated by the steam generator and that supplies the superheated water steam to the pyrolytic furnace;
a dryer that dries the organic waste with the combustion gas and that supplies the dried organic waste to the carbonizing furnace; and
a combustion gas flow path through which the combustion gas generated by the carbonizing furnace is supplied to the pyrolytic furnace, the combustion gas discharged from the pyrolytic furnace is supplied to the steam superheater, the combustion gas discharged from the steam superheater is supplied to the steam generator, and the combustion gas discharged from the steam generator is supplied to the dryer.

2. The water gas generation system according to claim 1, further comprising
a char recovery apparatus which recoveries the carbide that is unreacted but discharged from the water gas outlet portion of the pyrolytic furnace, and supplies the unreacted carbide again to the pyrolytic furnace.

3. The water gas generation system according to claim 1, wherein
the combustion gas discharged from the dryer is supplied through the combustion gas flow path to an exhaust gas cooling/cleaning apparatus that removes harmful substance from the combustion gas discharged from the dryer, to detoxify the combustion gas.

4. A combustion gas supply method for a water gas generation system including a carbonizing furnace that generates carbide and combustion gas by partial combustion of organic waste, a pyrolytic furnace that generates water gas by heating, with the combustion gas, water steam and the carbide generated by the carbonizing furnace, a steam generator that generates the water steam by heating water with the combustion gas, a steam superheater that superheats, with the combustion gas, the water steam generated by the steam generator and that supplies the superheated water steam to the pyrolytic furnace, and a dryer that dries the organic waste with the combustion gas and that supplies the dried organic waste to the carbonizing furnace, the combustion gas supply method comprising:
a first step of supplying the combustion gas generated by the carbonizing furnace to the pyrolytic furnace;
a second step of supplying the combustion gas discharged from the pyrolytic furnace to the steam superheater;
a third step of supplying the combustion gas discharged from the steam superheater to the steam generator; and
a fourth step of supplying the combustion gas discharged from the steam generator to the dryer.

5. The combustion gas supply method for the water gas generation system according to claim 4, further comprising
a fifth step of supplying the combustion gas discharged from the dryer to an exhaust gas cooling/cleaning apparatus.

6. The water gas generation system according to claim 1, wherein
the pyrolytic furnace comprises:
a body part that is formed into a cylindrical shape extending along the axial line thereof;
a reaction tube that is formed into a cylindrical shape extending along the axial line, the reaction tube having an outer circumferential surface which forms, between the inner circumferential surface of the body part and the outer circumferential surface of the reaction tube, a heating gas flow path for circulating the combustion gas therethrough, and the reaction tube having an upper end protruding from the upper surface of the body part;
a supply portion through which carbide and a gasification agent are supplied into the reaction tube in order to generate water gas in the reaction tube;
a heating gas supply portion which is disposed in an upper portion of the body part and through which the combustion gas is supplied to the heating gas flow path;
a water gas outlet portion which is attached in the lower end of the reaction tube and through which water gas generated by a pyrolysis reaction of the carbide in the reaction tube is guided to outside;
a heating gas discharge portion which is disposed in a lower portion of the body part and through which the combustion gas is discharged from the heating gas flow path;
a first seal portion that is disposed below the upper surface of the body part so as to be in contact with the upper surface, that has an inner circumferential surface in contact with the outer circumferential surface of the reaction tube, and that blocks outflow of the combustion gas from the upper surface of the body part;
a second seal portion that is disposed above the bottom surface of the body part so as to be in contact with the bottom surface from which the lower end of the reaction tube protrudes, that has an inner circumferential surface in contact with the outer circumferential surface of the reaction tube, and that blocks outflow of the combustion gas from the bottom surface of the body part; and
a third seal portion that has an inner circumferential surface in contact, at an attachment position of the lower end of the reaction tube and the water gas outlet portion, with the outer circumferential surface of the reaction tube and with the outer circumferential surface of the water gas outlet portion, and that blocks outflow of the water gas from the attachment position.

7. The water gas generation system according to claim 6, wherein
the pyrolytic furnace further comprises:
a fourth seal portion that is disposed between an upper plate forming the upper surface of the body part and a first flange portion provided at the upper end of the lateral surface of the body part and that blocks outflow of the combustion gas, the upper plate and the first flange portion being fastened to each other with fastening members at a plurality of positions around the axial line,
a fifth seal portion that is disposed between a bottom plate forming the bottom surface of the body part and a second flange portion provided at the lower end of the lateral surface of the body part and that blocks outflow of the combustion gas, the bottom plate and the second flange portion being fastened to each other with fastening members at a plurality of positions around the axial line, and
a sixth seal portion that is disposed between a third flange portion provided at the upper end of the reaction tube and a fourth flange portion provided at the lower end of the supply unit and that blocks outflow of the water gas, the third flange portion and the fourth flange portion being fastened to each other with fastening members at a plurality of positions around the axial line.

8. The water gas generation system according to claim 6, wherein
the reaction tube includes
a cylindrical member that is formed into a cylindrical shape extending along the axial line; and
a pyrolysis promoting mechanism that is accommodated in the cylindrical member and that promotes a pyrolysis reaction between the carbide and the gasification agent by guiding, in a stepwise manner from the upper end side to the lower end side of the cylindrical member, the carbide supplied from the upper end of the reaction tube.

9. The water gas generation system according to claim 8, wherein
the pyrolysis promoting mechanism comprises:

a plurality of first inclined plates each forming a first inclined surface which is inclined so as to guide the carbide from one end of the inner circumferential surface of the reaction tube to a first opening portion provided in the other end of the reaction tube;

a plurality of second inclined plates each forming a second inclined surface which is inclined so as to guide, from the other end to a second opening portion provided in the one end, the carbide downwardly fallen from the first opening portion by the first inclined plates; and a holding part that holds the plurality of first inclined plates and the plurality of second inclined plates such that the first inclined plates and the second inclined plates are alternately disposed along the axial line.

10. The water gas generation system according to claim 9, wherein the holding part has a bar-like member extending along the axial line, and the plurality of first inclined plates and the plurality of second inclined plates are held, at a plurality of positions arranged along the axial line, by the bar-like member.

11. The water gas generation system according to claim 8, wherein the pyrolysis promoting mechanism is attachable/detachable to/from the cylindrical member.

* * * * *